(12) United States Patent　　(10) Patent No.: US 12,447,043 B2
Springer et al.　　(45) Date of Patent: Oct. 21, 2025

(54) DERMATOLOGICAL TREATMENTS AND SYSTEMS EMPLOYING COOLING, TOPICALS, AND/OR ABRASION

(71) Applicant: R2 Technologies, Inc., San Ramon, CA (US)

(72) Inventors: Kevin Springer, Livermore, CA (US); Jesse Rosen, Albany, CA (US); Erik Stauber, Albany, CA (US); Rico Stenson, San Mateo, CA (US); Bryan Jon Weber, Livermore, CA (US); Gregory F. Hirth, Pleasanton, CA (US); James Edward Hastings, San Bruno, CA (US); Timothy Dwaine Holt, San Ramon, CA (US); Kristine Tatsutani, Redwood City, CA (US); Noel John Ronsvalle, San Jose, CA (US); Peter E. Wagner, San Ramon, CA (US)

(73) Assignee: R2 Technologies, Inc., Dublin, CA (US)

( * ) Notice: Subject to any disclaimer, the term of this patent is extended or adjusted under 35 U.S.C. 154(b) by 948 days.

(21) Appl. No.: 17/579,499

(22) Filed: Jan. 19, 2022

(65) Prior Publication Data

US 2022/0226149 A1　Jul. 21, 2022

Related U.S. Application Data

(60) Provisional application No. 63/139,450, filed on Jan. 20, 2021.

(51) Int. Cl.
　*A61F 7/00*　　(2006.01)
(52) U.S. Cl.
　CPC ........ *A61F 7/00* (2013.01); *A61F 2007/0052* (2013.01); *A61F 2007/0087* (2013.01)

(58) Field of Classification Search
　CPC ....... A61B 2090/065; A61B 2090/0803; A61F 2007/0052; A61F 2007/0075;
(Continued)

(56) References Cited

U.S. PATENT DOCUMENTS 3,664,344 A　5/1972　Bryne
4,206,609 A　6/1980　Durenec
(Continued)

FOREIGN PATENT DOCUMENTS

CA　2441489 A1　3/2005
CN　1214624 A　4/1999
(Continued)

OTHER PUBLICATIONS

Andrews, Mark D., Cryosurgery for Common Skin Conditions, American Family Physician, vol. 69, No. 10, May 15, 2004, pp. 2365-2372.
(Continued)

*Primary Examiner* — Tigist S Demie
(74) *Attorney, Agent, or Firm* — Kilpatrick Townsend & Stockton LLP

(57) ABSTRACT

Dermatological treatments and systems employing cooling, topicals, and/or abrasion are disclosed herein. The system can include a cold plate and a suspension assembly tip. The suspension assembly tip can be selectively coupleable to the cold plate. The suspension assembly tip can include a suspension tip and a suspension. The suspension tip can include a contact surface that can be contacted onto a patient's skin to provide a treatment. The suspension can couple to both the cold plate and to the suspension tip. The suspension can be thermally conductive so as to closely thermally couple the suspension tip to the cold plate, or the
(Continued)

suspension tip can have a low thermal conductivity so as to not closely thermally coupled the suspension tip to the cold plate.

31 Claims, 34 Drawing Sheets

(58) Field of Classification Search
CPC ...... A61F 2007/0086; A61F 2007/0087; A61F 2007/0096; A61F 2007/0295; A61F 2007/0296; A61F 7/00; A61F 7/007
See application file for complete search history.

(56) References Cited

U.S. PATENT DOCUMENTS

| | | |
|---|---|---|
| 5,374,284 A | 12/1994 | Guibert et al. |
| 5,596,875 A | 1/1997 | Berry et al. |
| 5,654,279 A | 8/1997 | Rubinsky et al. |
| 5,759,182 A | 6/1998 | Varney et al. |
| 5,848,981 A | 12/1998 | Herbranson |
| 5,901,707 A | 5/1999 | Goncalves |
| 6,017,337 A | 1/2000 | Pira |
| 6,430,956 B1 | 8/2002 | Haas et al. |
| 6,503,246 B1 | 1/2003 | Har-Shai et al. |
| 6,629,417 B2 | 10/2003 | Haas et al. |
| 6,981,970 B2 | 1/2006 | Karni |
| 7,367,341 B2 | 5/2008 | Anderson et al. |
| 7,630,774 B2 | 12/2009 | Karni et al. |
| 7,751,452 B2 | 7/2010 | Vogler |
| 7,850,683 B2 | 12/2010 | Elkins et al. |
| 8,150,532 B2 | 4/2012 | Karni et al. |
| 8,435,194 B2 | 5/2013 | Dverin et al. |
| 8,579,835 B2 | 11/2013 | Britva et al. |
| 8,950,406 B2 | 2/2015 | Karni et al. |
| 9,522,031 B2 | 12/2016 | Anderson et al. |
| 9,549,773 B2 | 1/2017 | Anderson et al. |
| 9,801,677 B2 | 10/2017 | Anderson et al. |
| 9,855,166 B2 | 1/2018 | Anderson et al. |
| 9,974,684 B2 | 5/2018 | Anderson et al. |
| 10,765,467 B2 | 9/2020 | Rosen et al. |
| 10,905,491 B2 | 2/2021 | Anderson et al. |
| 11,013,547 B2 | 5/2021 | Rosen et al. |
| 11,197,776 B2 | 12/2021 | Anderson et al. |
| 11,266,524 B2 | 3/2022 | Rosen et al. |
| 2003/0004556 A1 | 1/2003 | McDaniel |
| 2003/0100936 A1 | 5/2003 | Altshuler et al. |
| 2003/0220674 A1 | 11/2003 | Anderson et al. |
| 2004/0030332 A1 | 2/2004 | Knowlton et al. |
| 2004/0167592 A1 | 8/2004 | Grove et al. |
| 2005/0222565 A1 | 10/2005 | Manstein |
| 2006/0058238 A1 | 3/2006 | Laurent-Applegate et al. |
| 2006/0189976 A1 | 8/2006 | Karni et al. |
| 2006/0282067 A1 | 12/2006 | Koop et al. |
| 2007/0088386 A1 | 4/2007 | Babaev |
| 2007/0129714 A1 | 6/2007 | Elkins et al. |
| 2007/0135876 A1 | 6/2007 | Weber |
| 2007/0185527 A1 | 8/2007 | Babaev |
| 2008/0039747 A1 | 2/2008 | Baerwalde |
| 2008/0077201 A1 | 3/2008 | Levinson et al. |
| 2008/0077211 A1 | 3/2008 | Levinson et al. |
| 2008/0119839 A1 | 5/2008 | Vancelette |
| 2008/0183164 A1 | 7/2008 | Elkins et al. |
| 2008/0183167 A1 | 7/2008 | Britva et al. |
| 2008/0255644 A1 | 10/2008 | Carson |
| 2008/0287943 A1 | 11/2008 | Weber et al. |
| 2009/0012585 A1 | 1/2009 | Karni et al. |
| 2009/0018623 A1 | 1/2009 | Levinson et al. |
| 2009/0018626 A1 | 1/2009 | Levinson et al. |
| 2009/0171424 A1 | 7/2009 | Britva et al. |
| 2009/0281537 A1 | 11/2009 | Britva et al. |
| 2009/0299355 A1 | 12/2009 | Bencini et al. |
| 2009/0299361 A1 | 12/2009 | Flyash et al. |
| 2010/0036295 A1 | 2/2010 | Altshuler et al. |
| 2010/0081971 A1* | 4/2010 | Allison ............. A61F 7/00 606/1 |
| 2010/0114007 A1 | 5/2010 | Fischer et al. |
| 2010/0280582 A1* | 11/2010 | Baker ............. A61F 7/007 607/113 |
| 2011/0313411 A1 | 12/2011 | Anderson et al. |
| 2012/0041525 A1 | 2/2012 | Karni |
| 2012/0071794 A1 | 3/2012 | Karni |
| 2012/0089211 A1 | 4/2012 | Curtis et al. |
| 2012/0123319 A1 | 5/2012 | Britva et al. |
| 2012/0330194 A1 | 12/2012 | Britva et al. |
| 2014/0007895 A1 | 1/2014 | Britva et al. |
| 2014/0135662 A1 | 5/2014 | Britva et al. |
| 2014/0200506 A1 | 7/2014 | Zemel et al. |
| 2014/0260331 A1 | 9/2014 | Lofy et al. |
| 2014/0303696 A1 | 10/2014 | Anderson et al. |
| 2014/0303697 A1 | 10/2014 | Anderson et al. |
| 2015/0045857 A1 | 2/2015 | Britva et al. |
| 2015/0057701 A1 | 2/2015 | Kelleher et al. |
| 2015/0080991 A1 | 3/2015 | Britva et al. |
| 2015/0182375 A1 | 7/2015 | Binversie et al. |
| 2015/0216719 A1 | 8/2015 | Debenedictis et al. |
| 2015/0216720 A1 | 8/2015 | Debenedictis et al. |
| 2015/0223975 A1 | 8/2015 | Anderson et al. |
| 2016/0157915 A1 | 6/2016 | Anderson et al. |
| 2016/0270951 A1 | 9/2016 | Martins et al. |
| 2016/0317346 A1 | 11/2016 | Kovach |
| 2016/0354559 A1 | 12/2016 | Gavini et al. |
| 2017/0065323 A1 | 3/2017 | Rosen et al. |
| 2017/0325992 A1 | 11/2017 | Debenedictis et al. |
| 2017/0348143 A1 | 12/2017 | Rosen et al. |
| 2020/0197104 A1 | 6/2020 | Rosen et al. |
| 2020/0214757 A1 | 7/2020 | Rosen et al. |
| 2021/0157472 A1 | 5/2021 | Johansson et al. |
| 2021/0228256 A1 | 7/2021 | Anderson et al. |
| 2021/0407201 A1 | 12/2021 | Stenson et al. |

FOREIGN PATENT DOCUMENTS

| | | |
|---|---|---|
| CN | 1658804 A | 8/2005 |
| CN | 102143724 A | 8/2011 |
| CN | 104490372 A | 4/2015 |
| CN | 108135644 A | 6/2018 |
| DE | 9217897 U1 | 11/1993 |
| DE | 4431036 A1 | 3/1996 |
| EP | 1797847 A1 | 6/2007 |
| EP | 2201917 A1 | 6/2010 |
| EP | 2272455 A1 | 1/2011 |
| EP | 3344176 | 7/2018 |
| GB | 2286660 A | 8/1995 |
| JP | 4133822 A | 5/1992 |
| JP | 10052475 A | 2/1998 |
| JP | 2005237908 A | 9/2005 |
| KR | 200426759 Y1 | 9/2006 |
| KR | 200431404 Y1 | 11/2006 |
| KR | 100802155 B1 | 2/2008 |
| RU | 2074680 C1 | 3/1997 |
| WO | 2003078596 A2 | 9/2003 |
| WO | 2005096979 A1 | 10/2005 |
| WO | 2006066226 A1 | 6/2006 |
| WO | 2006127467 A2 | 11/2006 |
| WO | 2007064718 A2 | 6/2007 |
| WO | 2008055243 A2 | 5/2008 |
| WO | 2008083305 A2 | 7/2008 |
| WO | 2008091983 A2 | 7/2008 |
| WO | 2009146053 A1 | 12/2009 |
| WO | 2010017477 A2 | 2/2010 |
| WO | 2013075006 A1 | 5/2013 |
| WO | 2013075016 A1 | 5/2013 |
| WO | 2015123420 A1 | 8/2015 |
| WO | 2017041022 A1 | 3/2017 |
| WO | 2017196548 A1 | 11/2017 |
| WO | 2017210619 A1 | 12/2017 |

OTHER PUBLICATIONS

Gage, et al., Critical Temperature for Skin Necrosis in Experimental Cryosurgery, Cryobiology, vol. 19, Jun. 1982, pp. 273-282.
Gage, et al., Sensitivity of Pigmented Mucosa and Skin to Freezing Injury, Cryobiology, vol. 16, No. 4, Aug. 1979, pp. 348-361.

(56) References Cited

OTHER PUBLICATIONS

Har-Shai, et al., Effect of Skin Surface Temperature on Skin Pigmentation During Contact and Intralesional Cryosurgery of Hypertrophic Scars and Kleoids, Journal of the European Academy of Dermatology and Venereology, vol. 21, No. 2, Feb. 2007, pp. 1-14.

Thai, et al. Cryosurgery of Benign Skin Lesions, Australasian Journal of Dermatology, vol. 40, 1999, pp. 175-186.

Yeh, Chin-Jyh, Cryosurgical Treatment of Melanin-Pigmented Gingiva, Oral Surgery, Oral Medicine, Pral Pathology, Oral Radiology, and Endodontology, vol. 86, No. 6, Jun. 1998, pp. 660-663.

Zachariassen, et al., Ice Nucleation And Antinucleation In Nature, Cyobiology, vol. 41, No. 4, Dec. 2000, pp. 257-279.

* cited by examiner

DERMATOLOGICAL TREATMENTS AND SYSTEMS EMPLOYING COOLING, TOPICALS, AND/OR ABRASION

CROSS-REFERENCES TO RELATED APPLICATIONS

This application claims the benefit of U.S. Provisional Application No. 63/139,450, filed on Jan. 20, 2021, and entitled "DERMATOLOGICAL TREATMENTS AND SYSTEMS EMPLOYING COOLING, TOPICALS, AND/OR ABRASION", the entirety of which is hereby incorporated by reference herein.

BACKGROUND

Cryotherapy is the local or general use of cold in medical therapy. Cryotherapy can include the controlled freezing of biological tissue, which controlled freezing of biological tissue, such as skin tissue, can produce various effects. Certain tissue freezing procedures and devices, such as conventional cryoprobes, can cause severe freezing of tissue and generate cellular and visible skin damage.

There is a demand for cosmetic products that can change the appearance of skin or otherwise controllably affect skin appearance and/or pigmentation. This can include lightening or darkening of the skin, improving evenness of skin tone, minimizing wrinkles, or the like. For example, it may be desirable to lighten the overall complexion or color of a region of skin to alter the general appearance for cosmetic reasons. Also, lightening of particular hyperpigmented regions of skin, such as freckles, 'café au lait' spots, melasma, or dark circles under the eyes that may result from excessive local amounts of pigment in the skin, may also be desirable for cosmetic reasons. Hyperpigmentation can result from a variety of factors such as UV exposure, aging, stress, trauma, inflammation, etc. Such factors can lead to an excess production of melanin, or melanogenesis, in the skin by melanocytes, which can lead to formation of hyperpigmented areas. Such hyperpigmented areas are typically associated with excess melanin within the epidermis and/or dermal-epidermis junction. However, hyperpigmentation can also result from excess melanin deposited within the dermis.

Hypopigmentation of skin tissue has been observed as a side effect in response to temporary cooling or freezing of the tissue, such as may occur during conventional cryosurgery procedures. Loss of pigmentation following skin cooling or freezing may result from decreased melanin production, decreased melanosome production, destruction of melanocytes, or inhibited transfer or regulation of melanosome into the keratinocytes in the lower region of the epidermal layer. The resultant hypopigmentation may be long-lasting or permanent. However, it has also been observed that some of these freezing procedures can generate regions of hyperpigmentation (or skin darkening) of skin tissue. The level of increase or decrease in pigmentation may be dependent upon certain aspects of the cooling or freezing conditions, including the temperature of the cooling treatment, and the length of time the tissue is maintained in a frozen state.

Improved hypopigmentation treatments, devices, and systems have been developed to improve the consistency of skin freezing and the overall hypopigmentation consistency. For example, it has been observed that moderate degrees of freezing (e.g., −4 to −30 degrees Celsius) at shorter time frames (e.g., 30 to 60 seconds) can produce particular dermatological effects, such as affecting the expression of skin pigmentation (e.g., hypopigmentation). Cryotherapy can be provided using a variety of techniques including the direct application of a cryogen spray to the skin of the patient or the application of a cooled probe or plate to the skin of the patient. Exemplary methods and devices are described in: U.S. Patent Publication No. 2011/0313411, filed on Aug. 7, 2009, and entitled "METHOD AND APPARATUS FOR DERMATOLOGICAL HYPOPIGMENTATION"; U.S. Patent Publication No. 2014/0303696, filed on Nov. 16, 2012, and entitled "METHOD AND APPARATUS FOR CRYOGENIC TREATMENT OF SKIN TISSUE"; U.S. Patent Publication No. 2014/0303697, filed on Nov. 16, 2012, and entitled "METHOD AND APPARATUS FOR CRYOGENIC TREATMENT OF SKIN TISSUE"; U.S. Patent Publication No. 2015/0223975, filed on Feb. 12, 2015, and entitled "METHOD AND APPARATUS FOR AFFECTING PIGMENTATION OF TISSUE"; U.S. Patent Publication No. 2017/0065323, filed on Sep. 6, 2016, and entitled "MEDICAL SYSTEMS, METHODS, AND DEVICES FOR HYPOPIGMENTATION COOLING TREATMENTS"; U.S. Pat. No. 10,765,467, filed on Sep. 6, 2016, and entitled "Medical Systems, Methods, And Devices For Hypopigmentation Cooling Treatments"; and U.S. Patent Publication No. 2017/0348143, filed on Jun. 2, 2017, and entitled "MEDICAL METHODS AND SYSTEMS FOR SKIN TREATMENT", the entirety of each of which is hereby incorporated by reference herein.

While the treatment of skin or a localized lesion can be accomplished with cryotherapy, it may be desirable to provide improved methods, systems, and devices for cryotherapy. In particular, improved designs, controls and parameters associated with cryogen delivery to achieve consistent and reliable skin freezing and desired skin treatment effect may be of benefit. Accordingly, improved dermatological treatments and systems employing cooling, topicals, and/or abrasion are desirable.

BRIEF SUMMARY

Embodiments disclosed herein relate to dermatological treatments and systems employing cooling, topicals, and/or abrasion. This can include a system to deliver and/or control the delivery of a cooling treatment. The system can include hardware and/or software features to facilitate delivery of such cooling treatment. This can include a handpiece including a cold plate. One or several handpiece tips can be coupled to the cold plate to provide a desired treatment. These handpiece tips can include, for example, a smooth tip, a textured tip, and/or a suspension assembly tip, which suspension assembly tip can be smooth or textured.

The suspension assembly tip can include a suspension and a suspension tip. The suspension can couple to the cold plate and can couple to the suspension tip. The suspension can suspend the suspension tip such that the suspension tip can move with respect to the cold plate. This movement can smooth forces applied to a patient via suspension tip. Further, the suspension can thermally isolate and/or thermally coupled the suspension tip to the cold plate. This can selective thermal isolation and/or thermal coupling can facilitate broader use of the handpiece for freezing, cooling, and/or other treatments.

One aspect relates to a system for delivering a cooling treatment to an area of skin of a patient. The system includes a cold plate and a suspension assembly tip selectively coupleable to the cold plate. The suspension assembly tip can include a suspension tip, and a suspension.

In some embodiments, the system includes a handpiece coupled to the cold plate. In some embodiments, the handpiece includes a cooler that can control a temperature of the cold plate. In some embodiments, the handpiece further includes a button that can receive a user input indicative of initiation of a treatment.

In some embodiments, the handpiece further includes a feature that can detect contacting of the cold plate to skin of the patient. In some embodiments, the feature that can detect contacting of the cold plate to the skin of the patient can be a capacitive touch sensor. In some embodiments, the feature that can detect contacting of the cold plate to the skin of the patient can be a temperature sensor.

In some embodiments, the system can include a controller communicatively coupled to the cooler. In some embodiments, the controller can control operation of the cooler to control the temperature of the cold plate. In some embodiments, the controller can control operation of the cooler according to stored treatment instructions.

In some embodiments, the cold plate includes a distal protrusion, a camming surface extending proximally and radially away from a proximal end of the distal protrusion, a retention depression connecting to a proximal end of the camming surface. In some embodiments, the camming surface is at least partially conical. In some embodiments, the cold plate further includes a plurality of axial grooves located around a perimeter of a junction of the proximal end of the camming surface and the retention depression. In some embodiments, the retention depression extends to a retention depth below the proximal end of the camming surface. In some embodiments, the axial grooves have a groove depth equal to the retention depth.

In some embodiments, the suspension tip can be at least one of a smooth tip, and a textured tip. In some embodiments, the suspension tip can have an exterior housing. In some embodiments, the exterior housing includes a contact surface and a base. In some embodiments, the base defines an opening extending into a receptacle defined by an interior wall of the exterior housing of the suspension tip. In some embodiments, the receptacle can receive the suspension. In some embodiments, the suspension tip further comprises a retention groove and a suspension lip. In some embodiments, each of the retention groove and the suspension lip are formed in the receptacle by the interior wall of the exterior housing. In some embodiments, the retention groove is relatively more proximate to the base of the exterior housing than suspension lip.

In some embodiments, the suspension comprises a central member located at a top of the suspension, a suspension member array including a plurality of suspension members, and a coupling member array comprising a plurality of coupling members. In some embodiments, each of the suspension members radially extends from a proximal end connected to the central member. In some embodiments, each of the coupling members extends radially and downward from a proximal end connected to the central member.

In some embodiments, the central member defines a central receptacle that can receive a portion of the cold plate. In some embodiments, the coupling member array is conical shaped. In some embodiments, a distal end of each of the coupling members includes a coupling head. In some embodiments, at least some of the coupling heads of the coupling members include an external connector that can engage with the retention groove.

In some embodiments, at least some of the coupling heads of the coupling members include internal connector that can engage with the cold plate. In some embodiments, the internal connectors can engage with the retention groove of the cold plate. In some embodiments, each of the suspension members engages with the suspension lip. In some embodiments, each of the plurality of suspension members in the suspension member array is located in a common plane.

One aspect relates to a suspension assembly tip selectively coupleable to a cold plate. The suspension assembly tip includes a suspension tip including an exterior housing, the exterior housing including a contact surface, an interior surface defining a receptacle within the exterior housing, and a base. In some embodiments, the base defines an opening extending into the receptacle. The suspension assembly tip includes a suspension coupled to the interior surface of the exterior housing. In some embodiments, the receptacle can receive the suspension.

In some embodiments, the suspension contact surface of the suspension tip includes at least one of a smooth contact surface, and a textured contact surface. In some embodiments, the suspension tip further includes a retention groove, and a suspension lip. In some embodiments, each of the retention groove and the suspension lip are formed in the interior surface of the exterior housing. In some embodiments, the retention groove is relatively more proximate to the base of the exterior housing than suspension lip.

In some embodiments, the suspension includes a central member located at a top of the suspension, a suspension member array including a plurality of suspension members, and a coupling member array comprising a plurality of coupling members. In some embodiments, each of the suspension members radially extends from a proximal end connected to the central member. In some embodiments, each of the coupling members extends radially and downward from a proximal end connected to the central member.

In some embodiments, the central member defines a central receptacle. In some embodiments, the coupling member array is conical shaped. In some embodiments, a distal end of each of the coupling members can include a coupling head. In some embodiments, at least some of the coupling heads of the coupling members can include an external connector that can engage with the retention groove. In some embodiments, at least some of the coupling heads of the coupling members include an internal connector that can engage with the cold plate. In some embodiments, each of the suspension members engages with the suspension lip. In some embodiments, each of the plurality of suspension members in the suspension member array is located in a common plane.

One aspect of the present disclosure relates to a method of delivering a skin cooling treatment to an area of skin of a patient. The method can include receiving a card within a card reader of a cooling treatment system. The cooling treatment system can include a display, a chiller located in a housing, and a handpiece flexibly coupled to the housing. The handpiece can include a cooler for cooling a cold plate of the handpiece. The method can include identifying treatment instructions stored on the card, the treatment instructions including at least one temperature profile identifying a plurality of temperatures and an associated time for ramping to and/or for maintaining each of the plurality of temperatures, launching a graphical user interface (GUI) corresponding to the identified treatment, identifying a step in a plurality of steps in the identified treatment, controlling the GUI to guide the user though performing user actions of the step in the identified treatment, setting a temperature of the cold plate to a first temperature of the temperature profile, and controlling the GUI to display a countdown timer upon receipt of an indication of initiation of delivery of treatment of the identified step. It some embodiments, and subsequent to setting a temperature of the cold plate to a first temperature, the cold-plate can be pre-cooled until the set temperature of the cold plate is achieved.

In some embodiments, the step can be a freezing step. In some embodiments, a second step can be a cooling step. In some embodiments, a cooling step can comprise a step wherein a temperature of the skin being treated is lowered. In some embodiments, the cooling step can include lowering the temperature of the skin being treated such that ice crystallization occurs in the skin being treated. In some embodiments, a third step can be a dwell step. In some embodiments, a fourth step can be a rewarming step. In some embodiments, this can include rewarming of the skin to a temperature up to, for example, 50° C., 45° C., 40° C., 35° C., 30° C., between 30° C. and 50° C., between 35° C. and 45° C., or the like.

In some embodiments, controlling the GUI to guide the user through performing user actions of the next step can include identifying at least one topical, and directing the application of the topical to the area of skin of the patient. In some embodiments, controlling the GUI to guide the user through performing user actions of the next step can include directing the user to cool the area of skin of the patient via the handpiece. In some embodiments, directing the user to cool the area of skin of the patient via the handpiece can include directing the user to contact the area of skin of the patient with the cold plate, and depress a button to indicate initiation of delivery of treatment of the identified next step. In some embodiments, directing the user to cool the area of skin of the patient via the handpiece can include directing the user to connect a treatment tip, also referred to herein as a cooling tip, to the cold plate of the handpiece, contact the area of skin of the patient with the treatment tip connected to the cold plate, and depress a button to indicate initiation of delivery of treatment of the identified next step.

In some embodiments, the treatment tip can be at least one of a smooth tip, and a textured tip. In some embodiments, the cold plate can include a distal protrusion, a camming surface extending proximally and radially away from a proximal end of the distal protrusion, and a retention depression connecting to a proximal end of the camming surface. In some embodiments, the camming surface is at least partially conical.

In some embodiments, the treatment tip includes an exterior housing, and a retention feature located within the exterior housing. In some embodiments, the retention feature can be retained within the retention depression to thereby connect the treatment tip to the cold plate. In some embodiments, the retention feature can be a rubber O-ring. In some embodiments, the cold plate further includes a plurality of axial grooves located around a perimeter of a junction of the proximal end of the camming surface and the retention depression. In some embodiments, the plurality of axial grooves prevent sealing of the O-ring to the cold plate when connecting the treatment tip to the cold plate.

In some embodiments, setting a temperature of the cold plate to a first temperature of the temperature profile includes controlling the chiller to cool a coolant to a coolant temperature within a target range, circulating the coolant through the handpiece, and controlling a cooler within the handpiece to cool the cold plate to a desired cold plate temperature. In some embodiments, the cooler can be a thermoelectric cooler. In some embodiments, controlling the cooler within the handpiece to cool the cold plate to a desired cold plate temperature can include transferring heat from the cold plate to the coolant circulating through the handpiece with the thermoelectric cooler. In some embodiments, the chiller can include a coolant circulation system, a heat exchanger, and a refrigeration unit coupled via the heat exchange to the coolant circulation system. In some embodiments, the refrigeration unit can cool the coolant in the coolant circulation system. In some embodiments, the chiller further includes a heating unit that can heat coolant in the coolant circulation system.

In some embodiments, the method can include receiving a termination request; and cancelling the treatment. In some embodiments, the termination request is received from the user. In some embodiments, the method includes generating a termination request, and cancelling the treatment. In some embodiments, the termination request is generated by a processor of the cooling treatment system in response to a detected temperature. In some embodiments, the detected temperature can be at least one of a temperature of the cold plate, a temperature of the chiller, or a temperature of the cooler. In some embodiments, cancelling the treatment includes controlling the cooler to rewarm the cold plate. In some embodiments, after receiving the termination request, the cold plate is heated. In some embodiments, the cold plate can be heated via control of at least one of the chiller and the cooler. In some embodiments, cancelling the treatment includes heating the cold plate. In some embodiments, heating the cold plate includes controlling at least one of: the chiller; and the cooler to heat the cold plate.

In some embodiments, the method can further include determining a value of a count of available treatment cycles associated with the card, receiving an instruction from user to provide a treatment, and starting the treatment when the value indicates that at least one treatment is available. In some embodiments, the method can further include decrementing the value of the count of available treatment cycles upon starting the treatment.

DETAILED DESCRIPTION

Figure 1:
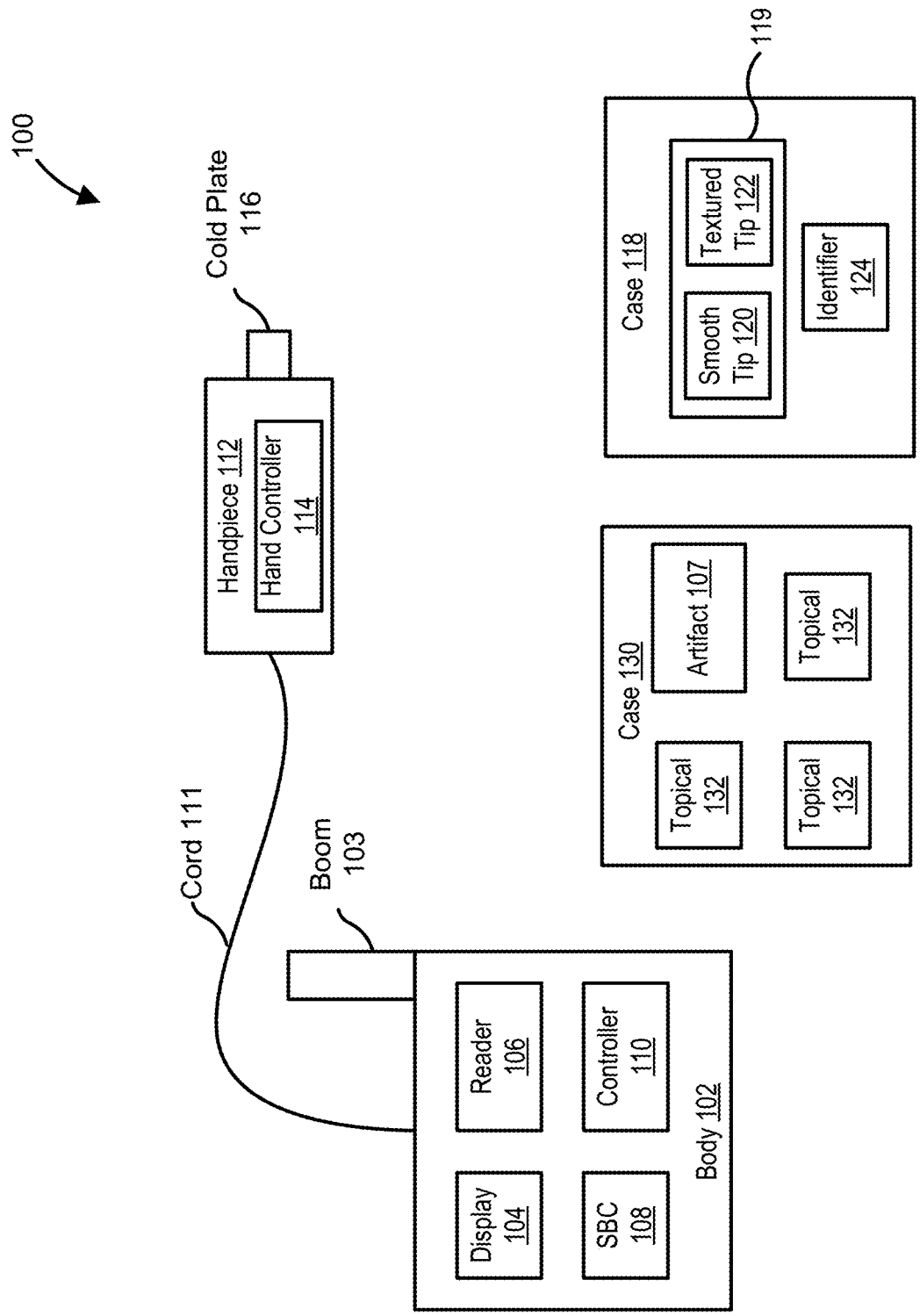
FIG. 1 is a schematic illustration of one embodiment of a cooling treatment system.

Cooling based treatments are frequently used to address a wide range of health and aesthetic issues. These issues can include, for example, the ablation of benign lesions such as, for example, acne—vulgaris, cystic; acne keloidalis; adenoma sebaceum; alopecia areatea; angiokeratomas; angiokeratoma of Fordyce; atypical fibroxanthoma; cherry angiomas;

chonrodermatitis nodularis helicis; chromoblastomycosis; clear cell acanthoma; condyloma acuminatum; dermatofibroma; disseminated superficial actinic porokeratosis; elastosis perforans serpiginosa; epidermal nevus; erosive adenomatosis of the nipple; folliculitis keloidalis; granuloma annulare; granuloma faciale; granulomaa pyogenicum; hemangioma; herpes labialis; idiopathic guttate hypomelanosis; Kyrle's disease; leishmaniasis; lentigines; lentigo simplex;

lichen sclerosus et atrophicus of vulva; lupus erythematosus; lymphangioma; lymphocytoma cutis; molluscum contagiosum; mucocele; myxoid cyst; orf; porokeratosis plantaris discreta; porokeratosis of Mibelli; prurigo nodularis; pruritus ani; psoriasis; rhinophyma; rosacea; sarcoid; sebaceous hyperplasia; seborrheic keratosis; solar lentigo; syringoma; trichiasis; trichoepithelioma; varicose veins; venous lakes; verrucae—periungual, plane, vulgaris, filiform, plantar; xanthoma; acne scar; keloids; cutaneous horn; hypertrophic scar; ingrown toenail; skin tags; tattoos; freckles; spider naevus; capillary haemangioma; cavernous haemangioma; milia; trichillemmal cyst; steatocystoma multiplex; hidrocystoma; acrokeratosis veruciformis; dermatosis papulose nigra; hyperkeratosis naevoid of nipple; benign lichenoid keratosis; angiofibromas; and angiomas. In some embodiments, cooling based treatments can be used to treat pre-malignant skin conditions such as, for example: actinic keratosis; leukoplakia; Bowen disease; erythroplasia of Quyrat; keratoacanthoma; and lentigo maligna, and can be used to treat malignant skin conditions such as, for example: basal cell carcinoma; Kaposi sarcoma; squamous cell carcinoma; and melanoma.

Some of these treatments have been specifically designed to cause skin healing, achieve a desired cosmetic benefit, and/or to change a color of the skin via the creation of skin lightening or of skin darkening. This can include minimizing lines and/or wrinkles, improving skin roughness, improving evenness of skin tone, or the like.

Maximizing the beneficial impact of treatments on skin can be complicated and may include multiple steps, which steps can be complex. More specifically, this can include application of one or several topicals, which can include one or several fluids, pastes, creams, serums, emollients, or the like, performing one or several skin manipulations or massages, applying one or several cooling or freezing treatments, and/or the like. The cooling or freezing treatments can include cooling treated skin to specific temperatures and/or temperature ranges, and in some instances can include maintaining those temperatures and/or temperature ranges for a predetermined time and/or range of times. In some instances, the effectiveness of a treatment depends at least in part on the consistency with which this treatment is applied.

The present disclosure relates to systems, devices, and methods that improve the delivery of a treatment. In some embodiments, this can include the delivery of a treatment for medical or cosmetic purposes. This can include, for example, to: change a color of the skin such as by causing skin lightening or darkening; ablate a lesion; improve skin tone; minimize lines and wrinkles; and/or facilitate skin healing.

With reference now to FIG. 1, a schematic illustration of one embodiment of a cooling treatment system 100 is shown. The cooling treatment system 100 can include a body 102, also referred to herein as a housing 102 or as a console 102. The body 102 can house several of the components of the cooling treatment system 100 including, for example, a display 104, a reader 106, a single board computer ("SBC") 108, and a controller 110. The housing 102 can further connect to a boom 103.

The display 104 can comprise desired display, and can be configured to provide information to the user of the cooling treatment system 100, and in some embodiments, receive inputs from the of the cooling treatment system. In some embodiments, the display can comprise a touch screen.

The reader 106 can comprise a feature configured to read information from an artifact 107. In some embodiments, this artifact 107 can comprise a physical artifact, and in some embodiments, this artifact can comprise a digital token or a non-physical artifact. In some embodiments, the non-physical artifact can, for example, be locally stored or can be remotely stored. In some embodiments, the non-physical artifact can reside on the cloud and/or be accessible via the cloud.

This physical artifact 107 can comprise, for example, any object or token, either physical or digital, comprising computer readable treatment instructions and/or information identifying an associated number of remaining treatment cycles associated with the card. In some embodiments, for example, the number of treatment cycles can track the number of remaining times that the artifact 107 may be used in connection with the cooling treatment system 100 to provide a treatment to a patient. When the number of remaining treatment cycles reaches zero, then the artifact, unless its treatment cycles are reloaded, cannot be used in connection with the cooling treatment system 100 to provide further treatments to patients. Thus, in some embodiments, the artifact comprises a count of available treatments, which count can be decremented when a treatment is provided and which count can be increased if/when the artifact is reloaded. In some embodiments, for example, the artifact can be reloaded by a customer purchase, for example, via the internet. In such an embodiment, subsequent to the successful processing of payment, the value of the count of the artifact can be incremented by the number of purchased treatments.

These instructions can comprise a plurality of step and associated treatments, a plurality of treatment parameter or conditions, or the like. In some embodiments, for example, treatment instructions can be loaded onto an artifact 107, and these instructions can be retrievable from the artifact 107 via the reader 106. In some embodiments, the artifact can comprise, for example, a microprocessor card, also referred to herein as a smart card. The microprocessor card can communicate with the reader 106 via, for example, a contact-based, or contactless communication. In some embodiments, for example, the artifact can include a plurality of contacts, such as found in, for example, a Europay, Mastercard, and Visa chip (EMV chip), which can connect with contacts in the reader 106 to enable reading of the card. In some embodiments, for example, the artifact 107 can contactlessly connect with the reader according to any desired contactless communication standard and/or wireless communication standard. In some embodiments, for example, the artifact 107 can connect to the reader 106 via, for example, NFC, Bluetooth, WiFi, ethernet, or the like.

The SBC 108, which can, for example, comprise a processor, associated memory, drivers, and/or communications buses. The SBC 108 can interface with other components through communications protocols, and specifically can participate in control of some of the components of the cooling treatment system 100, and specifically of the console 102. This can include, for example, the display 104, the reader 106, chiller 211, and/or the antenna 226. In some embodiments, the SBC 108 can support input/output hardware such as, for example, one or several display drivers, interface drivers, USB interface drivers, or the like.

The controller 110, also referred to herein as a processor 110, can comprise, for example, a microprocessor, such as a microprocessor from Intel® or Advanced Micro Devices, Inc.®, or Texas Instrument, or Atmel, or the like. In some embodiments, the controller 110 can comprise a custom electronics board, which can include features for controlling, for example, the chiller 211 and/or cooler 230, and hardware monitoring capabilities.

The controller and/or processor 110 can be communicatingly coupled with a memory, which memory can be volatile and/or non-volatile and/or can include volatile and/or non-volatile portions. In some embodiments, the memory can include information and/or instructions, which can be executed by the processor 110. The processor 110 can, according to these instructions, control all or portions of the cooling treatment system 100.

The body 102 can be connected to a handpiece 112 via cord 111, also referred to herein as cable 111. The cord 111 can flexibly couple the handpiece 112 to the body 102. The cord 111 can physically and communicatingly connect the handpiece 112 to the body 102 and/or to components contained in the body 102. In some embodiments, for example, the cord 111 can include one or several wires, tubes, optical fiber, or the like. In some embodiments, the controller 110 within the body 102 can control and/or communicate with the handpiece 112 via the cord 111. In some embodiments, coolant from the body 102 can transit to and from the handpiece 112 via the cord. In some embodiments, all or portions of the weight of the cord 111 can be supported by the boom 103.

The handpiece 112 comprises a hand controller 114 and a cold plate 116, also referred to herein as a handpiece tip 116, a freeze tip 116, and/or a freezing tip 116. The hand controller can comprise, for example, a microprocessor, such as a microprocessor from Intel® or Advanced Micro Devices, Inc.®, or Texas Instrument, or Atmel, or the like.

The hand controller 114 can be communicatingly coupled with a memory, which memory can be volatile and/or non-volatile and/or can include volatile and/or non-volatile portions. In some embodiments, the memory can include information and/or instructions, which can be executed by the hand controller 114. The hand controller 114 can, according to these instructions, control all or portions of the handpiece 112, and specifically can control a temperature of the cold plate 116.

The cooling treatment system 100 can further include one or several disposable features which can be contained within a case 118. These features can include one or several tips 119. Specifically, these tips 119 can include a smooth tip 120 and/or a textured tip 122. Each of the smooth tip 120 and the textured tip 122 will be discussed at greater length before. In some embodiments, the case 118 can further include an identifier 124. In some embodiments, the identifier 124 can comprise a SmartChip that can be, for example, located in a lid of the box.

The cooling treatment system 100 can further include one or several topical 132. These one or several topicals 132 can be contained within a case 130. In some embodiments, case 130 can be separate and distinct from case 118, and in some embodiments, case 118 and case 130 can comprise a single case. Case 130 can, in some embodiments, contain the artifact 107 and topicals 130 for providing a treatment. For example, the artifact 107 in the case 130 can include instructions executable by the controller 110 and/or the hand controller 114 to provide the treatment. The case 130 can further include topicals for providing this treatment.

These topicals can include, for example a gel such as a hydrogel. The hydrogel can comprise water, a thickening agent to increase viscosity and a preservative. The hydrogel may also include an amount of propylene glycol, alcohol, or similar to depress the freezing point below 0 deg. C. The purpose of the gel is to control the freezing point of the gel and therefore influence the freezing point of the skin, improve the heat transfer between the skin and the cold plate and, in the case where the handpiece tip 116 is being swept across the skin, improve the lubricity between the skin and the handpiece tip 116.

These topicals 132 can include, for example, a Molecular Silk Amino Hydrating Cleanser. This can be pH-balanced, hydrating cleansing gel that can infuse the skin with essential moisture and nutrients as it removes daily grime, pollution, SPF and makeup. This topical can be supercharged with multiple hydrators, antioxidants, Phospholipids and Silk Amino Acids for the ultimate conditioning cleanse. In some embodiments, this can include, for example: Silk Amino Acids, which can provide a potent antioxidant that provides trace nutrients and hydrates the skin; Hyaluronic Acid, which can provide concentrated moisture to the skin and can promote the retention of essential moisture while plumping the skin; Organic Safflower Oil which can break down grime, pollution and makeup as it hydrates and nourishes all skin types; Organic Moringa Oil, which can be extremely rich in phytonutrients with excellent reparative benefits, and which can reduce the ill effects of pollution and external impurities on the skin; Ethylated L-Ascorbic Acid, which can be a pure form of L-Ascorbic Acid in ethylated form that is extremely stable, and which can help neutralize complexion-dulling sebum and brightens dull skin; Lecithin Phospholipids, which can be an important source of essential fatty acids to keep the skin supple, and which can form a protective film on the skin's surface to seal in essential moisture; White Tea, which provides antioxidant protection as it soothes; Lactic Acid, which can be gentler than most AHAs, and which act as a nourishing brightener and hydrates dull skin; and Astaxanthin, which can be potent antioxidant that helps with moisture retention and elasticity, as well as protect skin against damaging UV rays.

In some embodiments, these topicals 132 can include a Peel that can comprise a brightening chemical exfoliator for increased skin radiance and luminosity. The Peel can include, in some embodiments: 10.5% Glycolic+Lactic+Salicylic Acid, which can be Powerful alpha hydroxy acids (AHAs) & Salicylic Acid (BHA) and can reduce blemishes and blackheads, refine large pores, speed up cellular renewal, lighten dark spots while increasing hydration and strengthening the skin's barrier; ethylated L-Ascorbic Acid, which can be a pure form of L-Ascorbic Acid in ethylated form that is extremely stable, and which helps neutralize complexion-dulling sebum and brightens dull skin; and Pomegranate Enzymes, which can regulate sebum-production, promote hydration, brighten, and gently exfoliate skin.

In some embodiments, these topicals 132 can include a Molecular Saviour Probiotics Treatment Mist that can be a Multi-tasking skin recovery and brightening spray mist with lasting hydration. This can further be an anti-evaporation complex to ensure this clings to skin. In some embodiments, this topical can include, for example: *Lactobacillus* Ferment+*Lactobacillus* Ferment Lysate Filtrate+Yogurt, which can be potent probiotics that can create a healthily balanced skin flora and reduce the appearance of imperfections and redness; 5% Niacinamide, which can improve the appearance of large pores and lightens discoloration and can improves skin wellness and its ability to retain moisture; Heavy water, which can be a special water molecule that Is heavier than regular water so It withstands traditional evaporation, and the mist of Heavy water can be designed to cling to your skin cells Instead of simply vanishing; Zinc PCA, which can be a potent mineral that promotes skin wellness; Silver, which can be a potent mineral that reduces the appearance of imperfections and promotes skin wellness; Mango Extract, which can be an antioxidant that promotes hydration, as it effectively reduces appearance of dullness and brightens skin; Ergothioneine, which can be a powerful antioxidant that protects skin from UV radiation, and which reduces sunburns and sun damage; and Acai Berry, a superfood that is abundant in trace nutrients, brightens and is a powerful antioxidant.

In some embodiments, these topicals 132 can include a Glacial Calming Recovery Mask that can instantly replenish moisture, soothe, and boost essential microbiome. In some embodiments, this topical can include: Snow Algae, increases hydration in the skin for a more supple complexion, boosts collagen production for improved texture and appearance, and protects skin from environmental damage at a cellular level; IceAwake™, which can visibly improve skin appearance by decreasing wrinkle depth, increasing complexion radiance, and reducing the appearance of fatigue; Vin-up Lift, which can be a resveratrol-based skin tightening ingredient extracted from Swiss ice wine combined with tara gum polysaccharide to minimize fine lines and smooth skin; Organic Safflower Oil, which can be a skin-identical lipid that hydrates and nourishes all skin types; 5% Niacinamide, which can improve the appearance of large pores and lightens dark spots, can improve pores and lighten dark spots, and can improve skin barrier function and its ability to retain moisture; Honey Extract, which can boost the skin microbiome; Beta-Glucan, which can provide profound epidermal hydration and skin soothing; and Multi-Molecular Weight Hyaluronic Acid, provides topical and concentrated moisture and moisture retention to skin while plumping the appearance of fine lines.

In some embodiments, these topicals 132 can include a Vitamin C Brighten+Firm Serum. This can, in some embodiments, be a 20% Vitamin C Brighten+Firm Serum. This topical is an antioxidant-rich serum formula that fades dark spots, enhances skin radiance, and protects against sun-induced damage and pollutants while promoting brighter, firmer skin. This topical can include: 20% Ethylated L-Ascorbic Acid, which is a pure form of L-Ascorbic Acid in ethylated form that is extremely stable, and that penetrates deep into the dermis/skin to provide superior antioxidant protection, stimulate collagen production, rebuilds skin barrier and visibly brightens dark spots; 2% Citrus Cells, which can be extracted from oranges, and which actively enhance elasticity and promotes smoother and firmer skin, for a renewed complexion; Glutathione, which is a powerful antioxidant, and which prevents free radical damage and repairs signs of premature skin aging while brightening skin; and Thiotaine, which is a powerful antioxidant and which protects and repairs tired skin while strengthening the skin's delicate barrier.

In some embodiments, these topicals 132 can include a Peptides & Antioxidants Daily Firming Treatment. This can be a daily moisturizer to protect skin against pollution and damage, combat inflammation, firm skin and restore a healthy barrier. This topical can include, for example: Teprenone, which can actively extend telomere health, restores healthy skin barrier, protects DNA and reduces age spots; Marrubium Vulgare Extract, which can enhance softness and smoothness of skin and refine skin texture, this can further help make blackheads less visible, leaving the skin radiant and purified; Palmitoyl Tripeptide-5, which can stimulate the production of collagen, prevent the formation of wrinkles and reduce their appearance, improves skin texture, and rejuvenate and smooth the skin; Palmitoyl Tripeptide-8, which prevents and reverses signs of inflammation, and calms and soothes irritated skin; Tetrahexyldecyl Ascorbate, which is a stable oil-soluble form of Vitamin C that penetrates deep into the skin to stimulate collagen production, brighten dark spots and provide free radical protection; Glutathione, Astaxanthin, Thiotaine, Phospholipids, and Ceramides, which care potent antioxidants that protect and repair tired skin while strengthening the skin's delicate barrier; *Lactobacillus* Ferment, which are potent probiotics that create a healthily balanced skin flora and strengthen the skin's natural defenses and reduces the appearance of breakouts and redness; Hydrolyzed Verbascum Thapsus Flower, that protects the skin against harmful light energy sources like UV and blue light; Hyaluronic Acid, which can be low molecular weight Hyaluronic Acid that provides concentrated moisture to the skin, and that promotes the retention of essential moisture; Caffeine, which provides instant tightening and de-puffing and antioxidant protection; Raspberry Seed Oil+Acai Oil, which provide superior antioxidant protection and feeds the skin with essential fatty acids, hydration and trace nutrients; Moringa Extract, which purifies the skin and prevent pollution particles from sticking to the skin and doing damage; and Niacinamide, which brightens skin, improves skin barrier function and its ability to retain moisture.

In some embodiments, these topicals 132 can include a RESET Acai & Manuka Honey Nourishing Cleanser. This can be, for example, a pH balanced (pH 4.5), fragrance and sulfate-free creamy cleanser supercharged with Manuka Honey UMF 17+, Acai Oil+Extract, Yogurt and Grapeseed Oil for a nourishing cleanse with every single wash. This can include, for example: Acai Oil+Extract, which can provides superior antioxidant protection and feed the skin with essential fatty acids, hydration and trace nutrients; Grapeseed Oil, which can breaks down grime, pollution and makeup as it hydrates and nourishes all skin types; Yogurt having potent probiotics that create a healthily balanced skin flora, promote cellular renewal, strengthen skin's natural defenses, and reduces blemishes and redness; and Medical Grade Manuka Honey UMF 17+, which can be sourced from a sustainable bee farm in New Zealand, medical grade Manuka honey provides natural antibacterial properties, reduces inflammation and stimulates cellular repair of damaged skin.

In some embodiments, these topicals 132 can include a FOLLOW THE LIGHT Peel. This can be a 20 min brightening peel that hydrates and erases signs of dullness as it brightens and refines the appearance of large pores. This peel can include, for example: 6.5% Glycolic+Lactic+Salicylic Acid, which powerful alpha hydroxy acids (AHAs) & Salicylic Acid reduce blemishes and blackheads, refine large pores, speed up cellular renewal, lighten dark spots while increasing hydration and strengthening the skin's barrier; Pomegranate Enzymes, which regulate sebum-production, promotes hydration, brightens, and gently exfoliates skin; Hyaluronic Acid+Crosslinked HA, which next-generation pure Hyaluronic Acid provides concentrated moisture to the skin, promotes the retention of moisture that protects, and shield the skin against free radicals and environmental stress; Centella Asiatica, which promote repair and healing, soothes sensitivity, and rebuilds skin barrier; Licorice Root Extract+White Tea, which provide antioxidant protection as it brightens and hydrates dull skin; and Glutathione+Vitamin E+Astaxanthin, which prevents UV damage, recycles Vitamin C, provides skin cells with cellular energy so that they function better, and also protects skin from oxidative and cellular damage.

In some embodiments, these topicals 132 can include a PSA Niacinamide Glow Mist. This can be Multi-tasking skin recovery and brightening spray mist with lasting hydration. This can include, for example: Niacinamide, which can improves the appearance of large pores and lightens dark spots, improves pores and lightens dark spots, and improves skin barrier function and its ability to retain moisture; Zinc PCA, which can be a potent mineral that reduces blemishes and promotes skin wellness; Centella Asiatica, which provides antioxidant protection while it soothing and firming skin; and Licorice Root Extract, which provides antioxidant protection as it brightens and hydrates dull skin.

In some embodiments, these topicals 132 can include a Glacial Brightening Microbiome Treatment Mask. This mask can instantly replenish moisture, soothe, and boost essential microbiome. This can include, for example: Snow Algae, which can increase hydration in the skin for a more supple complexion, boost collagen production for improved texture and appearance, and protect skin from environmental damage at a cellular level; IceAwake™, which can visibly improve skin appearance by decreasing wrinkle depth, increasing complexion radiance, and reducing the appearance of fatigue; Vin-upLift, which is a resveratrol-based skin tightening ingredient extracted from Swiss ice wine combined with tara gum polysaccharide to minimize fine lines and smooth skin; Organic Safflower Oil, which is a skin-identical lipid that hydrates and nourishes all skin types; Niacinamide, which improves the appearance of large pores and lightens dark spots, improves pores and lightens dark spots, and improves skin barrier function and its ability to retain moisture; Honey Extract, which boosts microbiome; Beta-Glucan, which provides profound epidermal hydration and skin soothing; and Multi-Molecular Weight Hyaluronic Acid, which provides topical and concentrated moisture and moisture retention to skin while plumping the appearance of fine lines.

In some embodiments, these topicals 132 can include a LIQUID PANACEA Centella & Kombucha Firming Recovery Booster. This can be a super antioxidant booster supercharged with 6% Kombucha+White Tea, 5% Centella Stem Cells & Extract, Madecassoside and 3% Vitamin E, designed to repair and firm all skin types while reducing signs of premature ageing and fatigue. This can include, for example, 6% Kombucha+White Tea, which potent antioxidants protect, firm and brighten tired skin while strengthening the skin's delicate barrier and reducing effects of glycation; 5% Centella Stem Cells+Centella Extract, which promote repair and healing, soothe sensitivity, and rebuild skin barrier while improving the appearance of lines and wrinkles; 3% Vitamin E, which is a potent antioxidant that protects and brightens tired skin while strengthening the skin's delicate barrier; Madecassoside, which is a critical component of Centella Asiatica that stimulates repair and recovery of worn-out skin.

In some embodiments, these topicals 132 can include a GIFTED Acai & Sea Buckthorn Vitamin C Glow Oil. In some embodiments, this can be glow-inducing, brightening oil with a smart blend of 6 cold-pressed oils supercharged with 5% Vitamin C, 2% Vitamin E, & CoEnzyme Q10 Complex for visible skin radiance and nourishment. This can include, for example, 5% Vitamin C, which is a stable oil-soluble form of Vitamin C that penetrates deep into the skin to stimulate collagen production, brighten dark spots, and provide free radical protection; 2% Vitamin E, which is a potent antioxidant that protects and brightens tired skin while strengthening the skin's delicate barrier; Acai Oil, which is rich in vitamins and antioxidants, restores the skin's elasticity while boosting cell turnover and collagen production to give skin a glowing complexion; Organic Red Raspberry Oil, which is a powerful antioxidant oil that reduces the appearance of age spots and wrinkles to improve skin's elasticity and suppleness; CoEnzyme Q10, which is a potent antioxidant that acts against oxidative damage and protects skin against photo-ageing by stimulating collagen production; and Grapeseed+Squalane+Sea Buckthorn Oil, which are oils containing more than 100 bioactive nutrients, antioxidants, vitamins and minerals, and which penetrate deep within the skin to nourish and stimulate repair.

Figure 2:
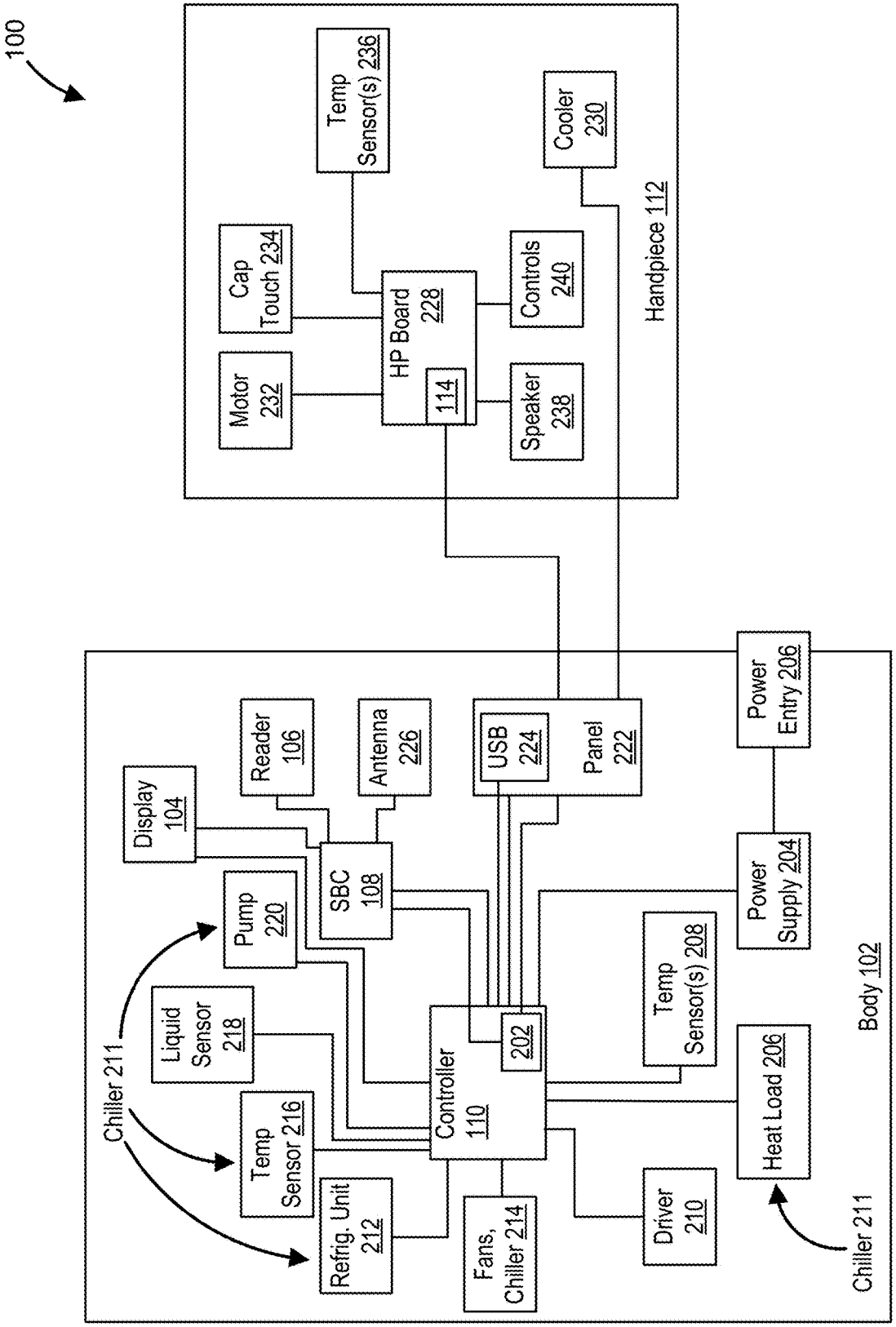
FIG. 2 is a schematic illustration of electrical components of the cooling treatment system.

With reference now to FIG. 2, a schematic illustration of electrical components of the cooling treatment system 100 is shown. The body 102 can include controller 110, which can comprise USB chip 202. The USB chip 202 can, convert communications to and from USB signals.

The controller 110 can receive power from power supply 204, which is connected to power entry 206. In some embodiments, power entry 206 can comprise any feature configured to receive power from a source external to the cooling treatment system 100 and deliver that power to the power supply 204. The power entry 206 can comprise, in some embodiments, a power cord or power plug.

The power supply 204 can supply power to the controller 110 and, via the controller 110 to some or all of the powered components of the cooling treatment system 100. The power supply can comprise an AC/DC converter, which can, for example, receive AC power from the power entry 206 and convert that AC power to DC. In some embodiments, the power supply 204 can comprise a 1000 W AC/24V DC converter.

The controller 110 can power, and communicate with a heat load 206 and a temperature sensor 208. The heat load 206 can comprise a heater configured to heat a portion of the chiller, and specifically configured to heat coolant traveling through the chiller. The heat load 206 can comprise a resistive heater that can, for example, comprise one or several resistive heating elements. The temperature sensor 208 can be configured to sense a temperature within the body 102, and specifically, a temperature of the heat load 206 and/or of coolant traveling through the heat load 206.

The controller 110 can further power a driver 210, which can drive one or several components of the cooling treatment system 100 including, for example a fan and/or a cooler.

The body 102 can include a chiller 211 which can be configured to chill a coolant to a coolant temperature within a target range. The chiller 211 can include multiple components powered and/or controlled by the controller 110 including, for example, a refrigeration unit 212, a pump 220, and a temperature sensor 216. In some embodiments, the chiller 211 can be cooled by one or several fans 214, which can be powered by the controller 110, and a level of the coolant in the chiller 211 can be detected by liquid sensor 218, which can be a liquid level sensor. In some embodiments, the chiller 211 can comprise a heat exchanger such as for example, a heat exchanger comprising a plurality of fins and a fan configured to blow air across the fins.

The controller 110 can provide regulated DC power to the SBC 108, the display 104, and the panel 222. The SBC 108, can in turn power the reader 106 and the antenna 226, and can communicate with each of the display 104, the reader 106, and the antenna 226. In some embodiments, these communications can comprise, for example, USB signals.

In addition to powering the panel, the controller 110 can maintain a communicating connection with the panel 222 and USB 224. In some embodiments, the panel 222 can comprise an interface through which the cable 111 can connect to the body 102. In some embodiments, for example, the cable 111 can be connected to the panel 222 such that a handpiece board 228, which is a circuit board in the handpiece 112 containing the hand controller 114 is powered and/or communicatingly connected to the controller 110 via the cable 111. In some embodiments, via the cable 111, the cooler 230 is powered and/or controlled by the controller 110.

The cooler 230 can be configured to control the cold plate temperature of the cold plate 116. In some embodiments, the cooler 230 can comprise a thermoelectric cooler (TEC), which can transfer heat energy way from the cold plate 116. In some embodiments, the cooler 230 can be configured to transfer this heat energy to a reservoir such as, for example, coolant circulated through the handpiece 112 from the chiller 211.

The handpiece 112 can further include a motor 232, capacitive touch sensor electronics 234, also referred to herein as a cap touch 234, one or several temperature sensors 236, a speaker 238, and one or several input features 240. In some embodiments, each of these components of the handpiece 112 can be powered and/or controlled by the controller 110.

The motor 232 can, in some embodiments be configured to provide haptic feedback and/or tissue vibration. In some embodiments, this vibration can be transferred to the tissue being treated. In some embodiments, these vibrations transferred to the tissue being treated can cause and effect on the tissue being treated. In some embodiments, this can include, for example, causing ice nucleation.

The cap touch 234 can comprise an electrical circuit that is electrically coupled to the cold plate 116. The cap touch 234 can include, for example, a capacitive touch sensor. In some embodiments, the cap touch 234 can be configured, such that the cap touch 234 senses a change in capacitance when the cold plate 116, or one of the tips 119 coupled to the cold plate 116, comes into contact with skin or is removed from contact with the skin. In some embodiments, this can enable an automatic start of treatment by determining when the handpiece 112 contacts the patient's skin or end of treatment as it is removed from the patient's skin. In some embodiments, and as a result to the detection of contact of the handpiece tip 116 with the patient's skin, the countdown time can be triggered.

In some embodiments in which a freeze or a cooling treatment is being provided, the cap touch 234 can detect when the cold plate 116, or one of the tips 119 coupled to the cold plate 116, comes into contact with skin. In such embodiments, the countdown timer can be started for that treatment step when contact is detected. In some embodiments in which dwell time is being provided, the cap touch 234 can detect when the cold plate 116, or one of the tips 119 coupled to the cold plate 116, is removed from contact with skin. In such an embodiment, the countdown timer can be started for the dwell time when the removal from contact is detected.

The temperature sensor(s) 236 can be configured to sense one or several temperatures in the handpiece 112. This can include, for example, sensing one or several temperatures of the cold plate 116 and/or one or several temperatures of the handpiece 112 such as, for example, a temperature of the cooler 230. In some embodiments, based on the sensed temperatures, the cooler 230 can increase or decrease its cooling of the cold plate 116.

The handpiece 112 further includes the speaker 238 and controls 240. The speaker 238 can comprise an output device configured to provide information to the user of the cooling treatment system 100. The controls 240 can comprise one or several input features, and specifically one or several buttons. In some embodiments, the user can manipulate the controls 240 to provide one or several inputs to the cooling treatment system 100, and the cooling treatment system 100 can provide information to the user via the speaker 238.

Figure 3:
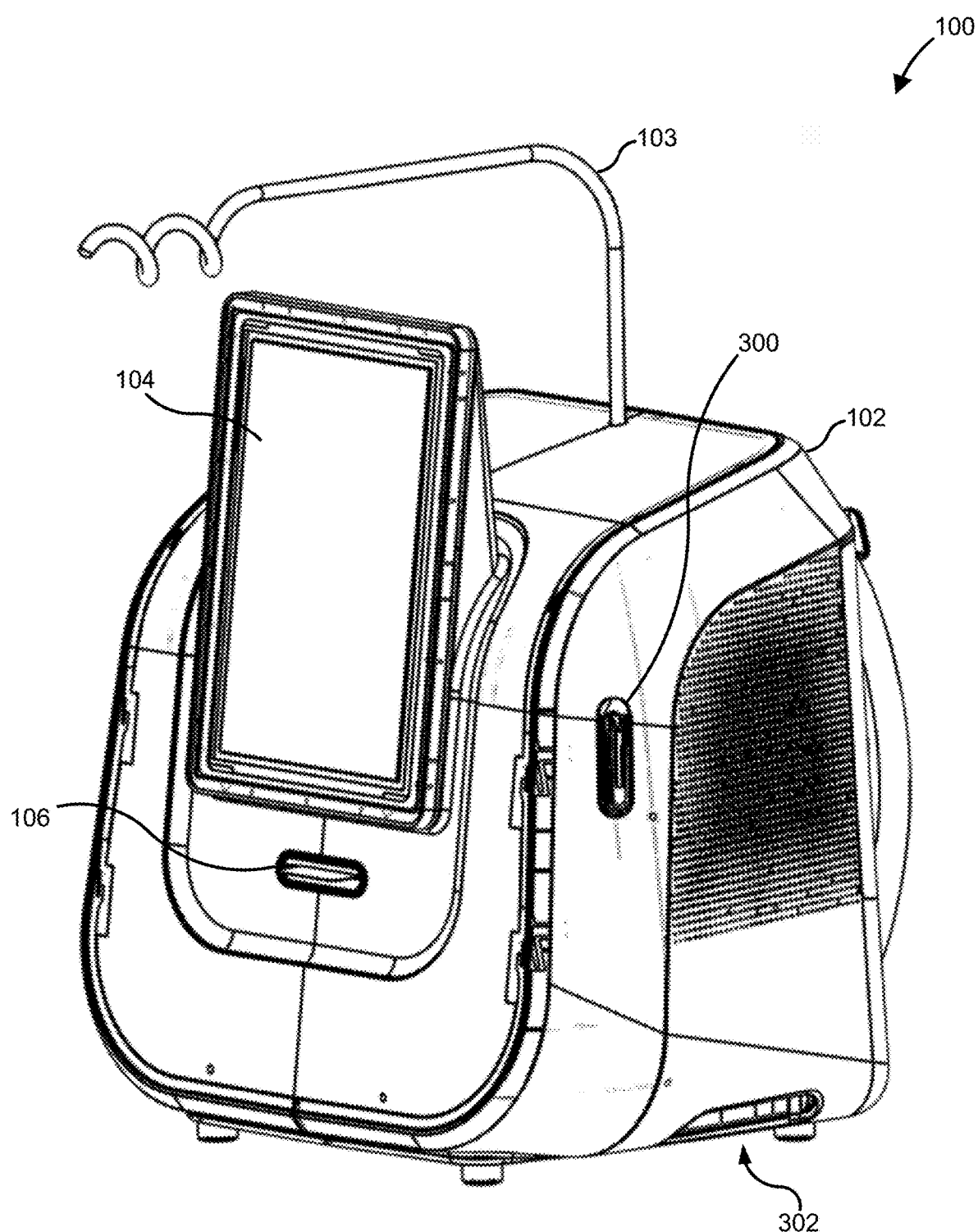
FIG. 3 is a perspective view of one embodiment of the cooling treatment system including a tabletop console.
Figure 4:
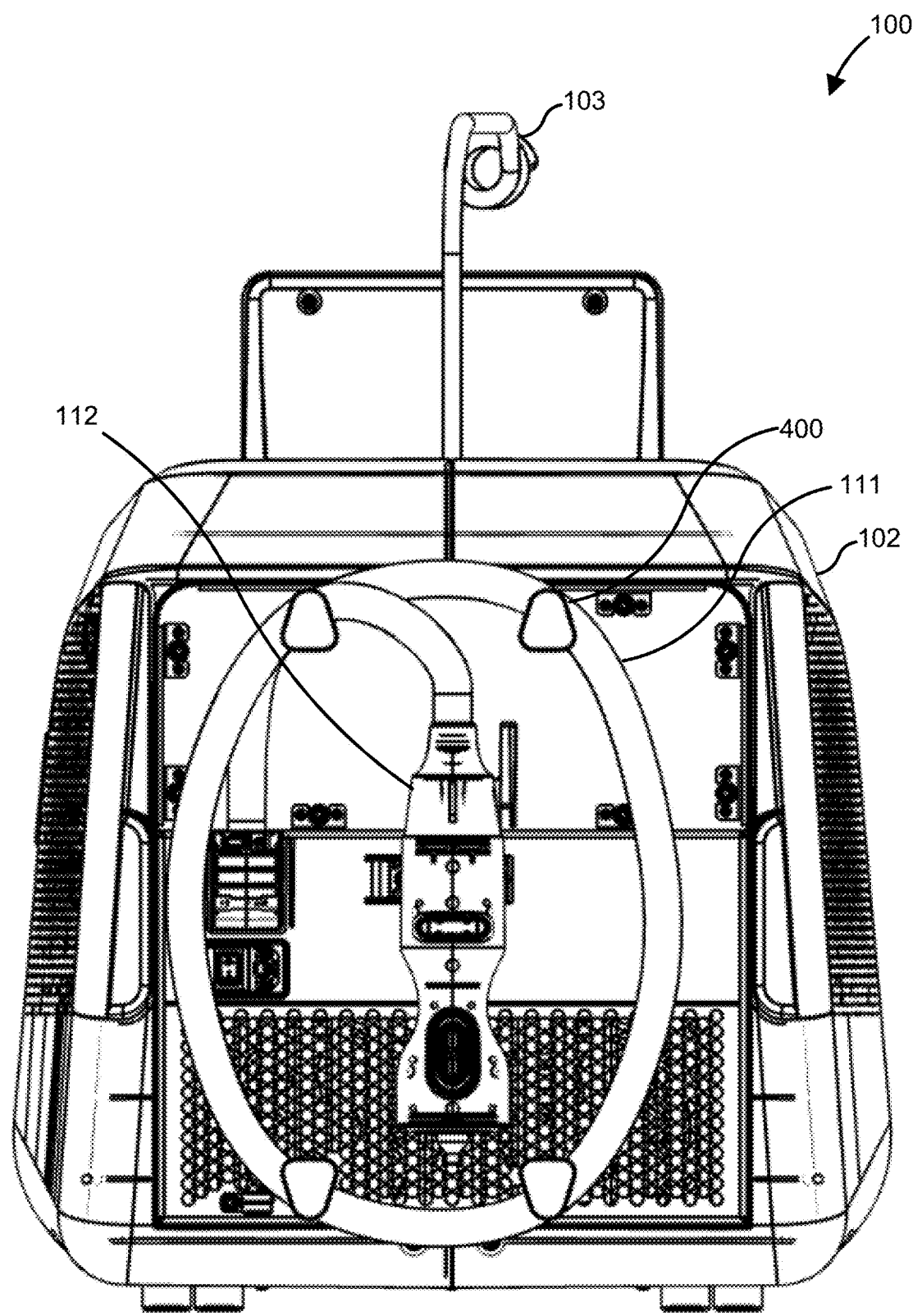
FIG. 4 is a back view of one embodiment of the cooling treatment system including a tabletop console.

FIGS. 3 and 4 show views of one embodiment of the cooling treatment system 100, and specifically of a tabletop embodiment of the cooling treatment system 100. With reference now to FIG. 3, a perspective view of one embodiment of the cooling treatment system 100 is shown. As seen, the cooling treatment system 100 includes the body 102, the display 104, and the reader 106. In the embodiment of FIG. 3, the reader 106 comprises a slot configured to receive the artifact 107, and specifically configured to receive a card such as a microprocessor card. The cooling treatment system 100 further includes a retention receptacle 300. The retention receptacle is configured to receive a portion of the handpiece 112 to hold, fix, and/or retain the handpiece 112. The cooling treatment system 100 further includes handles 302. In some embodiments, the handles 302 include a first handle located on a first side of the body 102 and a second handle located on a second, opposite side of the body 102. The handles 302 can be positioned such that a person can insert their fingers into the handles 302 and remove their fingers from the handles 302 when the body 102 is positioned on a flat surface.

With reference now to FIG. 4, a back view of one embodiment of the cooling treatment system 100 is shown. As seen, the cable 111 and the handpiece 112 are mounted to the body 102, and specifically, are mounted via a plurality of mounting brackets 400 to the body 102 of the cooling treatment system 100.

Figure 5:
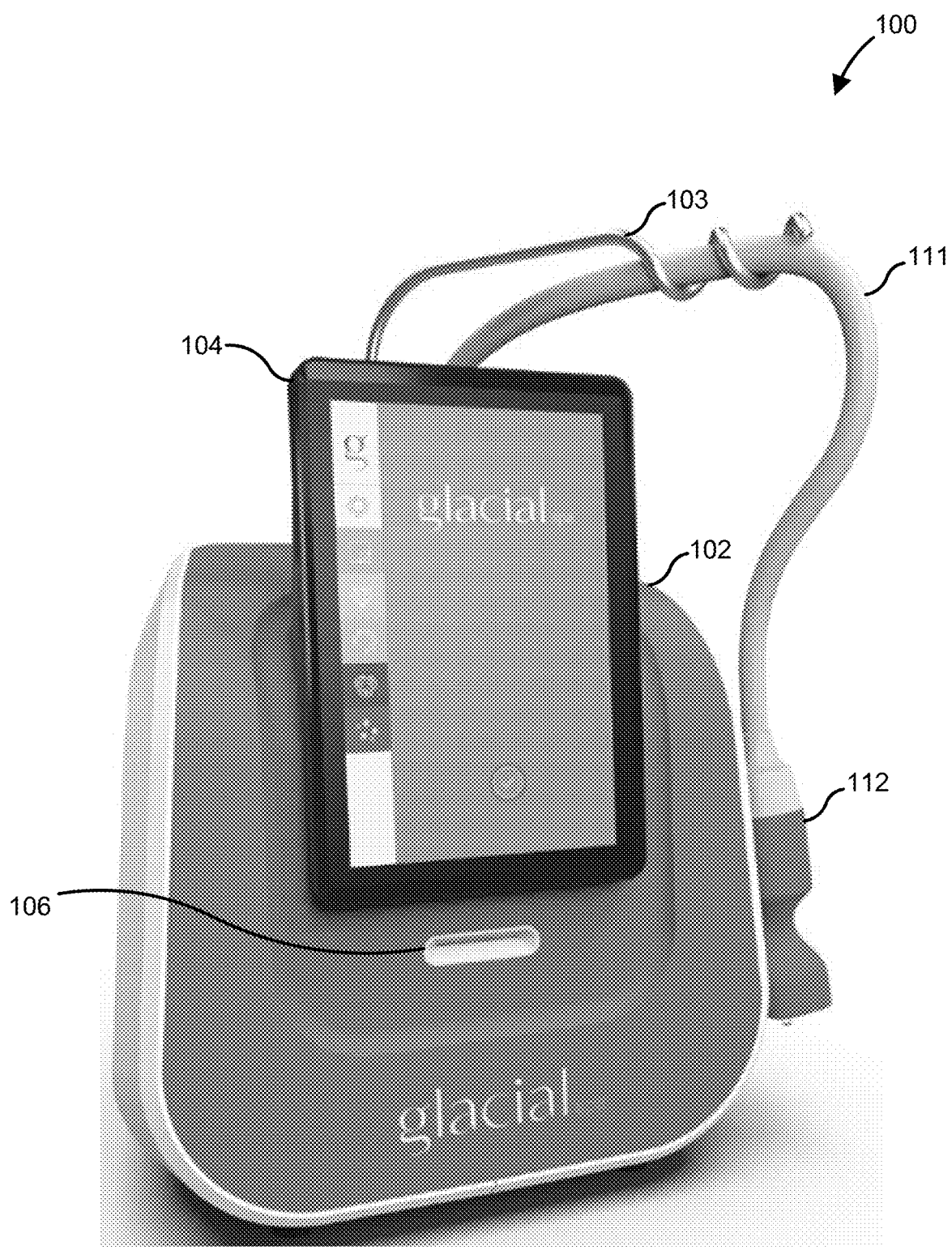
FIG. 5 is a perspective view of one embodiment of the cooling treatment system with cord in a boom.

With reference now to FIG. 5, a perspective view of one embodiment of the cooling treatment system 100 is shown. The cooling treatment system 100 includes the body 102, the boom 103, the display 104, and the reader 106. As seen in FIG. 5, the cable 111 extends through the boom 103 and is supported and/or partially supported by the boom 103. The handpiece 112 is connected to the side of the body 102 via, although not visible, the retention receptacle 300.

Figure 6:
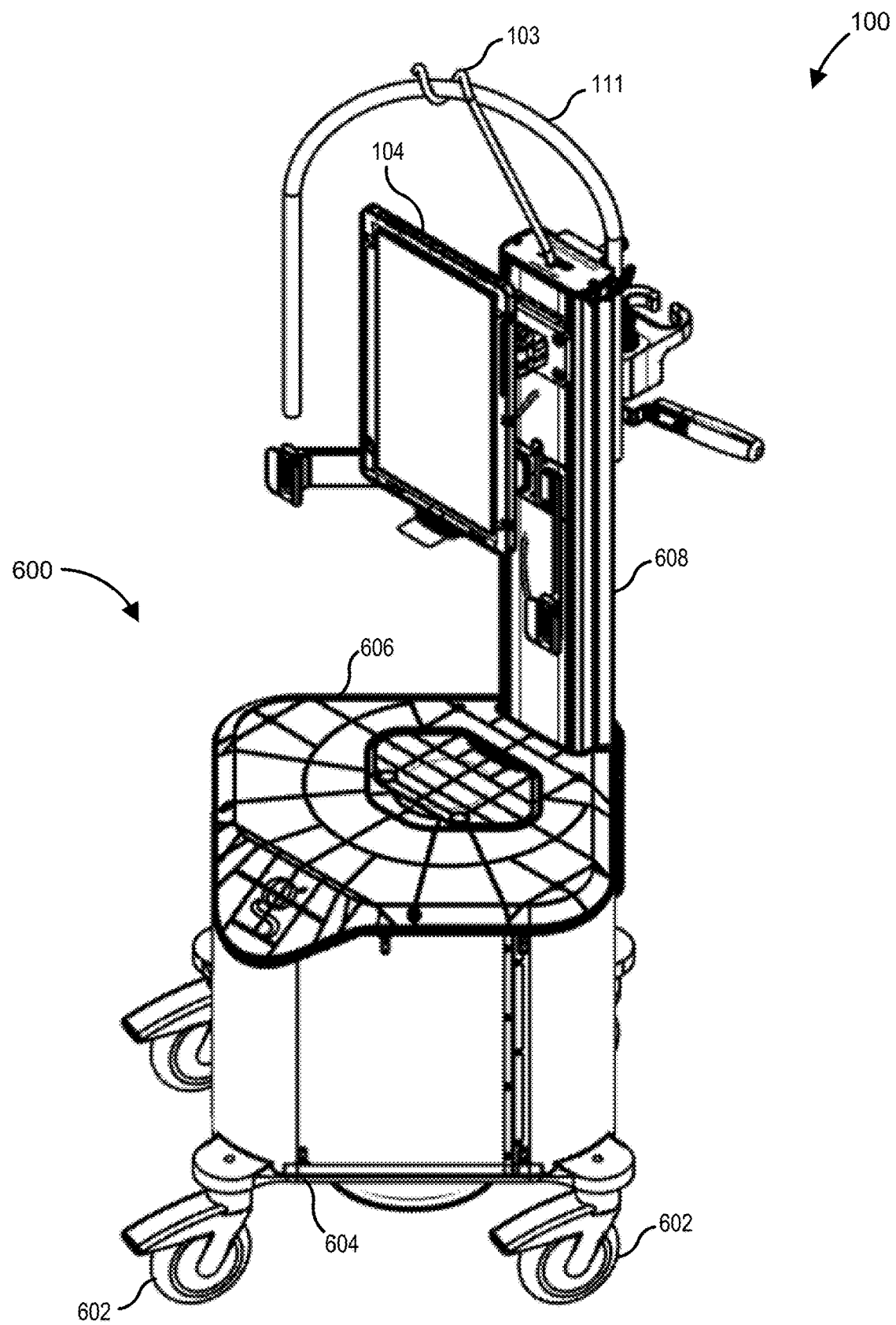
FIG. 6 is a perspective view of a floor-based cooling treatment system.

With reference now to FIG. 6, a perspective view of another embodiment of cooling treatment system 100, and specifically of a floor-based cooling treatment system 100. The cooling treatment system 100 includes a wheeled cart 600. The wheeled cart 600 can, in some embodiments, contain some or all of the components in the body 102 shown in FIGS. 1 and 2. As seen in FIG. 6, the wheeled cart 600 comprises a plurality of wheels 602 connected to a base 604. The housing 606 is mounted on the base 604. The housing 606 can contain, for example, the chiller 211, the power supply 204, the power entry 206, the controller 110, or the like.

A vertical support 608 can extend vertically from the housing 606. The vertical support 606 can be coupled to and can support the display 104 and the boom 103. In some embodiments, and as seen in FIG. 6, the cable 111 can be coupled to a portion of the vertical support 608.

Although both the embodiments of shown in FIGS. 3 through 6 are of cooling treatment systems 100, these embodiments can have different performance attributes. For example, the embodiments of FIGS. 3 through 5 may provide different cooling levels than the embodiment shown in FIG. 6. For example, the embodiment of FIGS. 3 through 5 may provide cooling/temperature control of the cold plate 116 from −10° C. to +40° C., whereas the embodiment of FIG. 6 may provide cooling/temperature control of the cold plate from −30° C. to +40° C. In some embodiments, however, all of the embodiments of FIGS. 3 through 6 may provide cooling/temperature control of the cold plate from −30° C. to +40° C.

Figure 7:
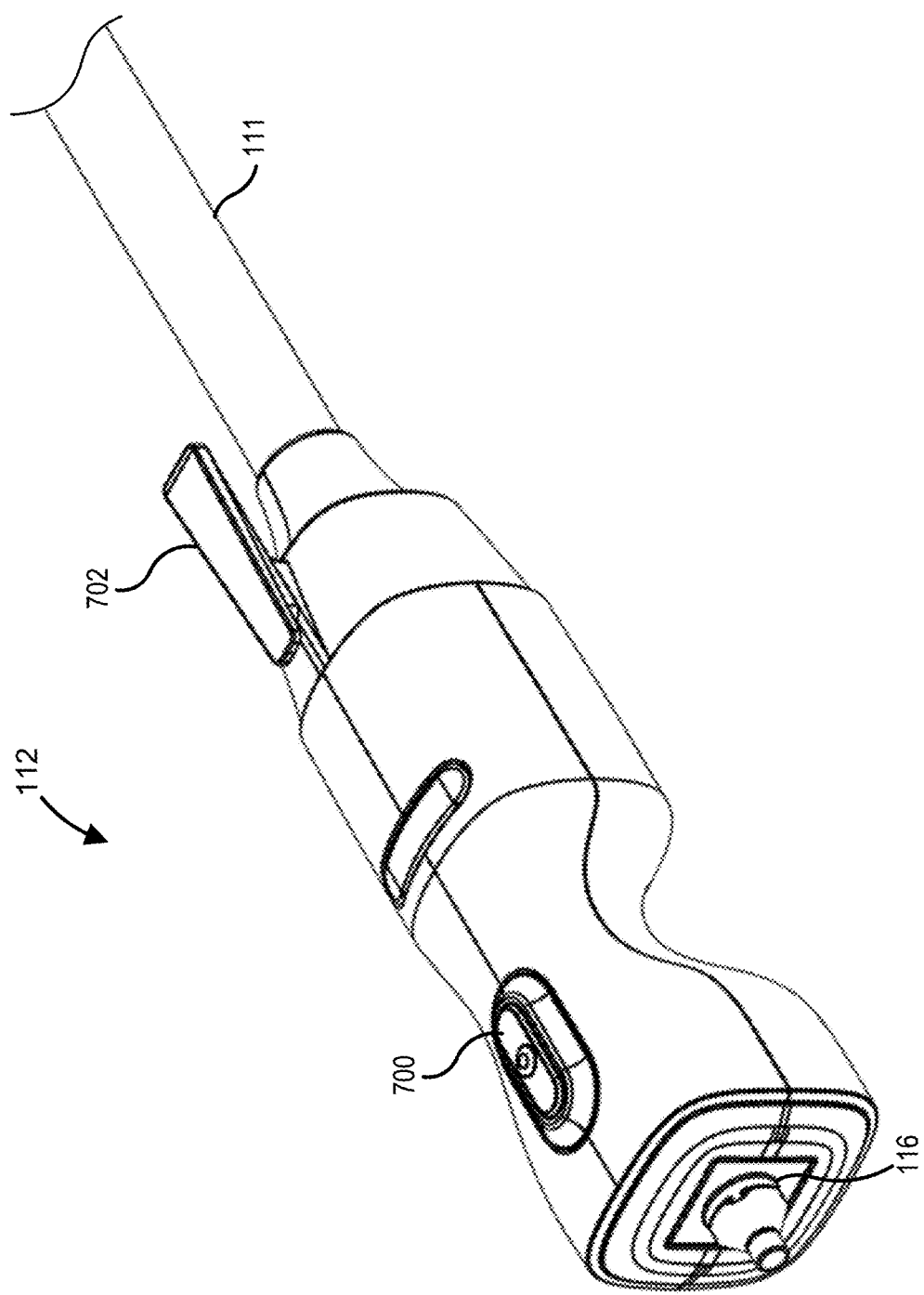
FIG. 7 is a perspective view of one embodiment of the handpiece.

With reference now to FIG. 7, a perspective view of one embodiment of the handpiece 112 is shown. As seen in FIG. 7, the handpiece 112 connects to the cable 111. The handpiece 112 include the cold plate 116. The cold plate 116 can be controllably cooled to enable the delivery of a cooling and/or freeze treatment.

The handpiece 112 further includes an input feature 700. In some embodiments, and as depicted in FIG. 7, this input feature can comprise a button. The handpiece 112 can further include a retention connector 702. The retention connector 702 can be received by the retention receptacle 300 to thereby couple the handpiece 112 to the console 102 and/or cart 600.

Figure 8:
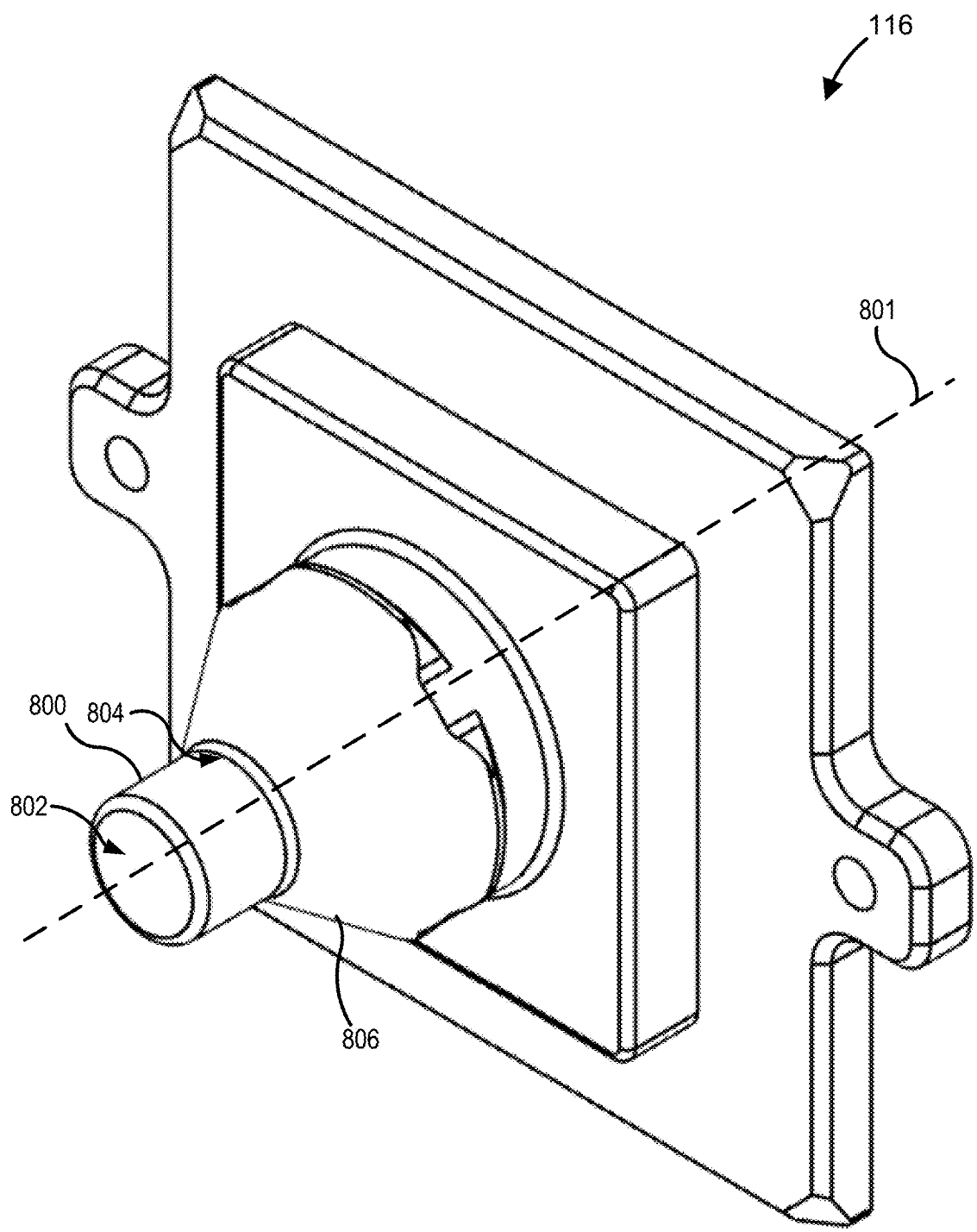
FIG. 8 is a perspective view of a cold plate.

With reference now to FIG. 8, a perspective view of the cold plate 116 is shown. The cold plate 116 includes a distal protrusion 800. The distal protrusion can comprise a cylindrical member extending along axis 801, and radially around axis 801. The distal protrusion 800 can comprise a distal end 802 and a proximal end 804. The distal end 802 can comprise a planar member that can, in some embodiments, extend perpendicular to the axis 801.

The proximal end 804 of the distal protrusion 800 can be coupled to a camming surface 806. The camming surface 806 can extend proximally and radially away from the proximal end 804 of the distal protrusion 800. The camming surface 806 can define a truncated cone, specifically, the camming surface comprising the frustum of the truncated cone. Thus, in some embodiments, the camming surface 806 is at least partially conical.

Figure 9:
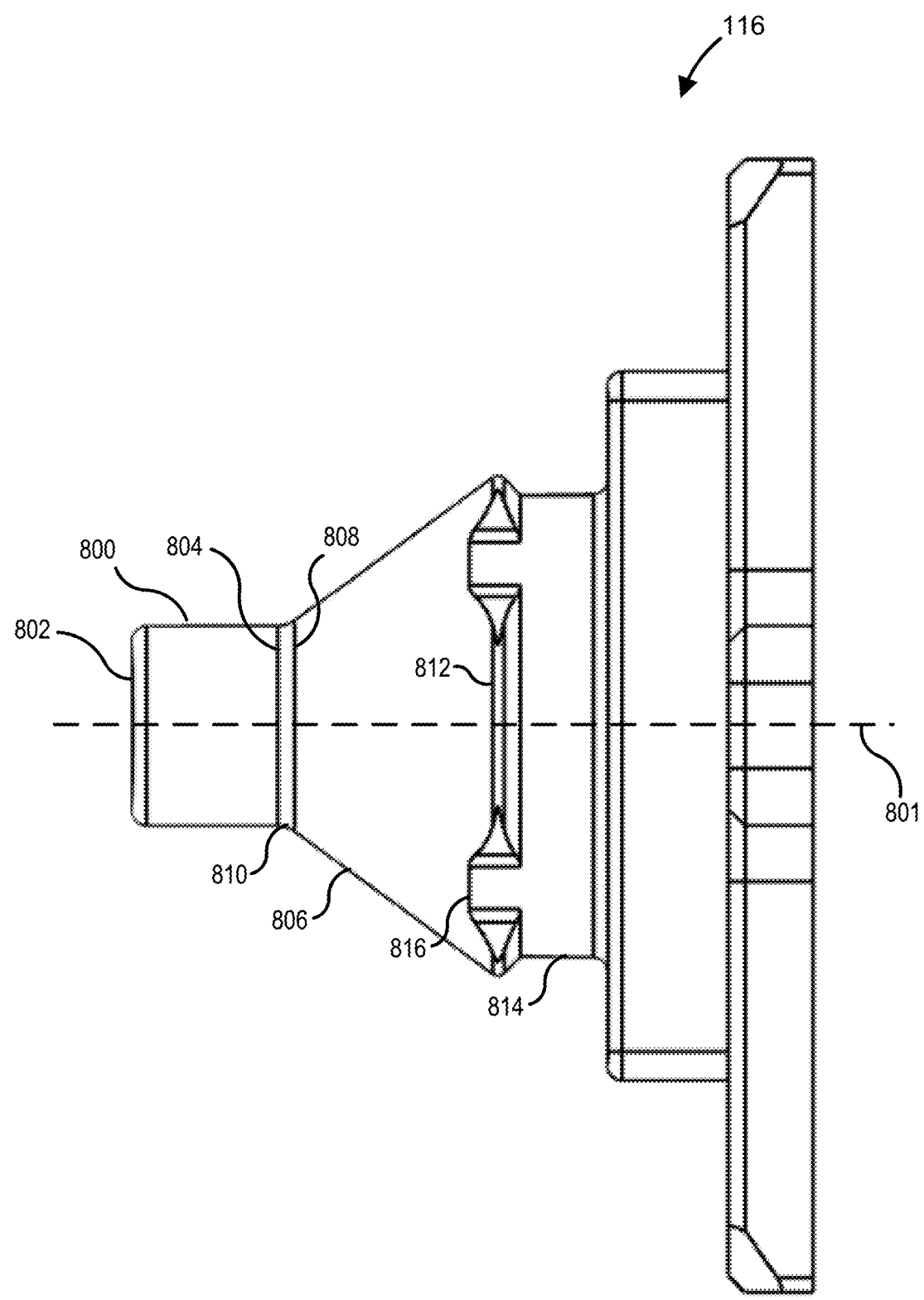
FIG. 9 is a side view of a cold plate.

As seen in FIG. 9, a side view of the cold plate 116, the camming surface 806 can have a distal end 808 which can connect directly or indirectly to the proximal end 804 of the distal protrusion 800. In the embodiment of FIG. 9, the distal end 808 of the camming surface 806 connects to the proximal end 804 of the distal protrusion via smoothing feature 810, which can comprise, for example, a blend or round. The camming surface 806 can further comprise a proximal end 812.

The cold plate 116 can further comprise a retention depression 814 extending proximally and radially inward from the proximal end 812 of the camming surface 806. Thus, a diameter of at least a portion of the retention depression 814 measured from the axis 801 can be less than a diameter of the proximal end 812 of the camming surface 806. In other words, the retention depression 814 can have a depth below the proximal end 812 of the camming surface 806.

In some embodiments, the cold plate 116 can further comprise a plurality of axial grooves 816 spread around the circumference of the proximal end 812 of the camming surface. In some embodiments, each of these axial grooves 816 can be located at a junction of the proximal end 812 of the camming surface 806 and the retention depression 814. In some embodiments, each of the axial grooves 816 can extend into the proximal end 812 of the camming surface 806 to a depth equal to a depth of the retention depression 814.

Figure 10:
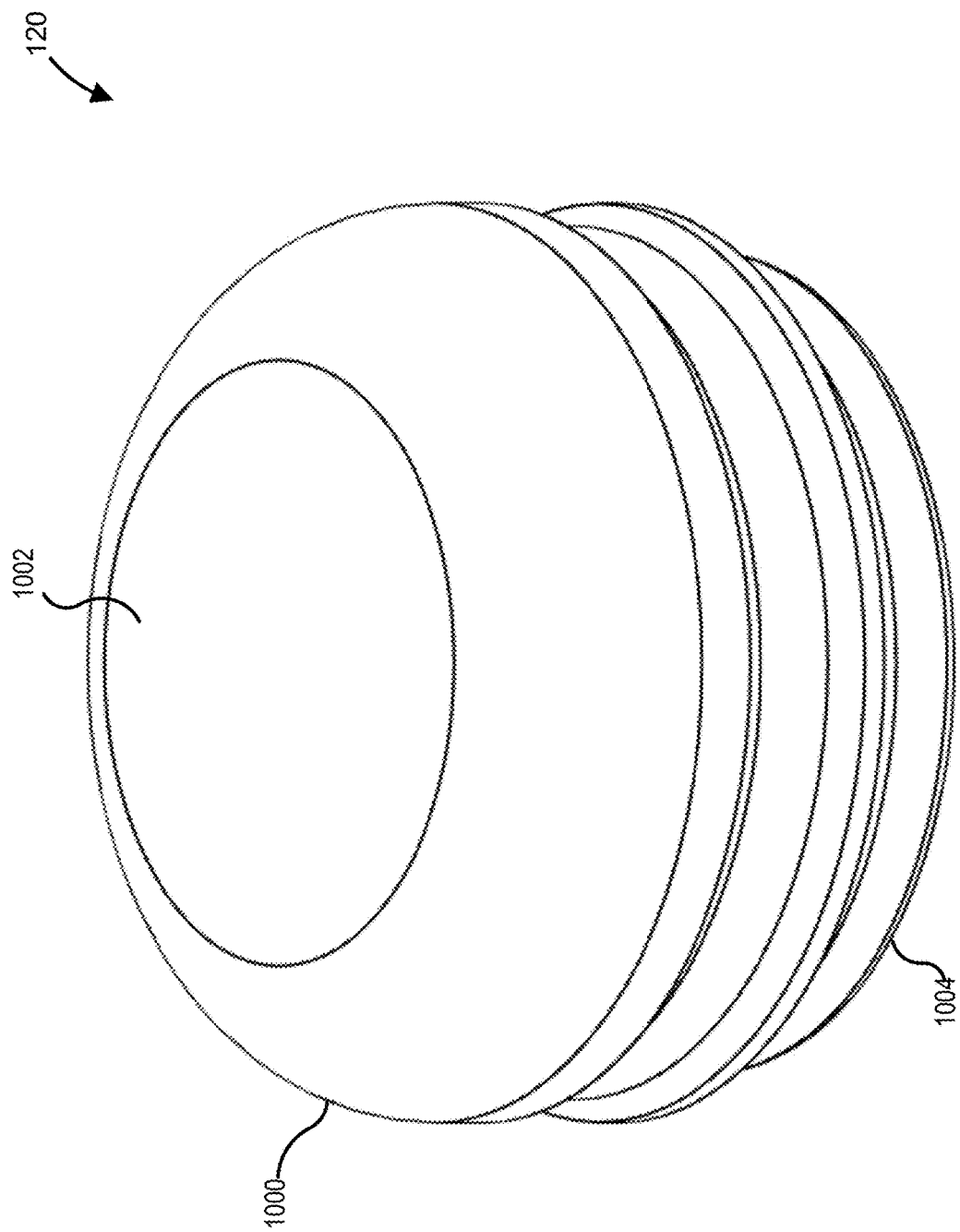
FIG. 10 is a perspective view of one embodiment of a smooth tip.

In some embodiments, the cold plate 116, and specifically the distal end 802 of the distal protrusion 800 can be directly applied to a patient's skin to provide a cooling and/or freeze treatments. In some embodiments, one or several treatment tips 119, also referred to herein as treatment caps 119 can be coupled to the cold plate 116 and directly applied to the patient's skin to provide a treatment that can include, for example, a dermabrasion treatment, a cooling treatment, and/or freeze treatment. With reference now to FIG. 10, a perspective view of one embodiment of a smooth tip 120 is shown. The smooth tip 120 can include an exterior housing 1000, a contact surface 1002, and a base 1004. The contact surface 1002 can comprise a variety of shapes and sizes. In some embodiments, the contact surface 1002 can comprise a circular surface that can comprise a diameter of, for example, between 5 mm and 40 mm, between 10 mm and 30 mm, or any other or intermediate diameter. In some embodiments, the contact surface 1002 can comprise a square or rectangular surface that can comprise a length and/or width between 5 mm and 40 mm, between 10 mm and 30 mm, or any other or intermediate sizes.

Figure 11:
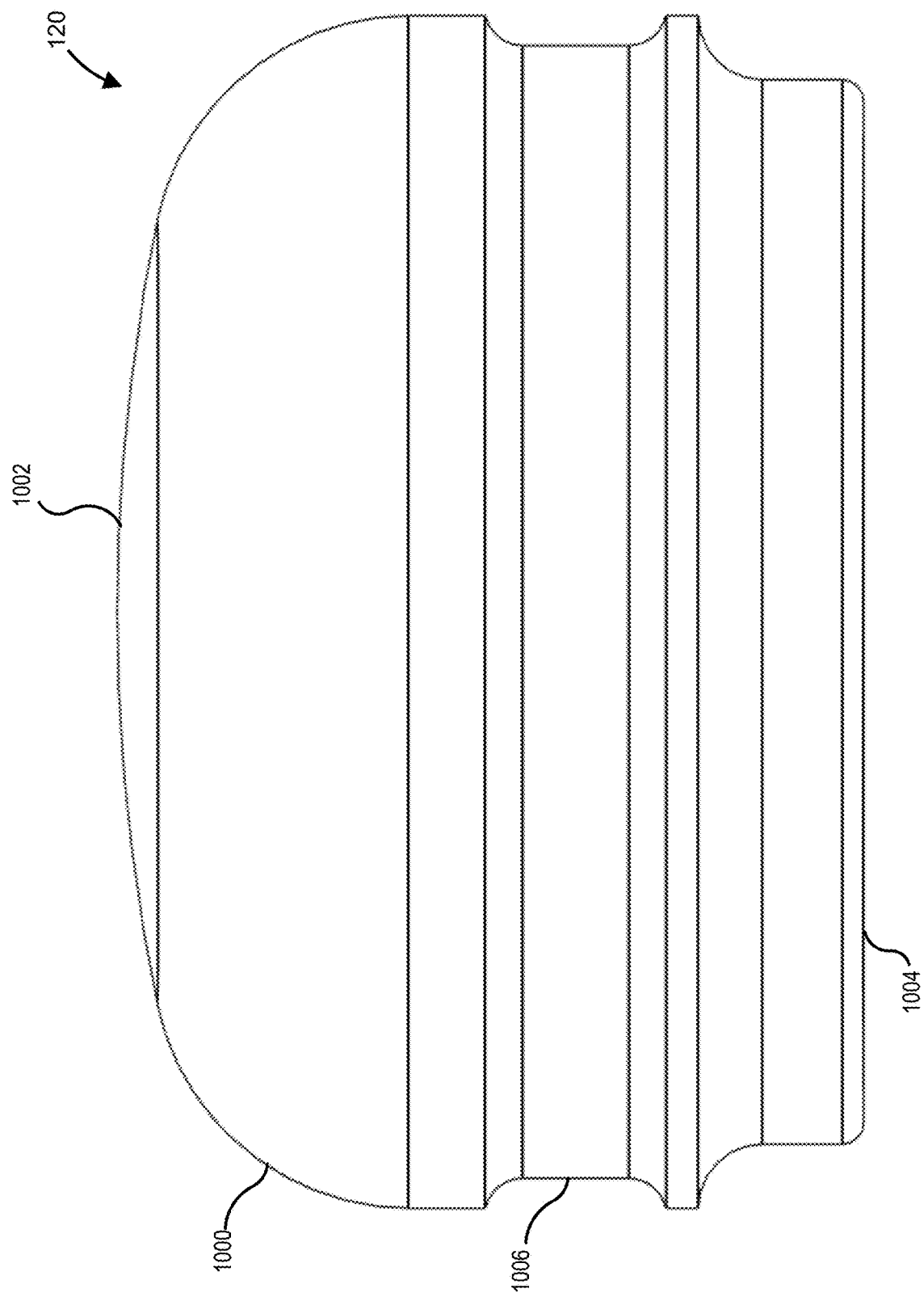
FIG. 11 is a side view of one embodiment of a smooth tip.

In some embodiments, the contact surface 1002 of the smooth tip 120 can be smooth. In some embodiments, the smooth tip 120 can have a roughness Rz of between 5 and 50 microns, between 10 and 40 microns, between 20 and 30 microns, approximately 25 microns +/−10 microns, approximately 25 microns +/−5 microns, or any other or intermediate value. As seen in FIG. 11, a side view of the smooth tip 120, the contact surface 1002 can, in some embodiments, be curved. The exterior housing 1000 of the smooth tip 120 can define a recess 1006 extending around housing 1000.

Figure 12:
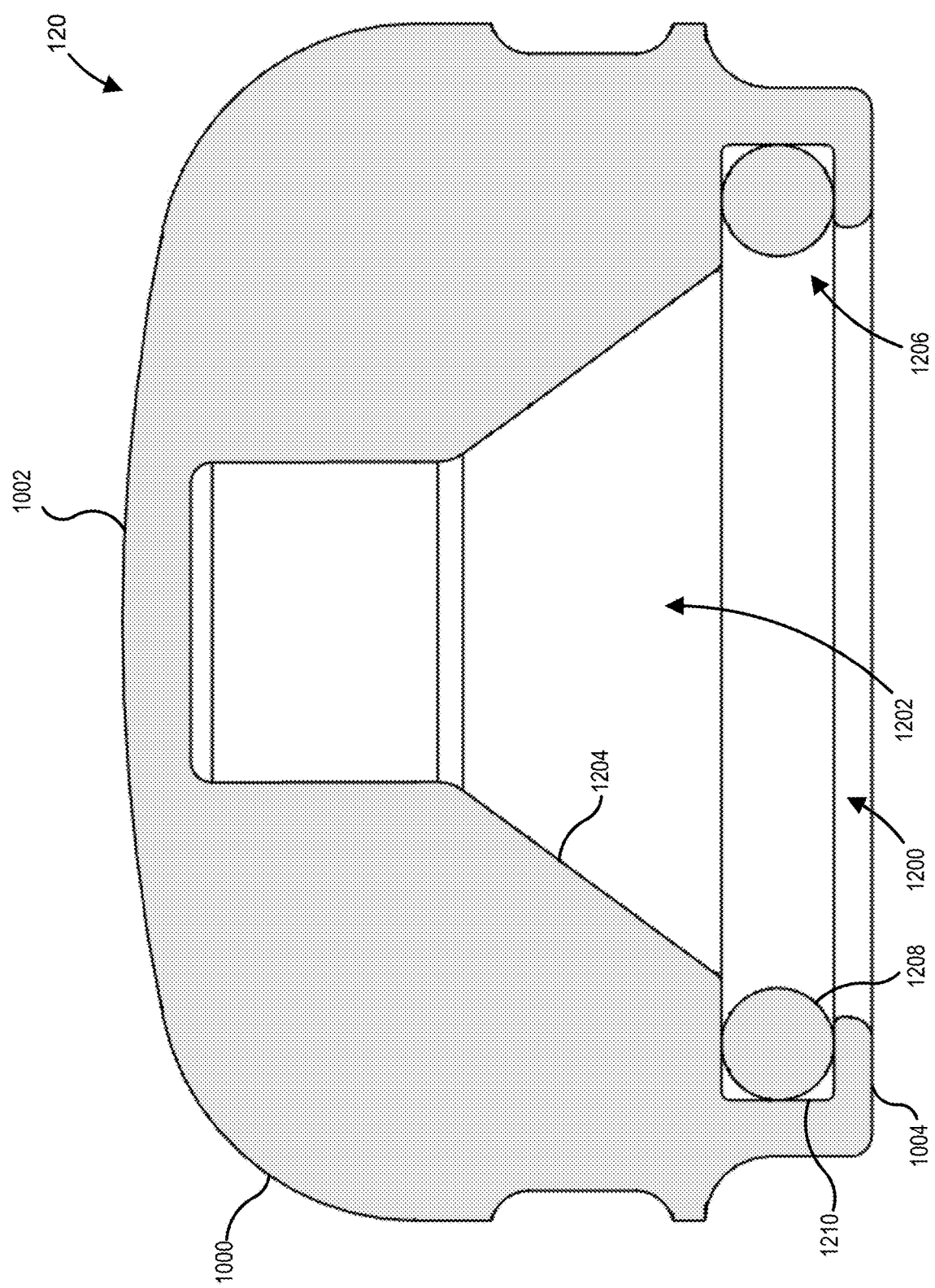
FIG. 12 is a section view of one embodiment of a smooth tip.

With reference now to FIG. 12, a section view of the smooth tip 120 is shown. As seen in FIG. 12, the housing 1000 can define an opening 1200 in the base 1004 of the housing 1000, which opening can extend into a receptacle 1202 defined by the housing 1000. The receptacle 1202 can be configured to receive the cold plate 116. The receptacle 1202 can be defined by mating surfaces 1204 having wholly or partially the same shapes as portions of the cold plate 116, and specifically of the distal protrusion 800 and the camming surface 806. These mating surfaces 1204 can be configured to mate with and/or directly or indirectly contact with the cold plate 116, and specifically with the distal protrusion 800 and/or the camming surface 806 to facilitate heat transfer from the smooth tip 120 to the cold plate 116. In some embodiments, the smooth tip 120 can be thermally coupled to the cold plate 116 via these mating surfaces 1204, and in some embodiments via a thermally conductive coupling fluid applied to the mating surfaces 1204 and/or to the cold plate 116.

The smooth tip 120, and specifically, the housing 1000 can comprise a retention feature 1206, which can, in some embodiments, comprise an compliant member coupled to the housing 1000. As specifically depicted in FIG. 12, the retention feature 1206 comprises a compliant member in the form of an O-ring 1208, such as a rubber O-ring, that is retained in a recess 1210 defined by the housing 1000. In some embodiments, this compliant member, and specifically O-ring 1208, can be configured to be received and retained within the retention depression 814 of the cold plate 116 when the smooth tip 120 is coupled to the cold plate 116. As will be discussed below, all of tips 119 can include similar retention features to allow those tips 119 to be coupled to the cold plate 116.

In some embodiments, for example, when the smooth tip 120 is coupled to the cold plate 116, the compliant member, and specifically the O-ring 1208, can engage with the camming surface 806, which can deform, and specifically can expand the diameter of the compliant member, and specifically the O-ring 1208. This deformation of the compliant member can occur until the cold plate 116 has been sufficiently inserted into the receptacle 1202 of the housing 1000 of the smooth 120 such that the compliant member, more specifically the O-ring 1208, is received within the retention depression 814. Due to the smaller diameter of the retention depression 814, the compliant member can return to its undeformed shape or to a less deformed shape. This can include the decreasing of the diameter of the O-ring. This return to an undeformed or to a less deformed shape retains the smooth tip 120 on the cold plate 116. The smooth tip 120 can be decoupled from the cold plate 116 by applying sufficient force to extract the compliant member from the retention depression 814.

In some embodiments, axial grooves 816 can facilitate the coupling and decoupling of the smooth tip from the cold plate. Specifically, these axial grooves 816 prevent the sealing of the compliant member, and specifically the O-ring 1208 around the cold plate 116. Preventing this sealing likewise prevents the creation of a vacuum when the smooth tip 120 is removed from the cold plate 116 or the creation of pressurized gas or fluid when the smooth tip 120 is coupled to the cold plate 116.

In some embodiments, absence of the axial grooves 816 can result in the entrapment of air between the cold plate and a treatment tip 119. The entrapped air can provide several disadvantages. Specifically, in embodiments in which the treatment tip 119 is thermally connected to the cold plate to enable the providing of cooling and/or freeze treatment, this entrapped air can decrease the thermal coupling between the cold plate and the treatment tip. Further, this entrapped air can decrease the stability of the connection of the treatment tip 119 to the cold plate.

FIGS. 13 through 19 shows views of an embodiment of a tip 119, and specifically of a textured tip 122. In some embodiments, the textured tip 122 can be sufficiently textured so as to abrade skin when the textured tip 122 is rubbed on the skin.

Figure 13:
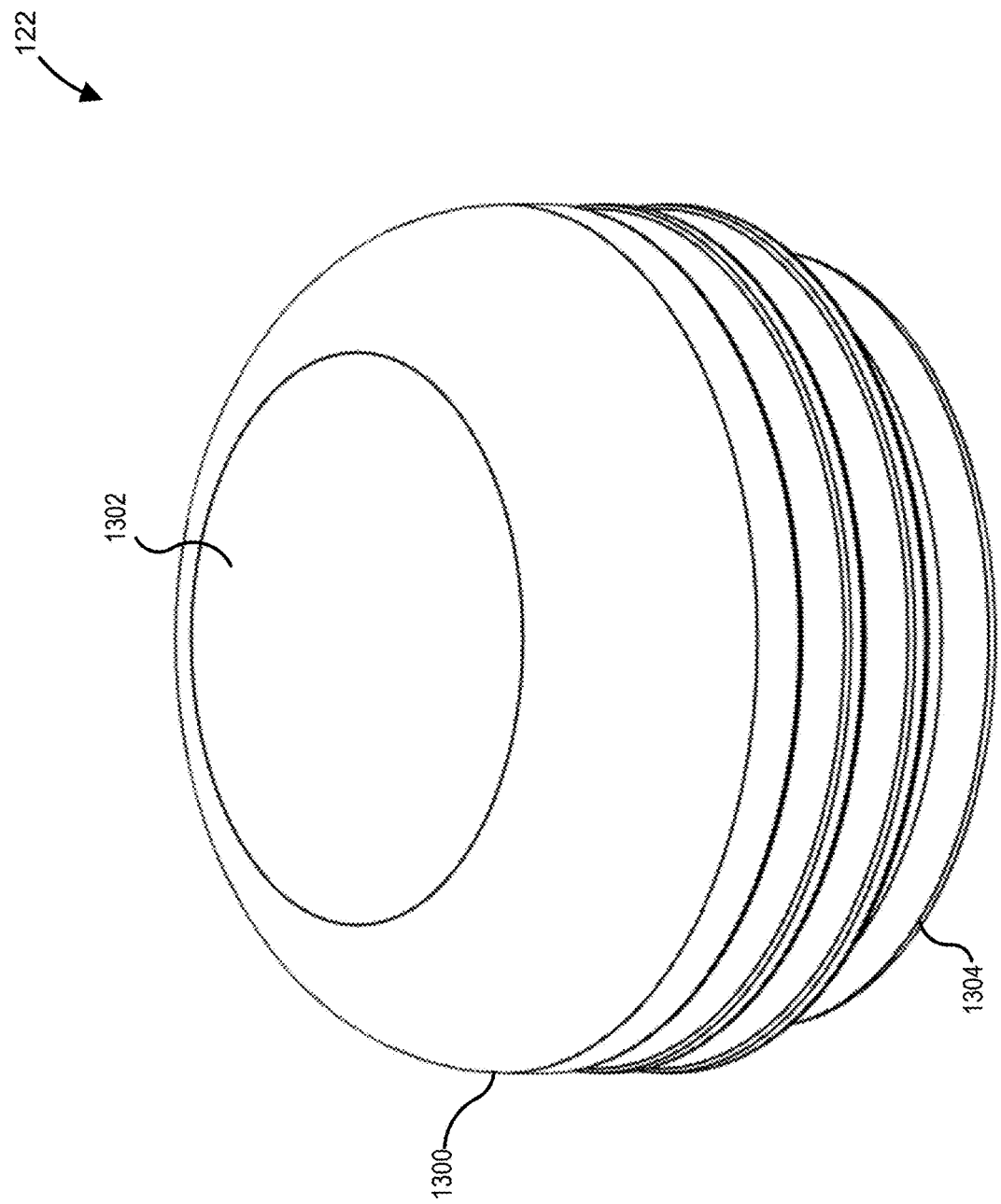
FIG. 13 is a perspective view of one embodiment of a textured tip.
Figure 14:
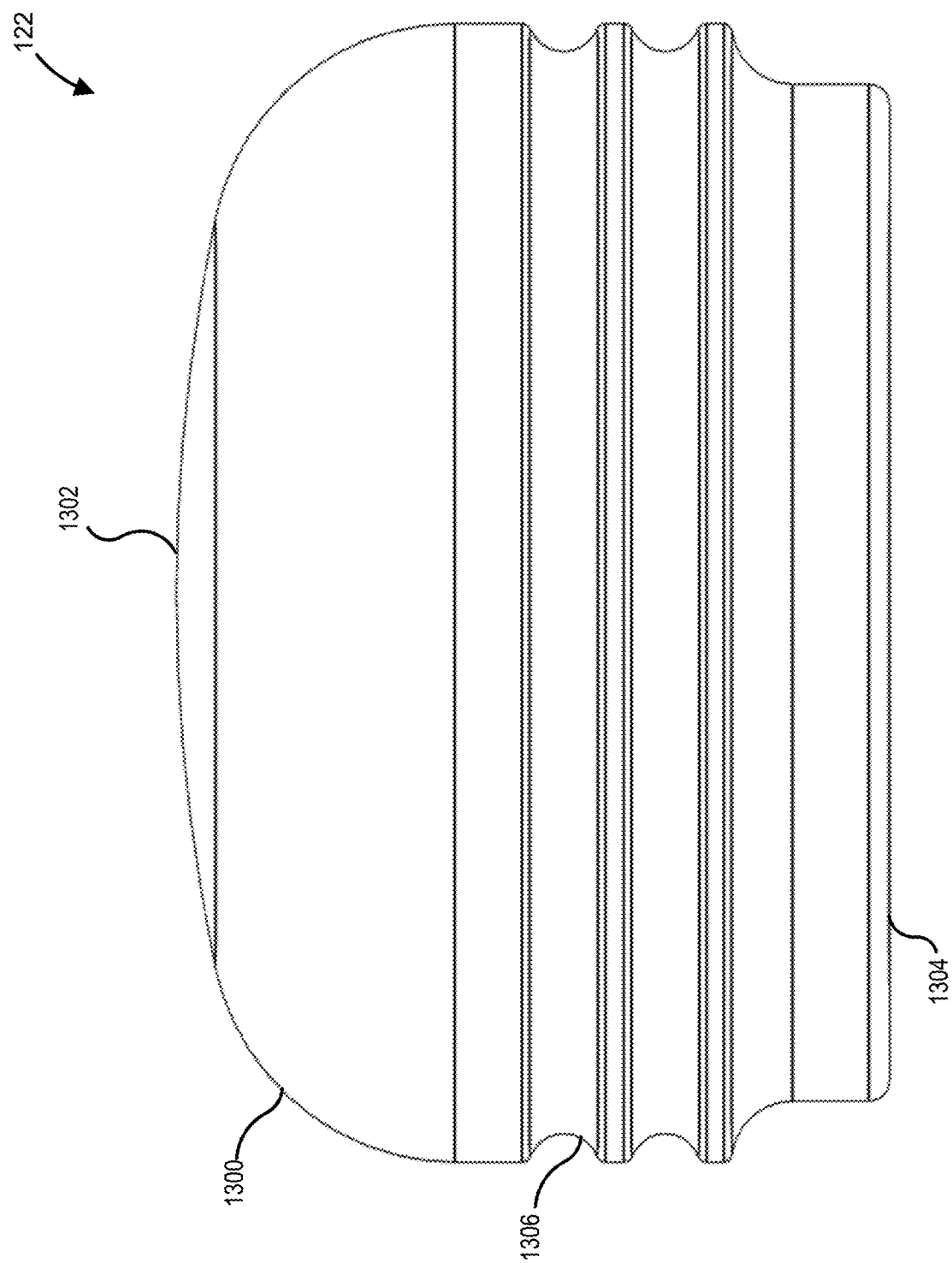
FIG. 14 is a side view of one embodiment of a textured tip.

As seen in FIG. 13, a perspective view of the textured tip 122 can include an exterior housing 1300, a contact surface 1302, and a base 1304. The contact surface 1302 can be flat, planar, non-planar, dimpled, concave, or convex. The contact surface 1002 can comprise a variety of shapes and sizes. In some embodiments, the contact surface 1002 can comprise a circular surface that can comprise a diameter of, for example, between 5 mm and 40 mm, between 10 mm and 30 mm, or any other or intermediate diameter. In some embodiments, the contact surface 1002 can comprise a square or rectangular surface that can comprise a length and/or width between 5 mm and 40 mm, between 10 mm and 30 mm, or any other or intermediate sizes. In some embodiments, the contact surface 1302 of the textured tip 122 can be textured. In some embodiments, the textured tip 122 can have a roughness Rz of between 50 and 270 microns, between 60 and 200 microns, between 70 and 150 microns, approximately 100 microns +/−20 microns, approximately 100 microns +/−10 microns approximately 100 microns +/−5 microns, approximately 80 microns +/−10 microns, approximately 80 microns +/−5 microns, approximately 75 microns +/−10 microns, approximately 75 microns +/−5 microns, or any other or intermediate value. As seen in FIG. 14, a side view of the textured tip 122, the contact surface 1302 can, in some embodiments, be curved. The exterior housing 1302 of the textured tip 122 can define a plurality of recesses 1306 extending around housing 1000. In some embodiments, the smooth tip 120 and the textured tip 122 can have a different number of recesses 1006, 1306 to enable easy visual or tactile differentiation between the smooth tip 120 and the textured tip 122.

Figure 15:
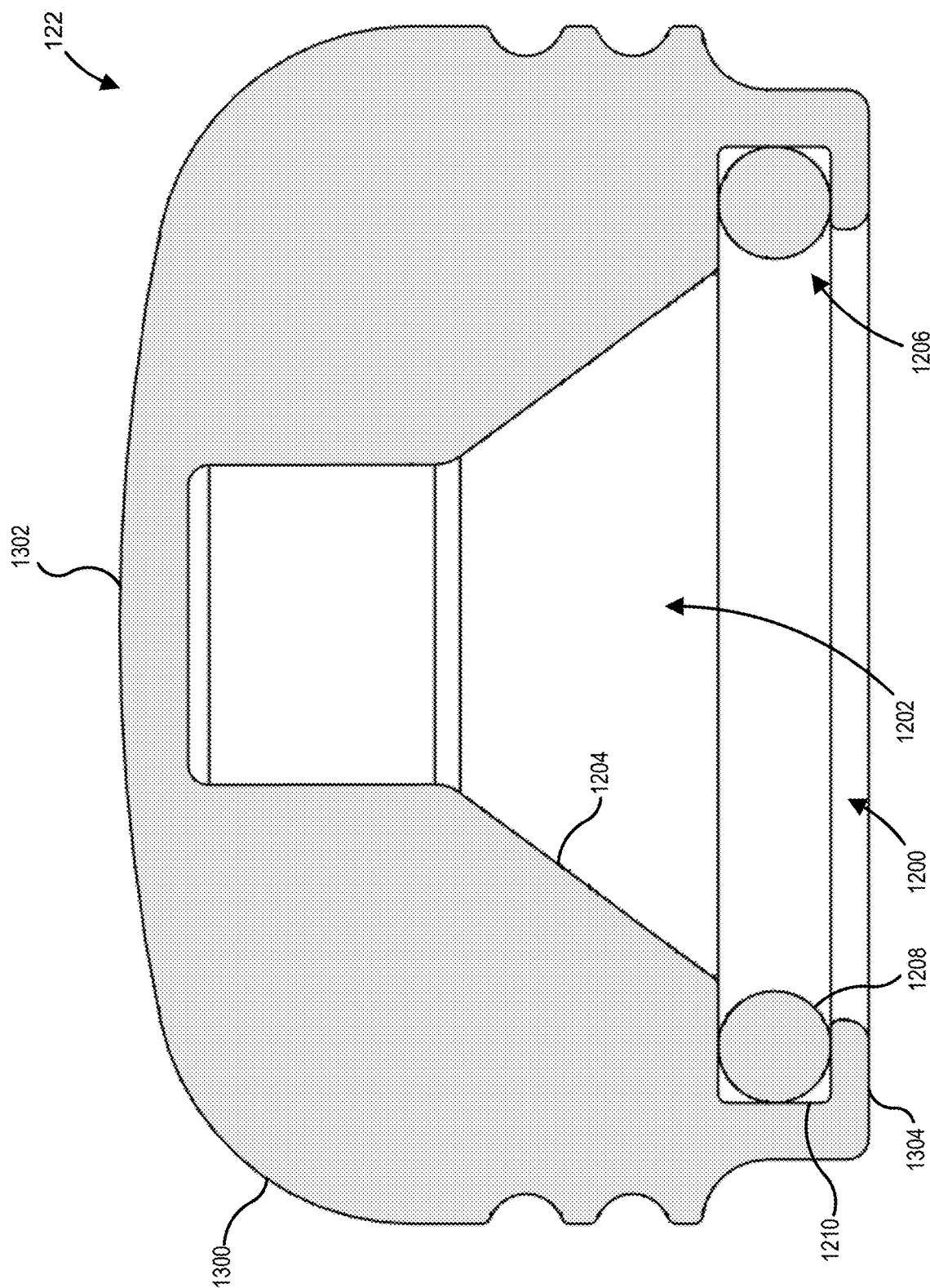
FIG. 15 is a section view of one embodiment of a textured tip.

With reference now to FIG. 15, a section view of the textured tip 122 is shown. As seen in textured tip 122, the housing 1300 can define an opening 1200 in the base 1304 of the housing 1300, which opening can extend into a receptacle 1202 defined by the housing 1300. The receptacle 1202 can be configured to receive the cold plate 116. The receptacle 1202 can be defined by mating surfaces 1204 having wholly or partially the same shapes as portions of the cold plate 116, and specifically of the distal protrusion 800 and the camming surface 806. These mating surfaces 1204 can be configured to mate with and/or directly or indirectly contact with the cold plate 116, and specifically with the distal protrusion 800 and/or the camming surface 806 to facilitate heat transfer from the smooth tip 120 to the cold plate 116. In some embodiments, the smooth tip 120 can be thermally coupled to the cold plate 116 via these mating surfaces 1204, and in some embodiments via a thermally conductive coupling fluid applied to the mating surfaces 1204 and/or to the cold plate 116.

The textured tip 122, and specifically, the housing 1300 can comprise a retention feature 1206, which can, in some embodiments, comprise an compliant member coupled to the housing 1300. As specifically depicted in FIG. 15, the retention feature 1206 comprises a compliant member in the form of an O-ring 1208, such as a rubber O-ring, that is retained in a recess 1210 defined by the housing 1300. In some embodiments, this compliant member, and specifically O-ring 1208, can be configured to be received and retained within the retention depression 814 of the cold plate 116 when the textured tip 122 is coupled to the cold plate 116.

In some embodiments, for example, when the textured tip 122 is coupled to the cold plate 116, the compliant member, and specifically the O-ring 1208, can engage with the camming surface 806, which can deform, and specifically can expand the diameter of the compliant member, and specifically the O-ring 1208. This deformation of the compliant member can occur until the cold plate 116 has been sufficiently inserted into the receptacle 1202 of the housing 1300 of the smooth 120 such that the compliant member, more specifically the O-ring 1208, is received within the retention depression 814. Due to the smaller diameter of the retention depression 814, the compliant member can return to its undeformed shape or to a less deformed shape. This can include the decreasing of the diameter of the O-ring. This return to an undeformed or to a less deformed shape retains the textured tip 122 on the cold plate 116. The textured tip 122 can be decoupled from the cold plate 116 by applying sufficient force to extract the compliant member from the retention depression 814.

In some embodiments, axial grooves 816 can facilitate the coupling and decoupling of the smooth tip from the cold plate. Specifically, these axial grooves 816 prevent the sealing of the compliant member, and specifically the O-ring 1208 around the cold plate 116. Preventing this sealing likewise prevents the creation of a vacuum when the textured tip 122 is removed from the cold plate 116 or the creation of pressurized gas or fluid when the textured tip 122 is coupled to the cold plate 116.

Figure 16:
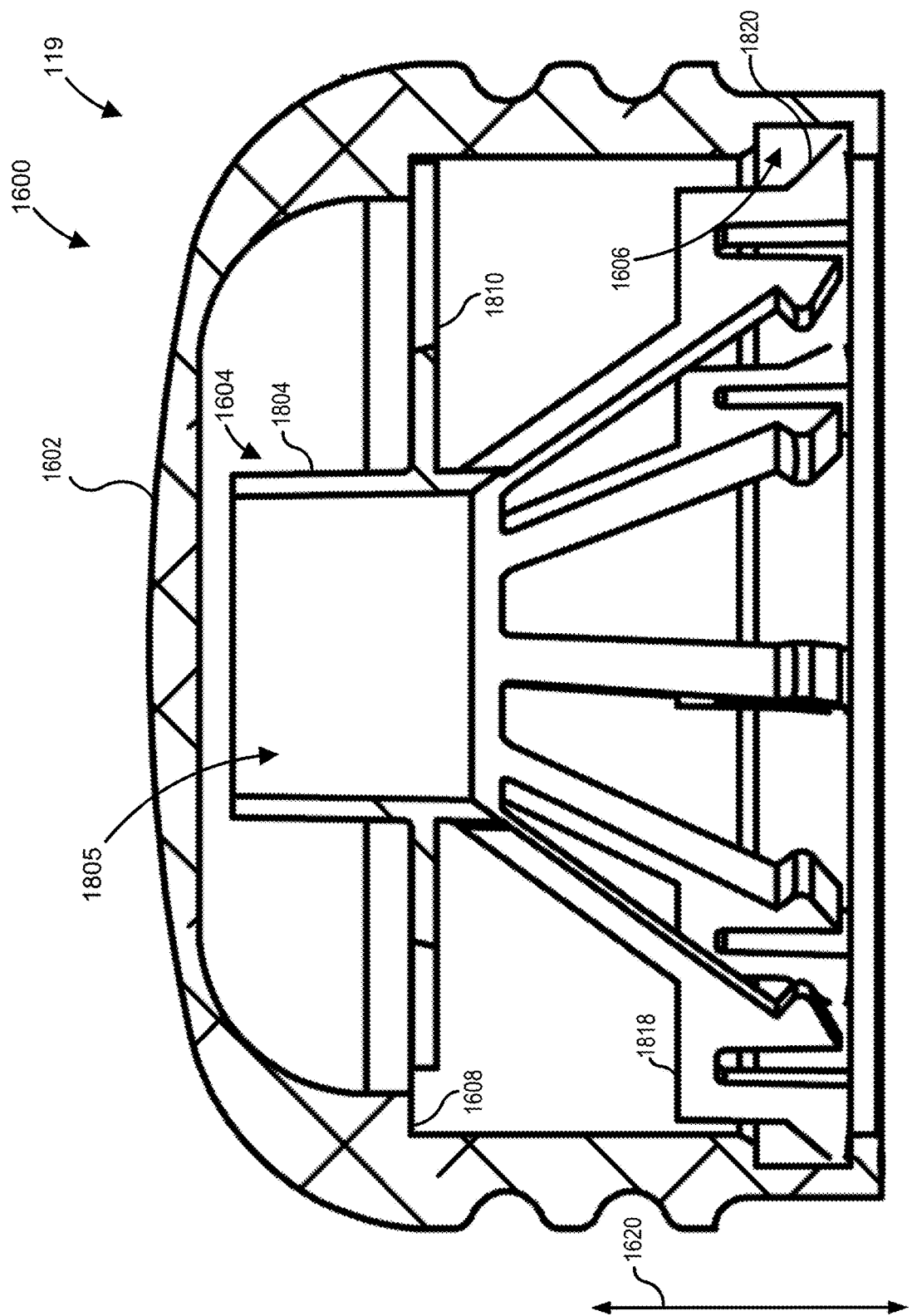
FIG. 16 is section view of one embodiment of an assembled suspension assembly tip.

With reference now to FIG. 16, a section view of one embodiment of a tip 199, and specifically of a suspension assembly tip 1600. The suspension assembly tip 1600 comprises a suspension tip 1602 and a suspension 1604. The suspension 1604 is configured to engage with both the suspension tip 1602 and the cold plate 116.

The suspension assembly tip 1600 provides several advantages, including, for example, selectively thermally isolating the suspension tip 1602 from the cold plate 116. In some embodiments, for example, the suspension 1604 can comprise a thermal insulator which can thermally isolate the suspension tip 1602 from the cold plate 116. Alternatively, in some embodiments, the suspension 1604 can comprise thermal conductor to thereby closely thermally couple the suspension tip 1602 to the cold plate 116. In some embodiments, the suspension tip 1602 is thermally isolated from the cold plate 116 when the suspension tip 1602 maintains a surface temperature at or above 20° C., at or above 10° C., at or above between 10° C. and 20° C., or any other or intermediate temperature while a treatment is being provided. In some embodiments, the suspension tip 1602 is thermally isolated from the cold plate 116 when the suspension tip 1602 maintains a surface temperature at or above 20° C., at or above 10° C., at or above between 10° C. and 20° C., or any other temperature above the temperature of the cold plate 116 and/or above the temperature of the cold plate 116 and below the temperature of the patient's skin. In some embodiments, the suspension tip 1602 can be sufficiently thermally isolated so as to maintain a surface temperature at or above 20° C. when the cold plate 116 is at a temperature from between 20° C. to −30° C. In some embodiments, the suspension tip 1602 is closely thermally coupled to the cold plate 116 when the suspension tip does not maintain a surface temperature at or above 20° C. while a treatment is being provided.

In some embodiments, the suspension assembly tip 1600 can further more consistently and uniformly apply force to a treatment area. Specifically, as the suspension assembly tip 1600 is moved across the treatment area, the suspension 1604 can allow the suspension tip 1602 to move with respect to the cold plate 116 to thereby adjust to the topography of the treatment area. This results in move consistent contact between the suspension tip 1602 and the skin in the treatment area, and more consistent forces between the suspension tip 1602 and the skin in the treatment area.

The suspension tip 1602 can comprise exterior housing 1300, a contact surface 1302, and a base 1304. The contact surface 1302 can be flat, planar, non-planar, dimpled, concave, or convex. The contact surface 1002 can comprise a variety of shapes and sizes. In some embodiments, the contact surface 1002 can comprise a circular surface that can comprise a diameter of, for example, between 5 mm and 40 mm, between 10 mm and 30 mm, or any other or intermediate diameter. In some embodiments, the contact surface 1002 can comprise a square or rectangular surface that can comprise a length and/or width between 5 mm and 40 mm, between 10 mm and 30 mm, or any other or intermediate sizes. In some embodiments, the contact surface 1302 can be smooth or can be textured. In some embodiments, the textured tip 122 can have a roughness Rz of between 50 and 270 microns, between 60 and 200 microns, between 70 and 150 microns, approximately 100 microns +/−20 microns, approximately 100 microns +/−10 microns approximately 100 microns +/−5 microns, approximately 80 microns +/−10 microns, approximately 80 microns +/−5 microns, approximately 75 microns +/−10 microns, approximately 75 microns +/−5 microns, or any other or intermediate value.

Figure 17:
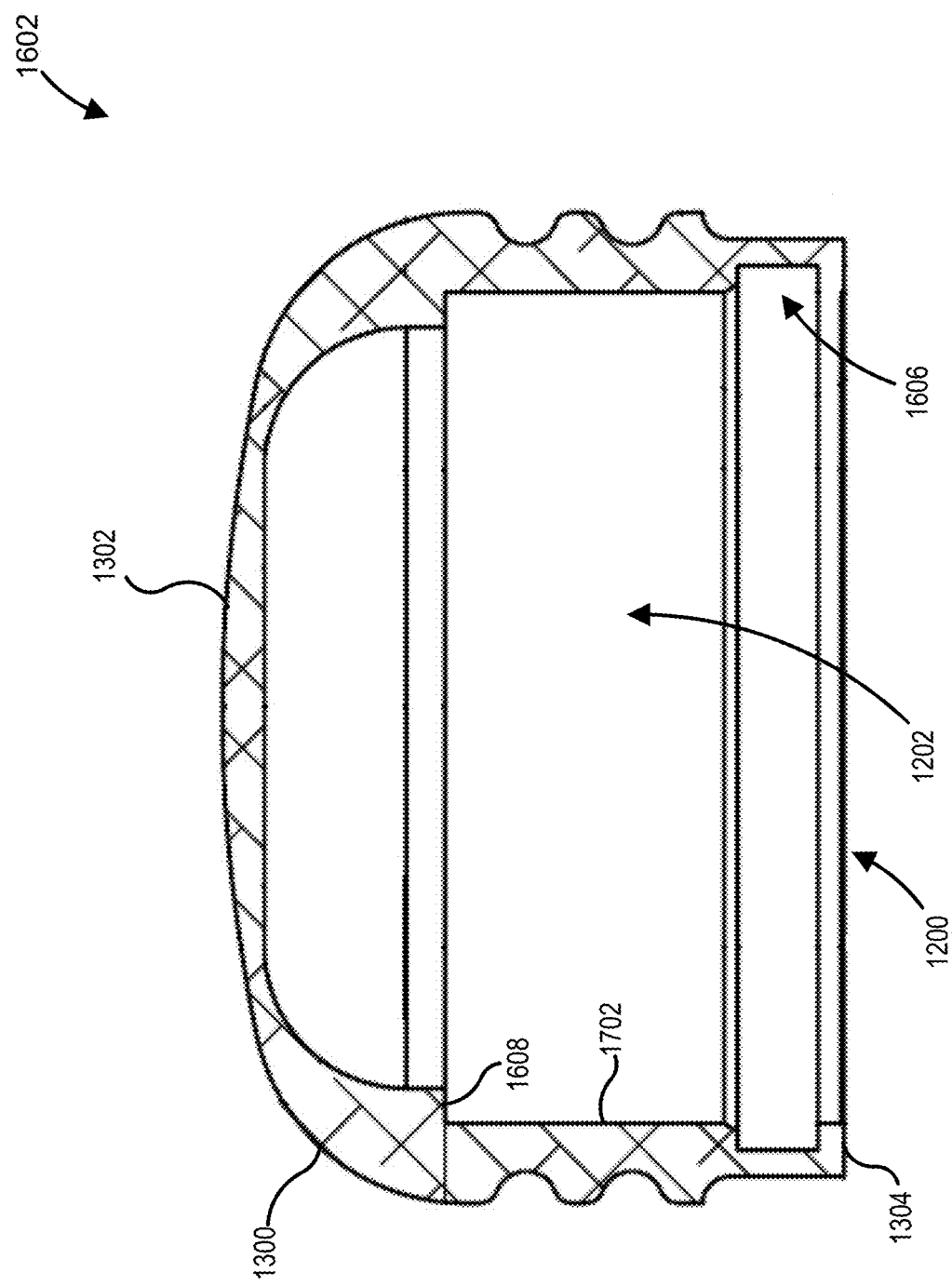
FIG. 17 is a section view of one embodiment of a suspended tip.

As seen in FIG. 17, the housing 1300 can define an opening 1200 in the base 1304 of the housing 1300, which opening can extend into a receptacle 1202 defined by the housing 1300, and specifically by an interior wall 1702 of the housing 1300. The receptacle 1202, which can be defined by, and/or formed in the interior wall 1702 of the housing 1300, can be configured to hold and/or engage with the suspension 1604 and to receive the cold plate 116.

In some embodiments, the receptacle 1202 can include a retention groove 1606 configured to engage with a portion of the suspension 1604 to couple the suspension 1604 to the suspension tip 1602, and a suspension lip 1608. Each of the suspension lip 1608 and the retention groove 1606, as shown in FIG. 17, can be formed in and/or by the interior wall 1702 of the housing. In some embodiments, the suspension lip 1608 can be formed in the interior wall 1702 of the housing 1300 at a position relatively more proximate to the contact surface 1302 than to the base 1304 of the housing 1300. In some embodiments, the suspension groove 1606 can be formed in the interior wall 1702 of the housing 1300 at a position relatively more proximate to the base 1304 of the housing than to the contact surface 1302 of the housing 1300.

The suspension groove 1606 can be sized and shaped to receive and retain a tip coupling feature such as external connector 1820 of the suspension 1604. In some embodiments, the suspension groove 1606 can be a size and/or shape to allow some movement of the tip coupling feature with respect to the suspension groove 1606, and/or with respect to the suspension 1606. When the suspension assembly tip 1600 is connected to the cold plate 116, then the suspension groove 1606 can be sized and/or shaped to allow some movement of the suspension tip 1602 with respect to the cold plate 116. In some embodiments, both the tip coupling feature and the suspension groove 1606 can be sized and/or shaped to allow the tip coupling features to move, for example, up to: 1 mm 2 mm, 3 mm, 4 mm, 5 mm, 6 mm, 7 mm, or any other or intermediate distance with respect to the suspension groove. In some embodiments this movement can be in the direction indicated by arrow 1620.

The suspension lip 1608 can be configured to engage with one or several features of the suspension 1604 to thereby suspend the suspension tip 1602. The suspension lip 1608 can extend around all or portions of the receptacle 1202. In some embodiments, the suspension lip 1608 can circumferentially extend around an interior of the receptacle 1202 to form a continuous rim that can engage with one or several suspension members 1810. The one or several suspension members 1810 can each comprise, for example, a flexible element extending from a central member 1804 of the suspension 1604. In some embodiments, each of the suspension members 1810 can comprise a torsion bar configured to apply force to the suspension lip 1608 to bias the suspension tip 1602 towards a stable position. In some embodiments, the suspension 1604 drives the suspension tip 1602 to the stable position when no external force is applied to the suspension tip 1602.

In some embodiments, the suspension lip 1608, the suspension groove 1606, and the suspension 1604 are sized and shapes such that when the suspension 1604 is received within the receptacle 1202 and the tip coupling features are received within the suspension groove 1606, the suspension members 1810 are preloaded. In some embodiments, this preload can be manifest in a deflection of one or several of the suspension members 1810 when the suspension tip 1602 is in the stable position. In some embodiments, the suspension members 1810 can be preloaded such that a force of less than 6 ounces applied to the suspension tip 1602 does not result in any additional deflection of the suspension members 1810.

Figure 18:
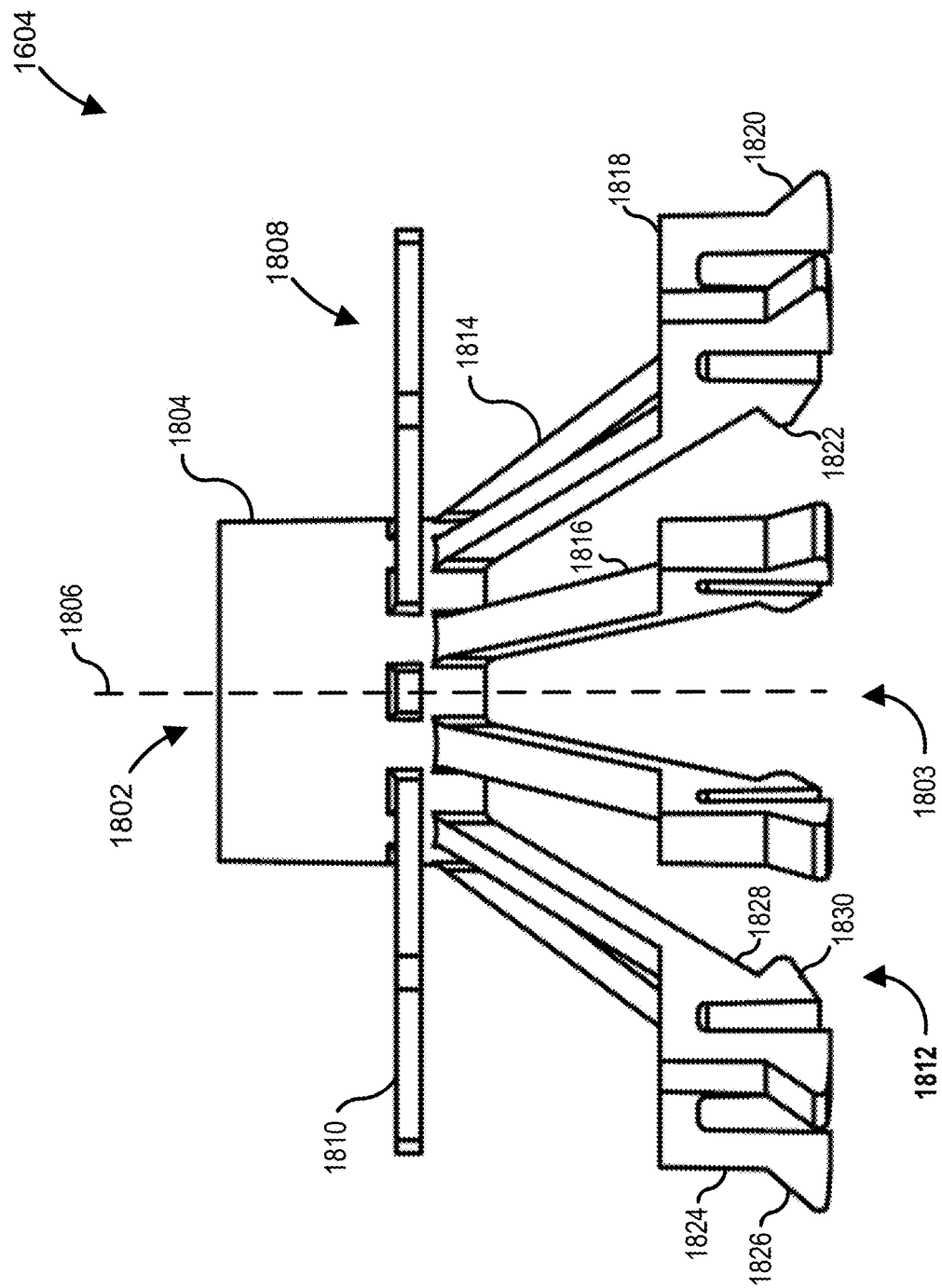
FIG. 18 is a side view of a suspension structure.

A side view of the suspension 1604 is shown in FIG. 18. The suspension can comprise a variety of shapes and sizes and can be made from a variety of materials. In some embodiments, the entirety of the suspension 1604 can be made from a single material and/or type of material and in some embodiments, different parts of the suspension 1604 can be made from different materials. In some embodiments, the suspension can be made from a natural material or a synthetic material. In some embodiments, the suspension 1604 can be made from a polymer, an elastomer, or a metal. In some embodiments, the suspension 1604 can comprise a polymer such as polyamide. In some embodiments in which the suspension 1604 thermally isolates the suspension tip 1602 from the cold plate 116, the suspension 1604 can be made from a polymer having a low thermal conductivity. In some embodiments in which the suspension 1604 closely thermally couples the suspension tip 1602 with the cold plate 116, the suspension 1604 can be made from a metal or other material having a high thermal conductivity.

Figure 19:
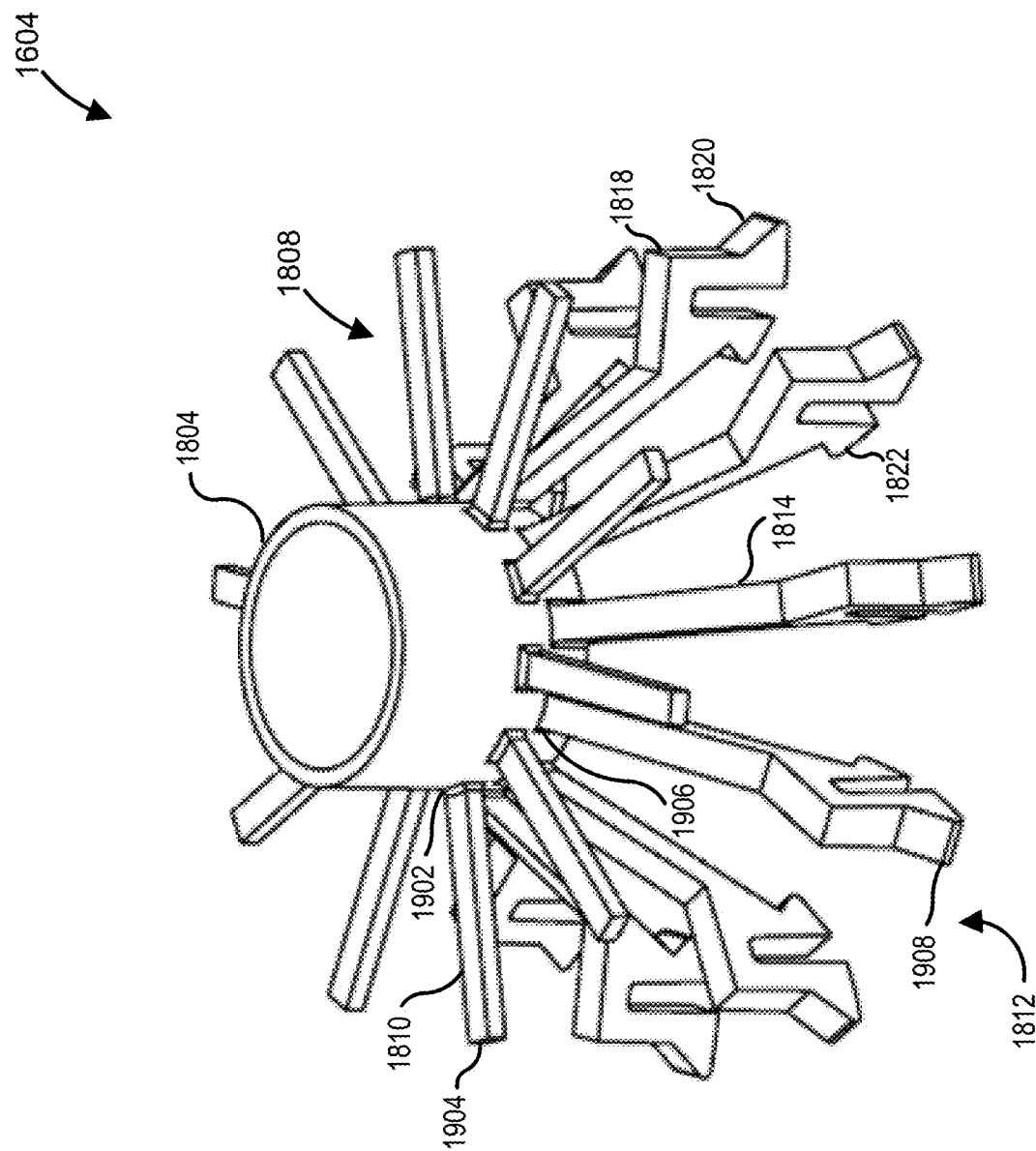
FIG. 19 is a perspective view of one embodiment of a suspension structure.

The suspension includes a top 1802 and a bottom 1803. The top 1802 of the suspension 1604 comprises a central member 1804. The central member 1804 can comprise a variety of shapes and sizes. In some embodiments, the central member 1804 can comprise a cylindrical member, which cylindrical member can comprise, for example, a circular cross-section. In some embodiments, and as depicted in FIGS. 16 and 19, the central member 1804 can be hollow and/or define a lumen extending through the central member 180.

In some embodiments, the central member 1804 can define a central receptacle 1805. In some embodiments, the central receptacle 1805 can be sized and/or shaped to receive a portion of the cold plate 116 when the suspension assembly tip 1600 is coupled to the cold plate 116. Specifically, in some embodiments, the central receptacle 1805 can be configured to receive the distal protrusion 800 and prevent the distal protrusion 800, and specifically the distal end 802 of the distal protrusion 800 from contact the suspension tip 1602.

In some embodiments, the central member 1804, and the suspension 1604 can have a central axis 1806 extending centrally through the suspension 1604 and through the top 1802 and the bottom 1803 of the suspension 1604.

The suspension 1604 comprises a suspension member array 1808 that can comprise a plurality of suspension members 1810. Each of the suspension members 1810 can comprise a variety of shapes and sizes and can be made from a variety of materials. In some embodiments, each of the suspension members 1810 can be resilient to allow each suspension member 1810 to elastically deform and then return to its original position. In some embodiments, and as seen in FIG. 19, each of the suspension members 1810 can comprise a cantilevered beam, having a proximal end 1902 connected to the central member 1804 and a distal end 1904 that engages with the suspension lip 1608. In some embodiments, the cantilevered beam can comprise a rectangular cross-section.

Each of the suspension members 1810 in the suspension member array 1810 can deflect towards the top 1802 of the suspension 1604 and/or towards the bottom 1803 of the suspension 1604. In some embodiments, each of the suspension members 1810 can deflect up to, for example, 1 mm, 2 mm, 3 mm, 4 mm, 5 mm, 6 mm, 7 mm, 8 mm, 9 mm, 10 mm, or up to any other or intermediate value towards the top 1802 of the suspension 1604 and/or towards the bottom 1803 of the suspension 1604. In some embodiments, a suspension member 1810 on one side of the suspension member array 1808 can deflect towards the bottom 1803 and a suspension member 1810 on the opposite side of the suspension member array 1808 can deflect in an opposite direction towards the top 1802 of the suspension 1604, or in the same direction but to a lesser extent, thereby providing a rocking motion to suspension tip 1602.

The plurality of suspension members 1810 can be circumferentially distributed around the central member 1804 so as to be evenly distributed about the central axis 1806. In some embodiments, the suspension members 1810 can be equidistantly arranged around the central axis 1806 and can extend from the central member 1804 in a spoke-like fashion. In some embodiments, some or all of the plurality of suspension members 1810 can be entirely within a common plane, and/or can extend in a direction perpendicular to the central axis 1806.

The suspension 1604 can comprise any desired number of suspension members 1810 including, for example, 4, 5, 6, 7, 8, 9, 10, 12, 14, 16, 18, 20, 30, 40, 50, 100, or any other or intermediate number of suspension members 1810. In some embodiments, the suspension 1604 can comprise, for example, more than 4 suspension members 1810, more than 6 suspension members 1810, more than 8 suspension members 1810, more than 10 suspension members 1810, more than 20 suspension members 1810, more than 30 suspension members 1810, more than 40 suspension members 1810, more than 60 suspension members 1810, more than 80 suspension members 1810, more than 100 suspension members 1810, or any other or intermediate number of suspension members 1810.

The suspension 1604 can comprises a coupling member array 1812 comprising a plurality of coupling members 1814. In some embodiments, each coupling member 1814 can be configured to connect the suspension 1604 to the cold plate 116 and to the suspension tip 1602. The suspension 1604 can comprise any desired number of coupling members 1814 in the coupling member array 1812 including, for example, 4, 5, 6, 7, 8, 9, 10, 12, 14, 16, 18, 20, 30, 40, 50, 100, or any other or intermediate number of coupling members 1814. In some embodiments, the suspension 1604 can comprise, for example, more than 4 coupling members 1814, more than 6 coupling members 1814, more than 8 coupling members 1814, more than 10 coupling members 1814, more than 20 coupling members 1814, more than 30 coupling members 1814, more than 40 coupling members 1814, more than 60 coupling members 1814, more than 80 coupling members 1814, more than 100 coupling members 1814, or any other or intermediate number of coupling members 1814. In some embodiments, the coupling member array 1812 can include the same number of coupling members 1814 as the number of suspension members 1810 in the suspension member array 1808. In some embodiments, the coupling member array 1812 can include a different number of coupling members 1814 than the number of suspension members 1810 in the suspension member array 1808.

As seen in FIG. 19, each of the coupling members 1814 can comprise a proximal end 1906 connected to the central member 1804, and can extend downward and radially away to a distal end 1908. In some embodiments, the plurality of coupling members 1814 can be circumferentially distributed around the central member 1804 so as to be evenly distributed about the central axis 1806. In some embodiments, the coupling members 1814 can be equidistantly arranged around the central axis 1806 and can extend from the central member 1804 in a spoke-like fashion. In some embodiments, due to the downward and radially outward extension of the coupling members 1814, the coupling member array 1812 can be conical, and specifically can have a shape of a truncated cone.

Each of the coupling members 1814 can include a coupling arm 1816 and a coupling head 1818. As seen in FIG. 18, the coupling arm 1816 can connect at its proximal end to the central member 1804 and at its distal end to the coupling head 1818. The coupling head 1818 can include an external connector 1820 configured to connect with the suspension tip 1602, and specifically to the suspension groove 1606 of the suspension tip 1602. The coupling head 1818 can further include an internal connector 1822 configured to connect with the cold plate 116, and specifically with the retention depression 814 of the cold plate 116.

In some embodiments, the external connector 1820 can comprise a deflection arm 1824 and an engagement head 1826. The engagement head 1826 of the external connector 1820 can be configured to engage with the suspension groove 1606 of the suspension tip 1602, and specifically to be received within the suspension groove 1606 of the suspension tip 1602. The deflection arm 1824 can be configured to deflect so as to facilitate the engagement of the engagement head 1826 with the suspension groove 1606 of the suspension tip 1602.

In some embodiments, the internal connector 1822 can comprise a deflection arm 1828 and an engagement head 1830. The engagement head 1830 of the internal connector 1822 can be configured to engage with the cold plate 116, and specifically to be received within the retention depression 814 of the cold plate 116. The deflection arm 1828 can be configured to deflect so as to facilitate the engagement of the engagement head 1830 with the cold plate 116, and specifically with the retention depression 814 of the cold plate 116.

Figure 20:
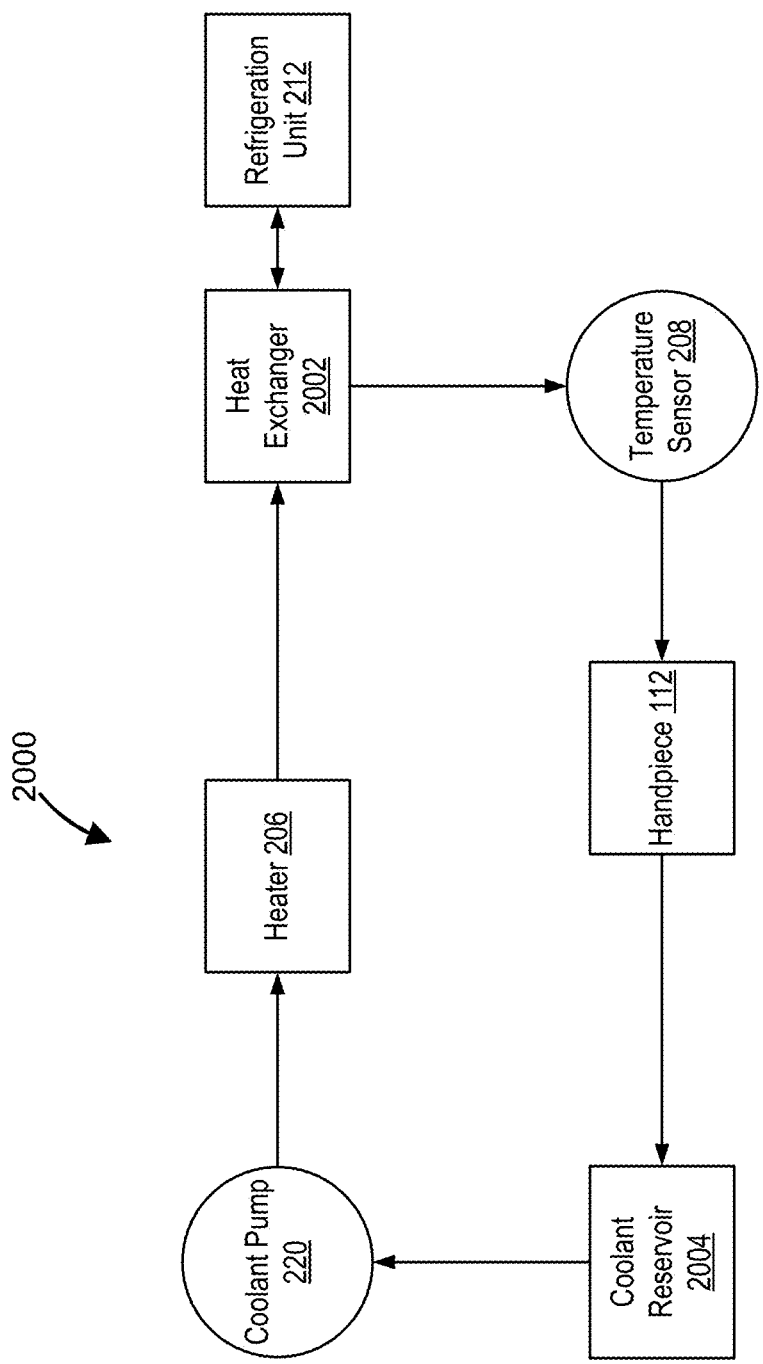
FIG. 20 is a schematic illustration of one embodiment of the chiller.

With reference now to FIG. 20, a schematic illustration of one embodiment of the chiller 211 is shown. The chiller 211 can include a coolant circulation system 2000 that can be coupled to a refrigeration unit 212 via a heat exchanger 2002. The coolant circulation system 2000 can be configured to circulate coolant through the coolant circulation system 2000, including through the handpiece 112. In some embodiments, this coolant can be a heat sink to which the cooler 230 of the handpiece 112 can transfer heat from the cold plate 116.

In some embodiments, as depicted in FIG. 20, the refrigeration unit 212 can be configured to cool coolant in the coolant circulation system 2000, and the heater 206 can be configured to heat coolant in the coolant circulation system 2000. In some embodiments, the combination of the heater 206 and the refrigeration unit 212 can allow the cooling of the coolant to within a desired temperature range, and specifically can allow cooling of the coolant to a desired temperature range while decreasing the need to vary the cooling output of the refrigeration unit 212. In some embodiments, for example, the refrigeration unit 212 may have a longer lifetime, if the output of the refrigeration unit 212 remains relatively constant. To enable control of coolant temperature while maintaining relatively constant refrigeration unit 212 output, the heater 206 can heat the coolant. Thus, management of temperature of the coolant can be performed in large part by heater 206 based on temperature data gathered from the temperature sensor 208.

The circulation system 2000 can include a coolant reservoir 2004 which can contain coolant. In some embodiments, the level of coolant in the coolant reservoir 2004 can be measured by the liquid sensor 218. In the event that coolant levels measured by the liquid sensor 218 drop below a predetermined level, an error message or warning can be provided to the user via, for example, a graphical user interface (GUI) on the display 104 and/or via the speaker 238.

In some embodiments, the coolant pump 220 can circulate coolant through the circulation system 2000. In some embodiments, this pump can provide a further control cooling of the coolant provided to the handpiece 112. Specifically, if more cooling is desired, the rate with which the coolant is circulated can be increased and/or the temperature of the coolant can be decreased. Likewise, if less cooling is desired, the rate with which the coolant is circulated can be decreased and/or the temperature of the coolant can be increased.

Figure 21:
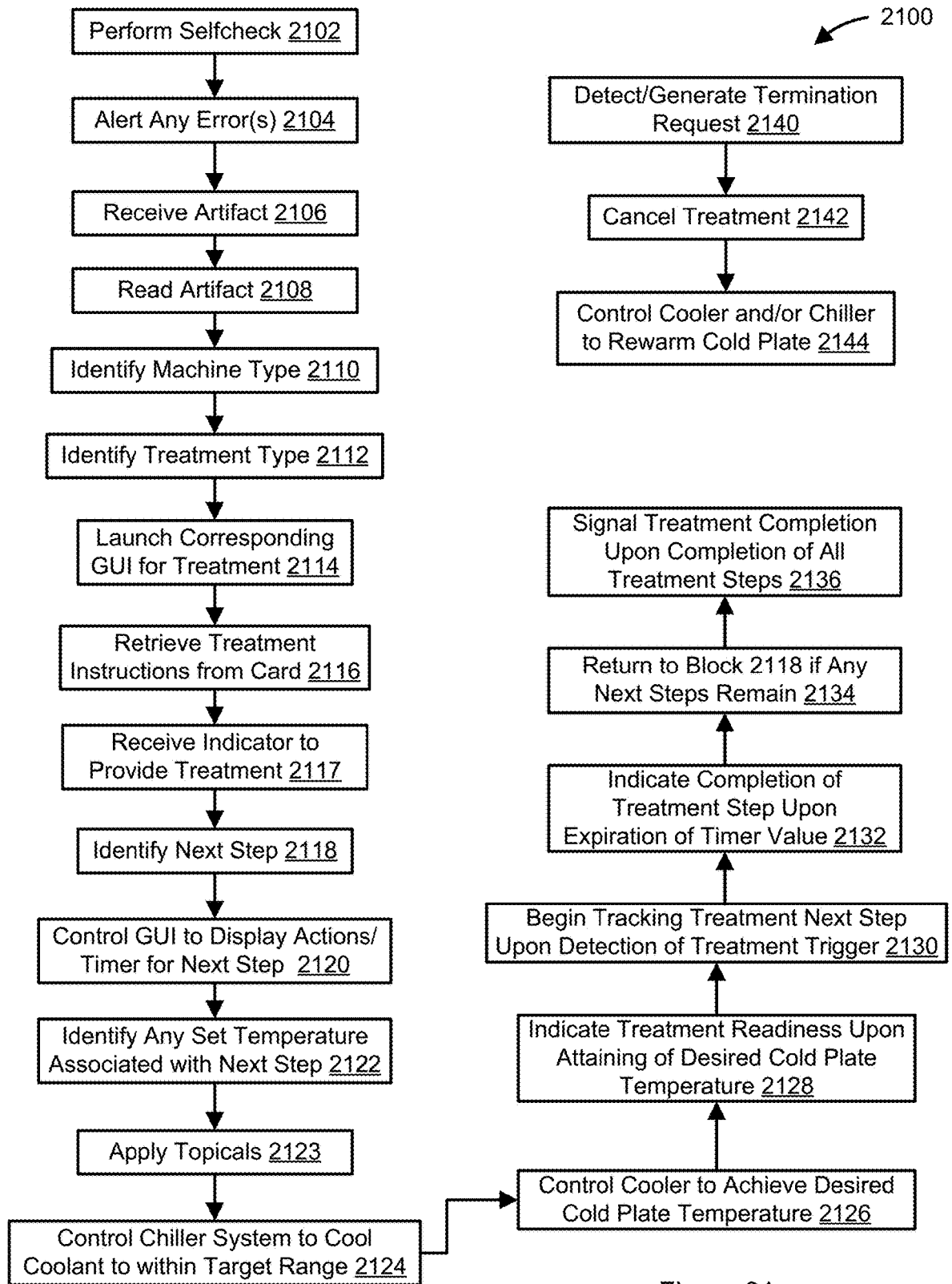
FIG. 21 is a flowchart illustrating one embodiment of a process for delivering a skin cooling treatment to a patient.

FIG. 21 is a flowchart illustrating one embodiment of a process 2100 for delivering a skin cooling treatment to a patient, and more specifically to an area of skin of a patient. The process 2100 can be performed by the cooling treatment system 100.

The process 2100 begins at block 2102, wherein a self-check is performed. In some embodiments, the self-check can be periodically performed, or can be performed when, for example, the cooling treatment system 100 is turned on, woken up, or the like. In some embodiments, the self-check can check to determine if: coolant levels are satisfactory; if components of the cooling treatment system 100 are functional; if the handpiece 112 is present; or the like. The self-check can be performed by the controller 110. In some embodiments, the self-check can include determining: communication connection with components of the cooling treatment system 100 such as with the chiller 211; the ability to control powering of the cooler 230; presence of the handpiece 112 including, gathering the type and/or serial number of the handpiece 112; operation of the handpiece 112 and/or components of the handpiece including, for example, the motor 232, the temperature sensor(s) 236, the speaker 238 and/or any other indicators such as one or several LEDs, or the like.

Figure 23:
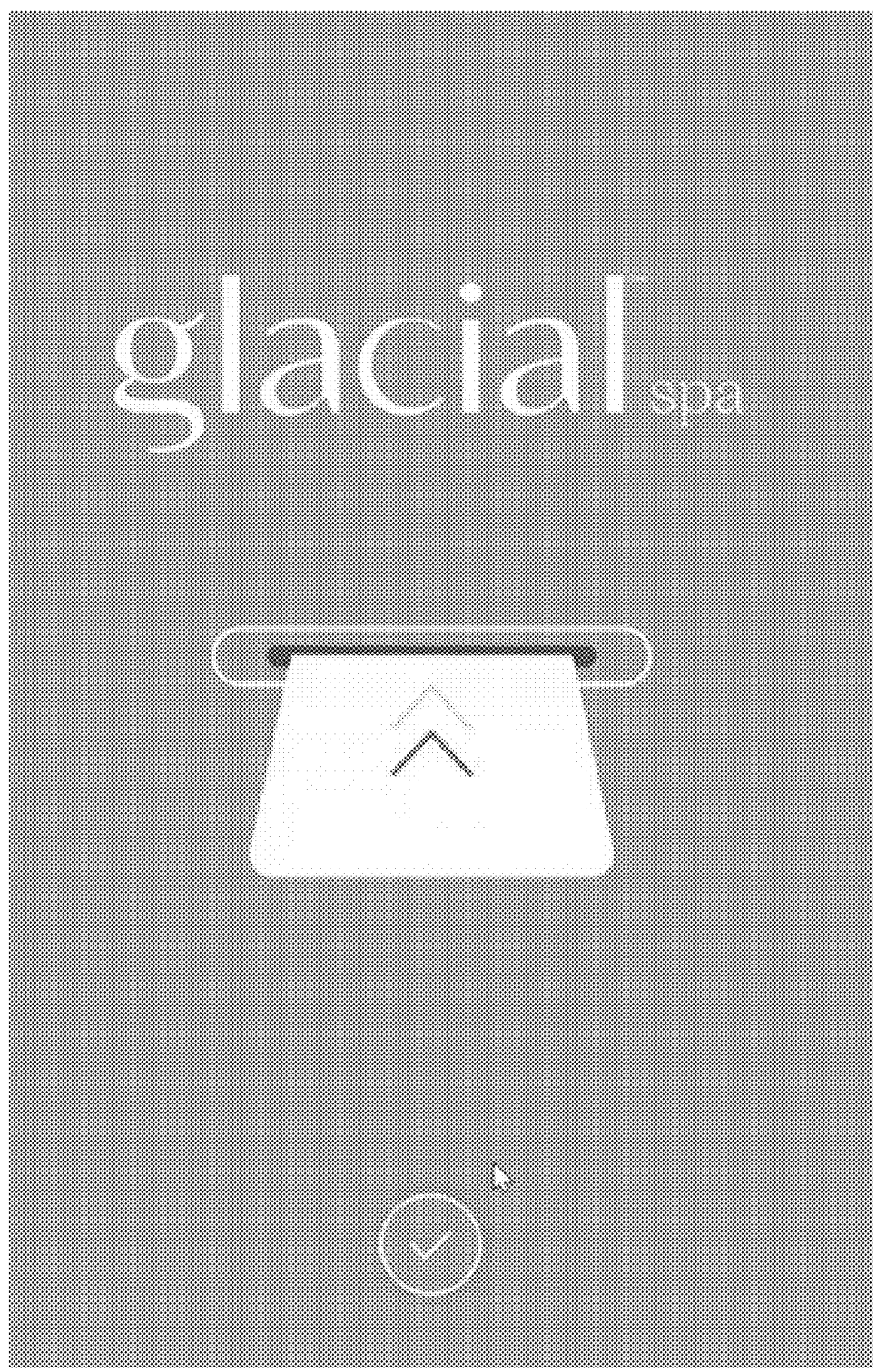
FIG. 23 is a depiction of a GUI indicating readiness to receive an artifact.
Figure 24:
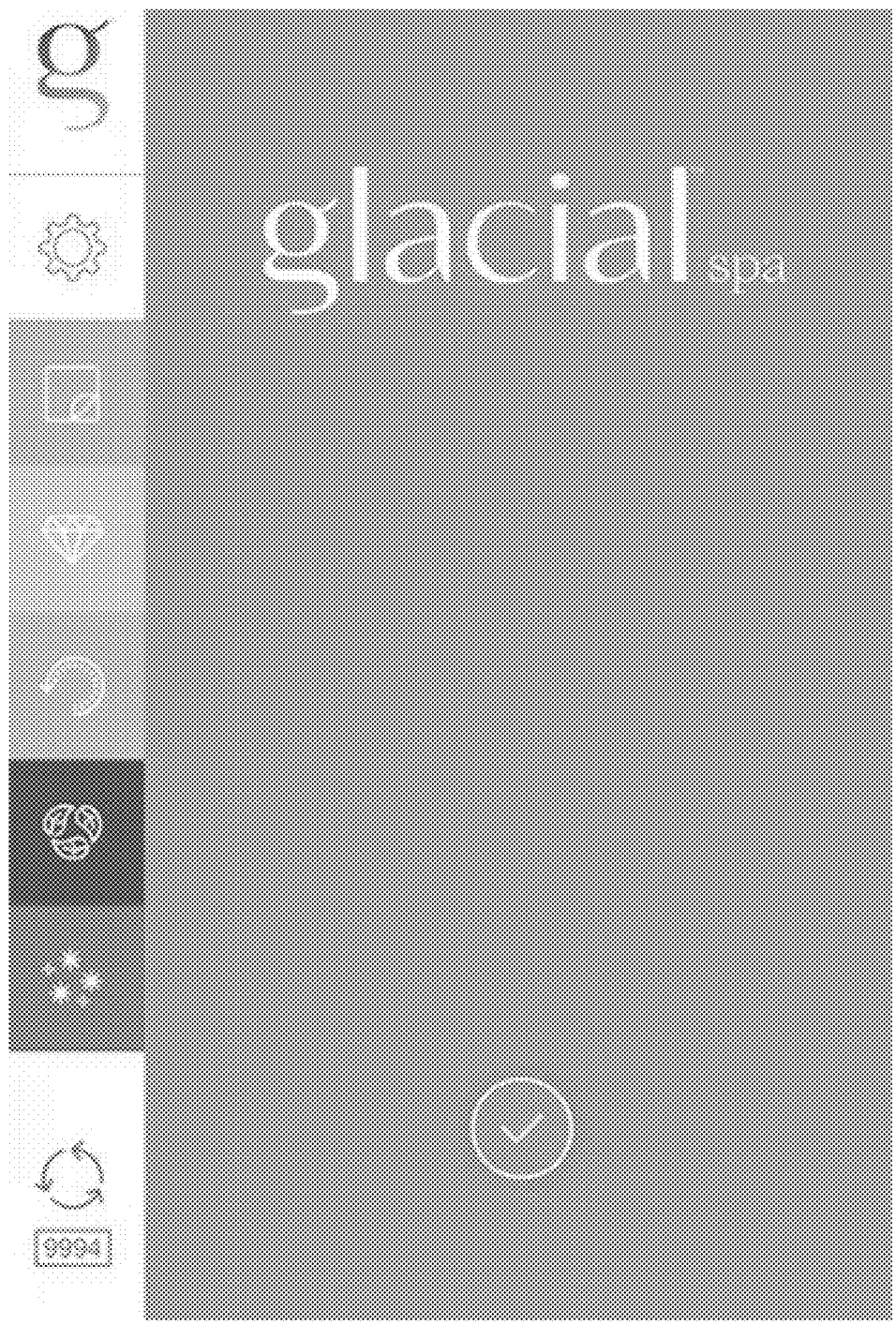
FIG. 24 is a depiction of a GUI launched in connection with a restore treatment.

At block 2104, any errors triggered by the self-check can be indicated to the user. This can include controlling the GUI on the display 104 to provide a visual indication and/or visual identification of any errors to the user, and/or providing an audible indication of any errors to the user via, of example, the speaker 238. If no errors are detected, the GUI can be controlled to display the image of FIG. 23, which indicates readiness to receive an artifact 107.

At block 2106, an artifact 107, such as a card is received. In some embodiments, the artifact can be received by a physical feature associated with the reader 106. In some embodiments, for example, the reader can include a physical feature, such as a slot, configured to receive the artifact 107. In such an embodiment, the artifact 107 can be received by this feature, and specifically can be received within the slot. In some embodiments, and instead of a physical artifact, a non-physical artifact can received and/or read. In some embodiments, this can include accessing information contained in a digital artifact.

After the artifact 107 has been received, the artifact 107 can be read as indicated in block 2108. In some embodiments, this can include reading data from the artifact 107. This can include, for example, powering features of the artifact 107, such as, for example, a microprocessor of the artifact 107, querying the artifact 107 for information, and/or receiving data from the artifact 107. In some embodiment, reading data from the artifact can include determining a value of the count of available treatment cycles associated with the artifact. If it is determined that the artifact has at least one treatment cycle available, then the process 2100 can proceed to block 2110. Alternatively, if it is determined the artifact has no available treatment cycles available, then the lack of available treatment cycles can be indicated to the user and the process 2100 can terminate. This reading and determining can be performed by the reader 106.

Based on information read from the artifact 107, at block 2110, which artifact 107 has at least one remaining treatment cycle in its count of available treatment cycles, a type of machine for the cooling treatment is identified. In some embodiments, this can include determining if the data retrieved from artifact identifies a type of cooling treatment system 100 for performing the treatment. As previously discussed, some embodiments of the cooling treatment system 100 may provide different cooling/temperature control of the cold plate 116, and thus certain treatments may be provided via different embodiments of the cooling treatment system 100. If the data identifies a machine for providing the cooling treatment, then it is determined if the cooling treatment system 100 having read the artifact 107 in block 2108 matches the machine type specified in the read data. If it is determined that the machine types do not match, then the process 2100 can terminate, and an indication of the termination and the reason for termination can be provided to the user.

If it is determined that the machine types match, then the process 2100 can proceed. At block 2112, treatment instructions can be identified in the data read from the artifact in block 2108. In some embodiments, this can include identifying treatment instructions stored on the artifact 107. These treatment instructions can include, for example, instructions for a technical treatment, a freeze treatment, and a restore treatment. In some embodiments in which the treatment comprises a freeze treatment or a restore treatment, the treatment instructions can include at least one temperature profile that can identify a plurality of temperatures and an associated time for maintaining each of the plurality of temperatures.

Figure 22:
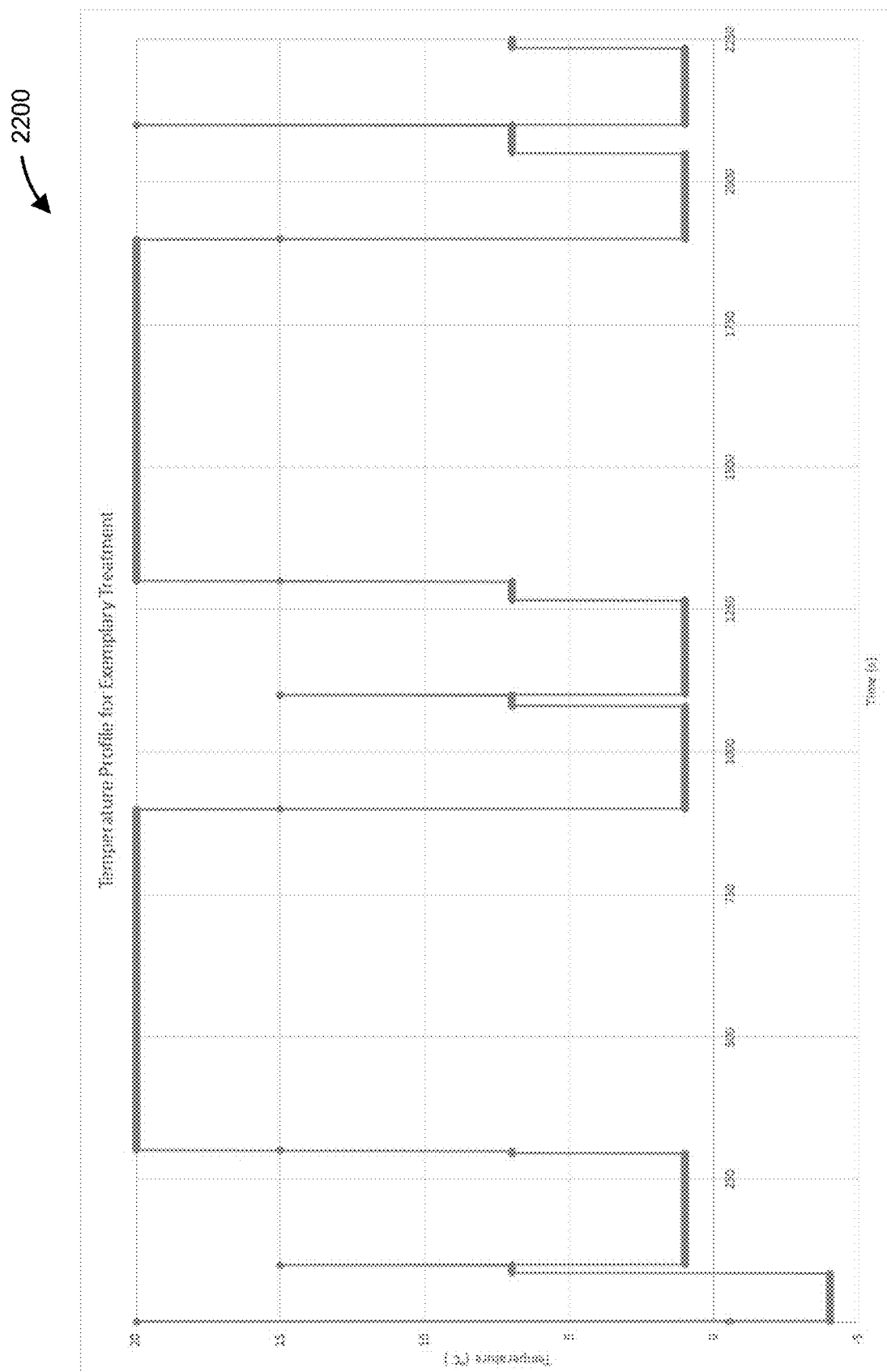
FIG. 22 is one embodiment of a treatment profile.

One embodiment of a treatment profile 2200 is shown in FIG. 22. As seen in FIG. 22, the treatment profile 2200 identifies a plurality of temperatures and a time associated with each of the temperatures. For example, the treatment profile 2200 non-exclusively indicates a temperature of +20° C. for a duration of 0 seconds, followed by a temperature of −4° C. for a duration of 85 seconds for a freeze treatment, followed by a temperature of +7° C. for a duration of 15 seconds, followed by a temperature of +15° C. for a duration of 1 second, followed by a temperature of +1° C. for a duration of 195 seconds, followed by a temperature of +7° C. for a duration of 5 seconds, followed by a temperature of +20° C. for a duration of 600 seconds (a dwell time), followed by a temperature of +15° C. for a duration of 1 second, followed by a temperature of +1° C. for a duration of 180 seconds, followed by a temperature of +7° C. for a duration of 20 seconds, followed by a temperature of +15° C. for a duration of 1 second, followed by a temperature of +1° C. for a duration of 165 seconds, followed by a temperature of +7° C. for a duration of 35 seconds, followed by a temperature of +15° C. for a duration of 1 second, followed by a temperature of +20° C. for a duration of 600 seconds, followed by a temperature of +15° C. for a duration of 1 second, followed by a temperature of +1° C. for a duration of 150 seconds, followed by a temperature of +7° C. for a duration of 50 seconds, followed by a temperature of +20° C. for a duration of 1 second, followed by a temperature of +1° C. for a duration of 135 seconds, and a final temperature of 7° C. for a duration of 15 seconds.

At block 2114, a GUI corresponding to the identified treatment is launched. In some embodiments, for example, this can include launching a GUI for a technical treatment when the identified treatment is a technical treatment, launching a GUI for a freeze treatment when the identified treatment is a freeze treatment, and launching a GUI for a restore treatment when the identified treatment is a restore treatment. FIGS. 24 through 28 depict one embodiment of a launched GUI that is associated with a restore treatment, and FIGS. 29 through 28 depict one embodiment of a launched GUI that is associated with a freeze treatment. In some embodiments, the GUI can display information relating to the identified treatment. For example, the GUI as represented in FIG. 29 identifies two treatment profiles with different cooling rates and for providing the treatment. Specifically, FIG. 29 indicates that a Cooling Factor, which is a non-dimensional indicator of cooling rate, of 3.8 should be applied for a duration of 16 seconds and that a Cooling Factor of 4 should also be applied for a duration of 16 seconds.

At block 2116, the treatment instructions are retrieved from the artifact 107. In some embodiments, this step can be performed as a part of the reading of the artifact 107 performed in block 2108. The retrieving of the treatment from the artifact 107 can include the downloading of information identifying the treatment from the card.

At block 2117, instructions are received from the user to provide a treatment and/or an indication is received from the user to provide a treatment. This indicator and/or instructions can be received via the user providing an input via, for example, the display 104, via the controls 240 on the handpiece 112, and/or via a detection of a change in skin contact status by, for example, the cap touch 234, a temperature sensor, a pressure sensor, or the like. In some embodiments, and upon receipt of the indication from the user to provide the treatment, the value of the artifact's count of available treatment cycles is decremented. In some embodiments, and upon starting a treatment, the value of the artifact's count of available treatment cycles is decremented.

At block 2118, a next step in the treatment is identified. In some embodiments, if the treatment has not yet been started, this can be the first step in the treatment. This next step can be identified from the downloaded treatment. The next step can be, in some embodiments, a freeze or freezing step, a cooling step, and/or a warming or a rewarming step. After the next step in the treatment has been identified, the GUI is controlled to guide the user through performing user actions of the next step as indicated in block 2120. In some embodiments, the step of block 2120 can include multiple sub-steps that can be performed before, simultaneous with, and/or subsequent to one or several others of the steps shown in blocks 2122. For example, the step of block 2120 can include directing the user to cool some of the patient's skin, which can be performed after block 2128 and/or block 2130, or in other words, after the cold plate 116 has achieve a desired temperature and after an indicator of beginning of treatment identified in the next step is received.

Figure 25:
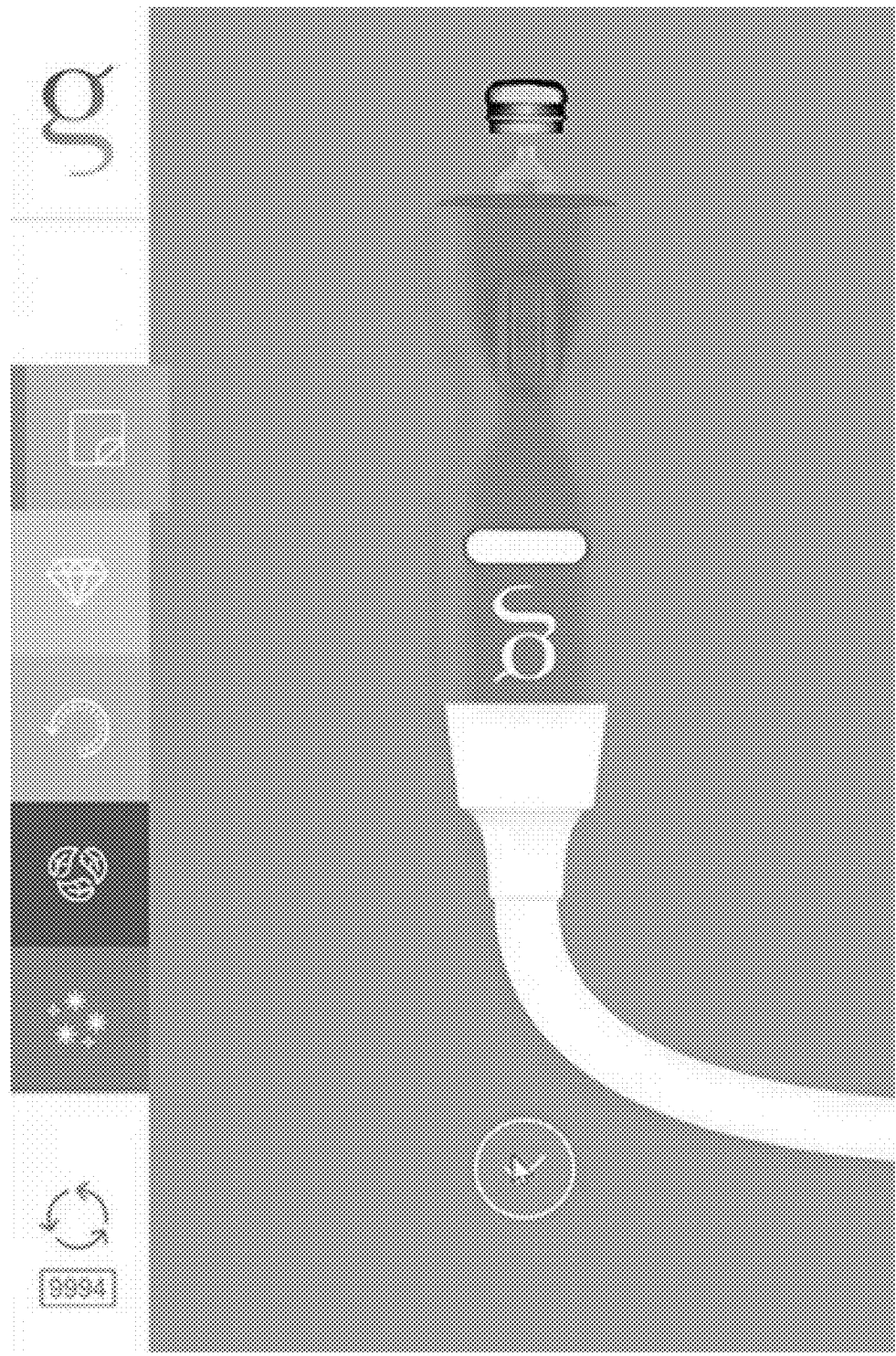
FIG. 25 is a depiction of a GUI directing a user to place a treatment tip on the cold plate.
Figure 26:
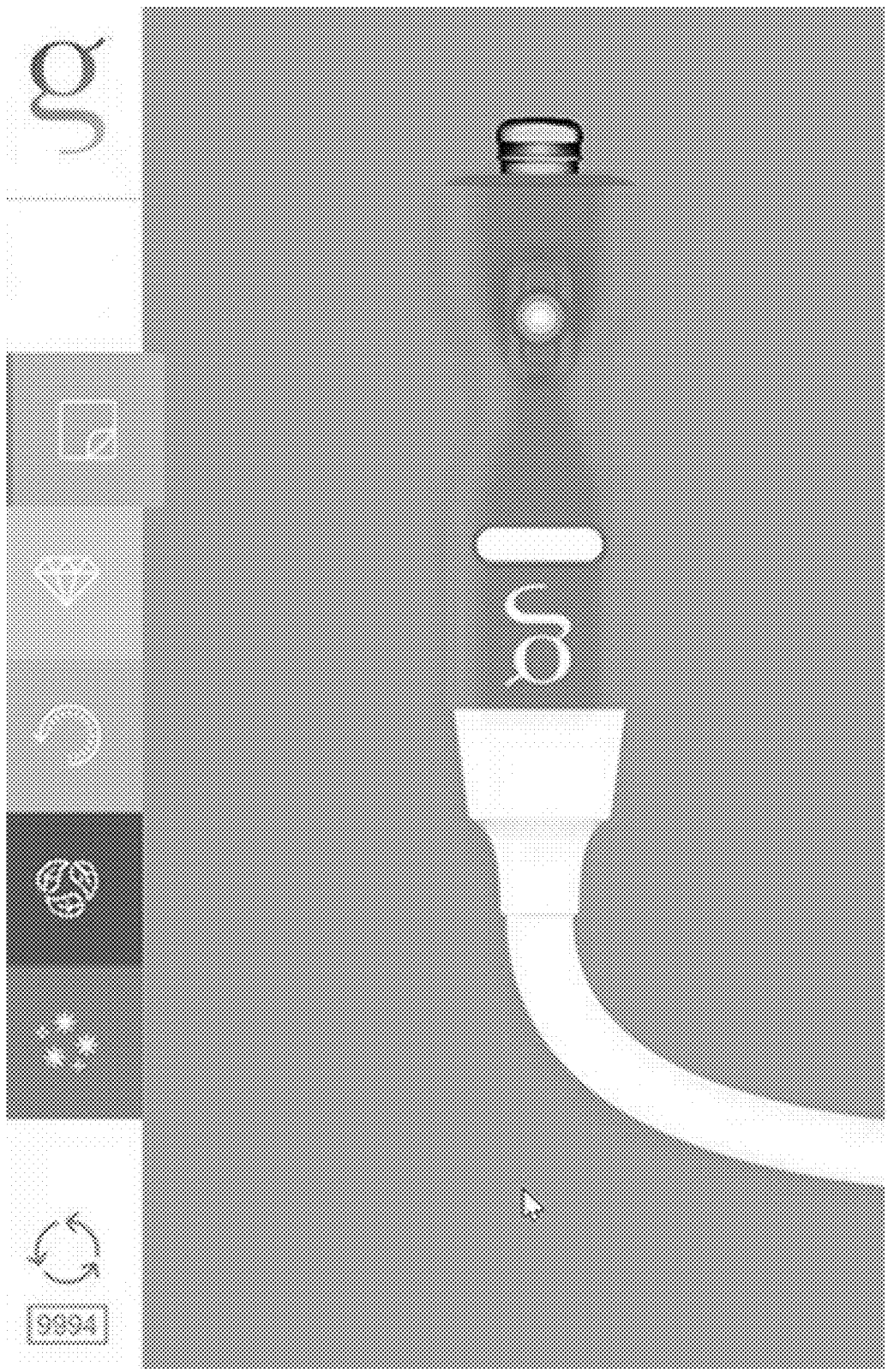
FIG. 26 is a depiction of a GUI directing a user to depress a button on the handpiece.

FIGS. 25 through 28 show actions to be taken by user as part of the identified treatment step of a restore treatment. This includes, as shown in FIG. 25, the placement of a tip 119 on the cold plate 116. This can include indication of which tip 119 to place on the cold plate 116. Thus, the GUI in FIG. 25 indicates that a smooth tip 120 should be connected to the cold plate 116. FIG. 26 indicates that button 700 of the handpiece 112 should be pressed. This can be pressed upon completion of other user actions associated with the identified step.

Figure 27:
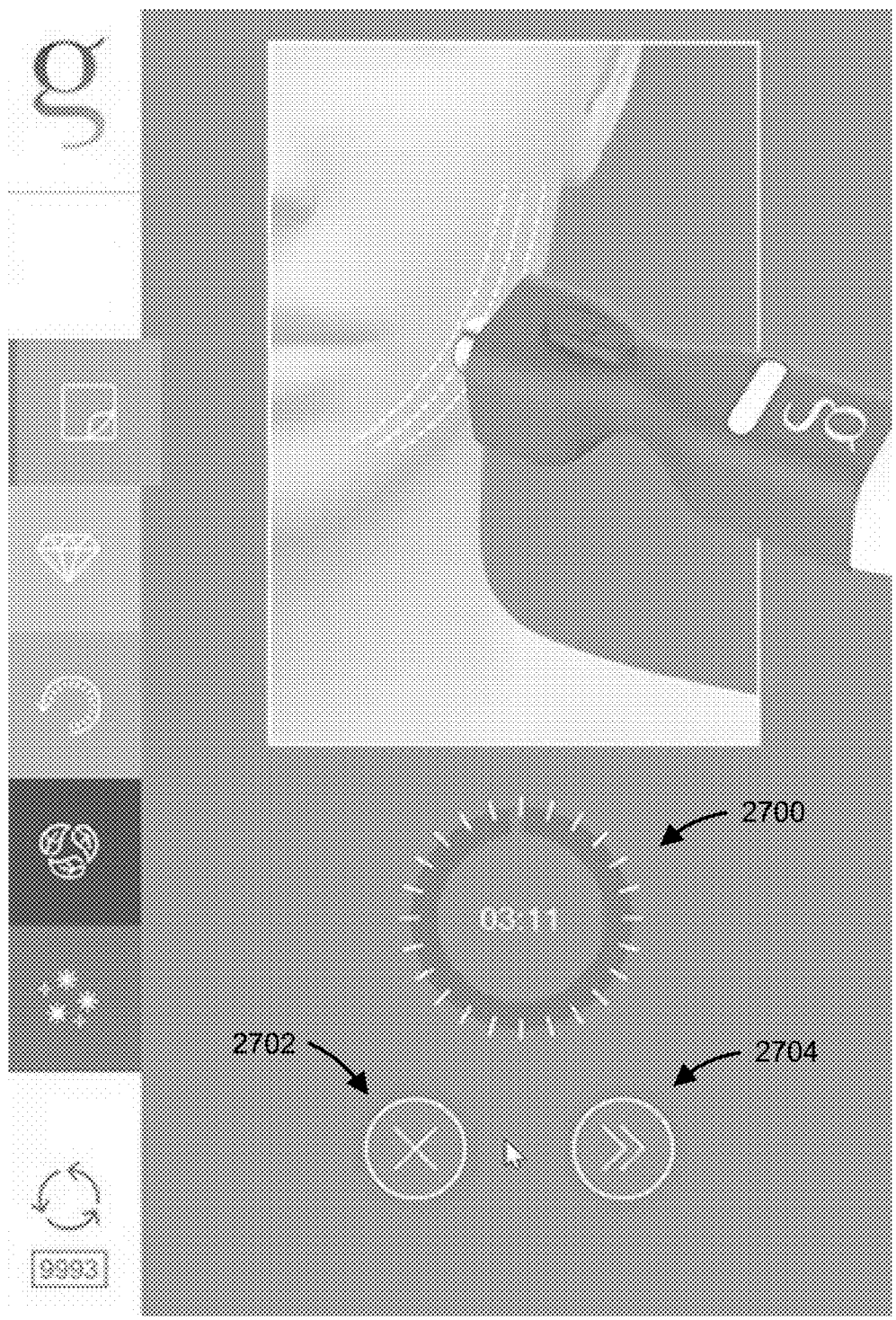
FIG. 27 is a depiction of a GUI directing a user to apply the treatment tip to the patient's skin.
Figure 28:
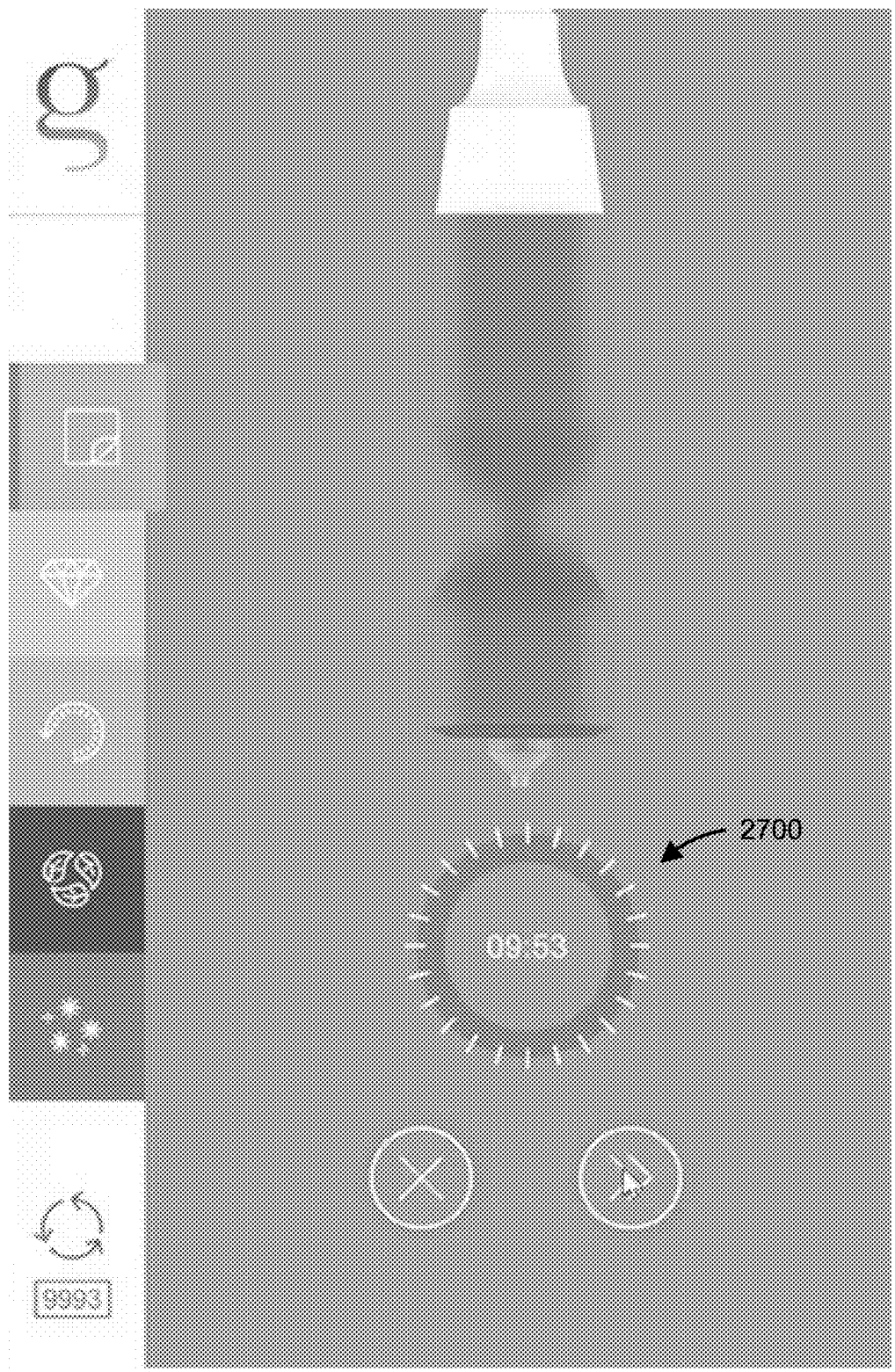
FIG. 28 is a depiction of a GUI directing a user for a dwell time.
Figure 29:
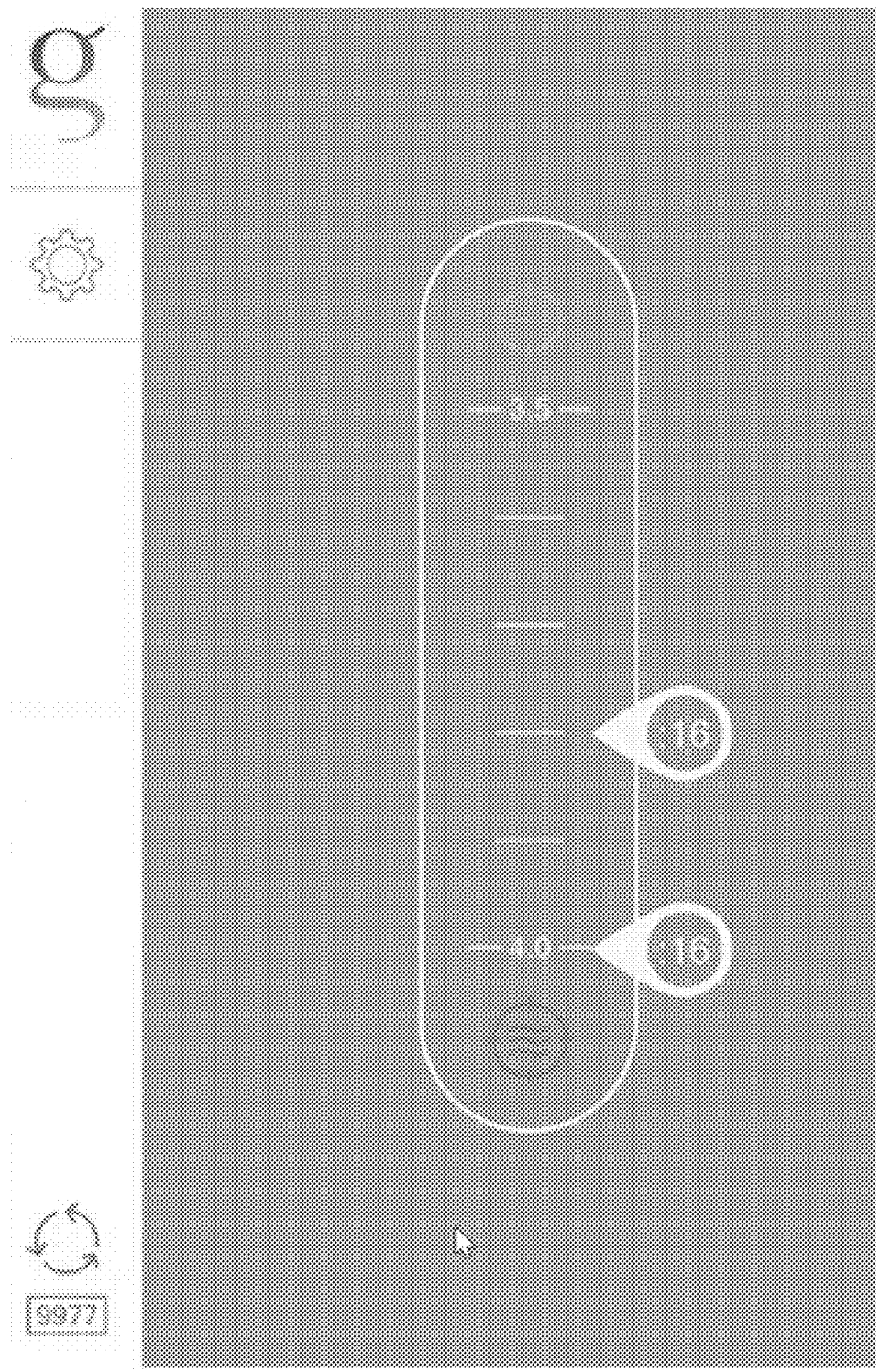
FIG. 29 is a depiction of a GUI launched in connection with a freeze treatment.

FIGS. 27 and 28 are depictions of a GUI showing action to be performed by the user with the handpiece 112. FIG. 27 shows where and how the user should apply the treatment tip 119 to perform the treatment. FIG. 27 further includes a countdown timer 2700 which can show the amount of time for providing the action and/or treatment indicated on the GUI, a termination icon 2702 that can be manipulated to terminate the treatment, and an advance icon 2704 that can be manipulated to advance to a next action in the treatment step. In some embodiments, the treatment can further be terminated via a user input received via the handpiece 112, and specifically via the button 700 of the handpiece 112 and/or via a detection of a change in skin contact status by, for example, the cap touch 234, a temperature sensor, a pressure sensor, or the like. In some embodiments, and as discussed with respect to block 2130, the countdown timer can begin its countdown upon detection of a treatment trigger and/or upon receipt of an indication of the beginning of the performing of the associated treatment step. In some embodiments, this can include receipt of a signal indicating initiation of a treatment, and/or detection of an event indicating initiation of a treatment. This can include, for example upon detection of the pressing of the button 700 on the handpiece 112 by the user, by the capacitive touch sensor 234 detecting contact between the cold plate and/or treatment tip 119 and the patient's skin, detecting a temperature change of the cold plate and/or of the treatment tip indicative of contact with the patient's skin.

FIG. 28 is a depiction of the GUI directing a user for providing a dwell time. As seen in FIG. 28, the GUI includes a countdown timer 2700 which shows the amount of time remaining in the dwell time. In some embodiments, and as discussed with respect to block 2130, the countdown timer can begin its countdown upon detection of a treatment trigger and/or upon receipt of an indication of the beginning of the performing of the associated treatment step. This, the countdown timer can begin its countdown for example upon detection of the pressing of the button 700 on the handpiece 112 by the user and/or via detection of a change in skin contact status by, for example, the cap touch 234, a temperature sensor, a pressure sensor, or the like.

Figure 30:
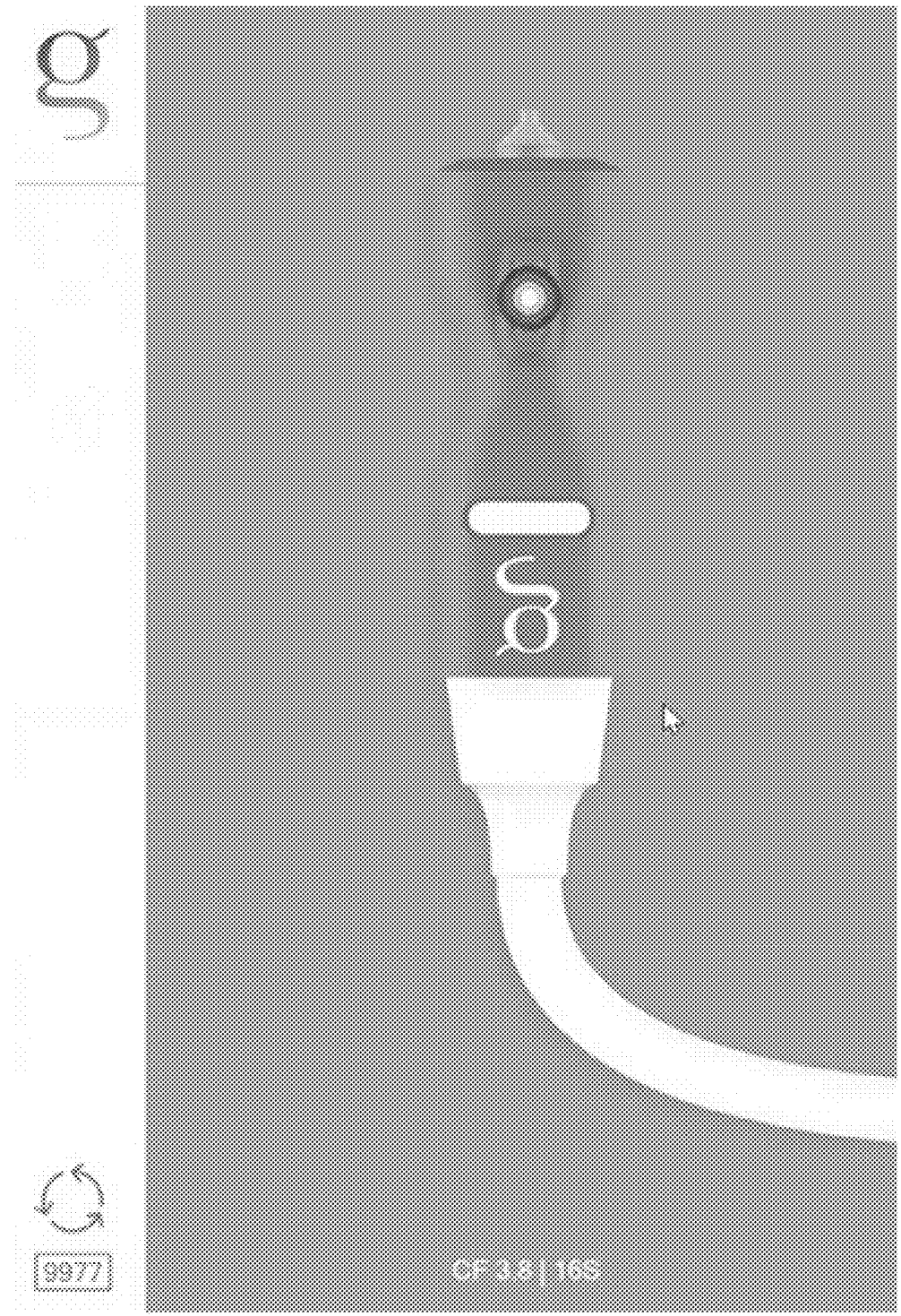
FIG. 30 is a depiction of a GUI directing a user to depress a button on the handpiece.
Figure 31:
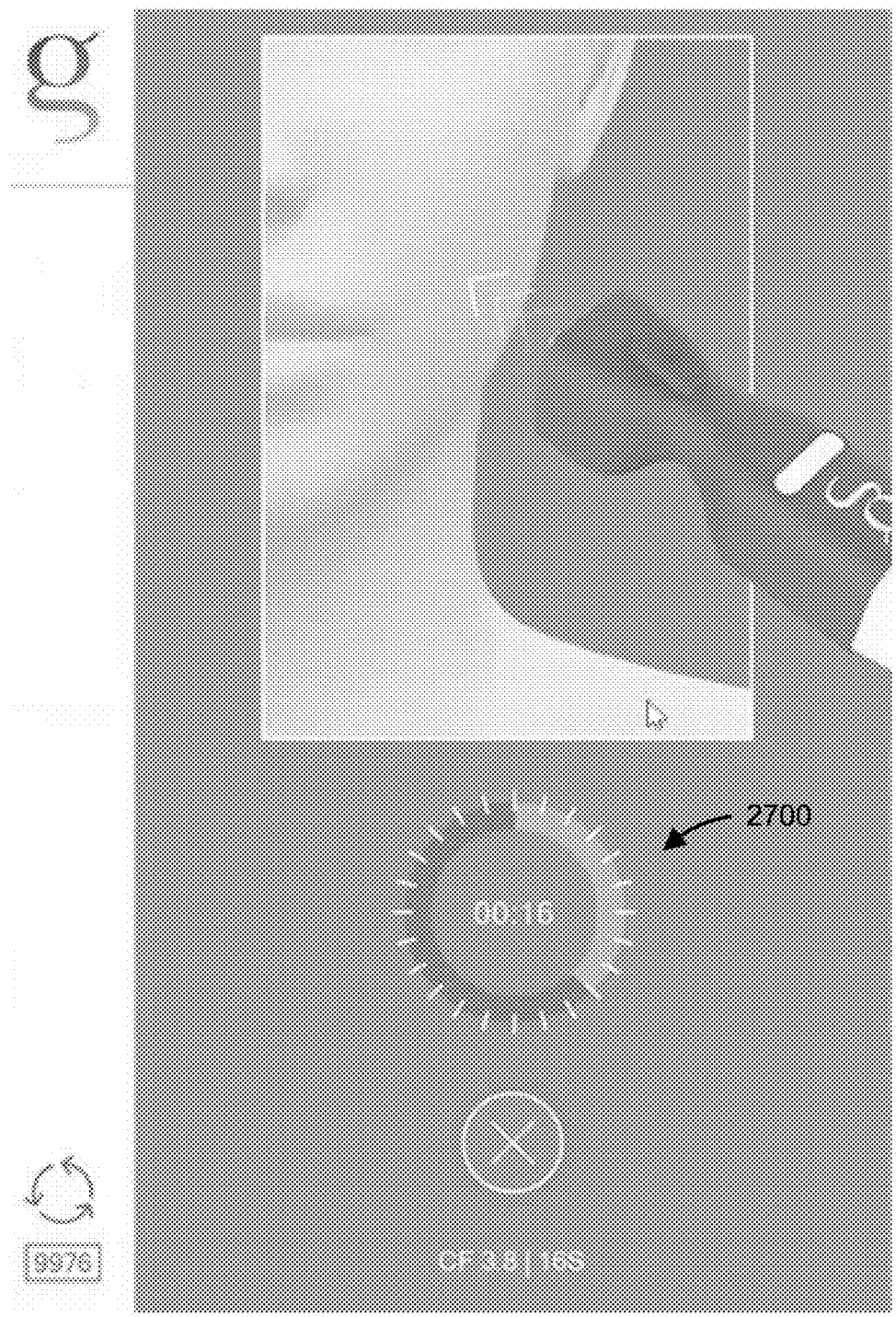
FIG. 31 is a depiction of a GUI directing a user to apply the cold plate to the patient's skin.
Figure 32:
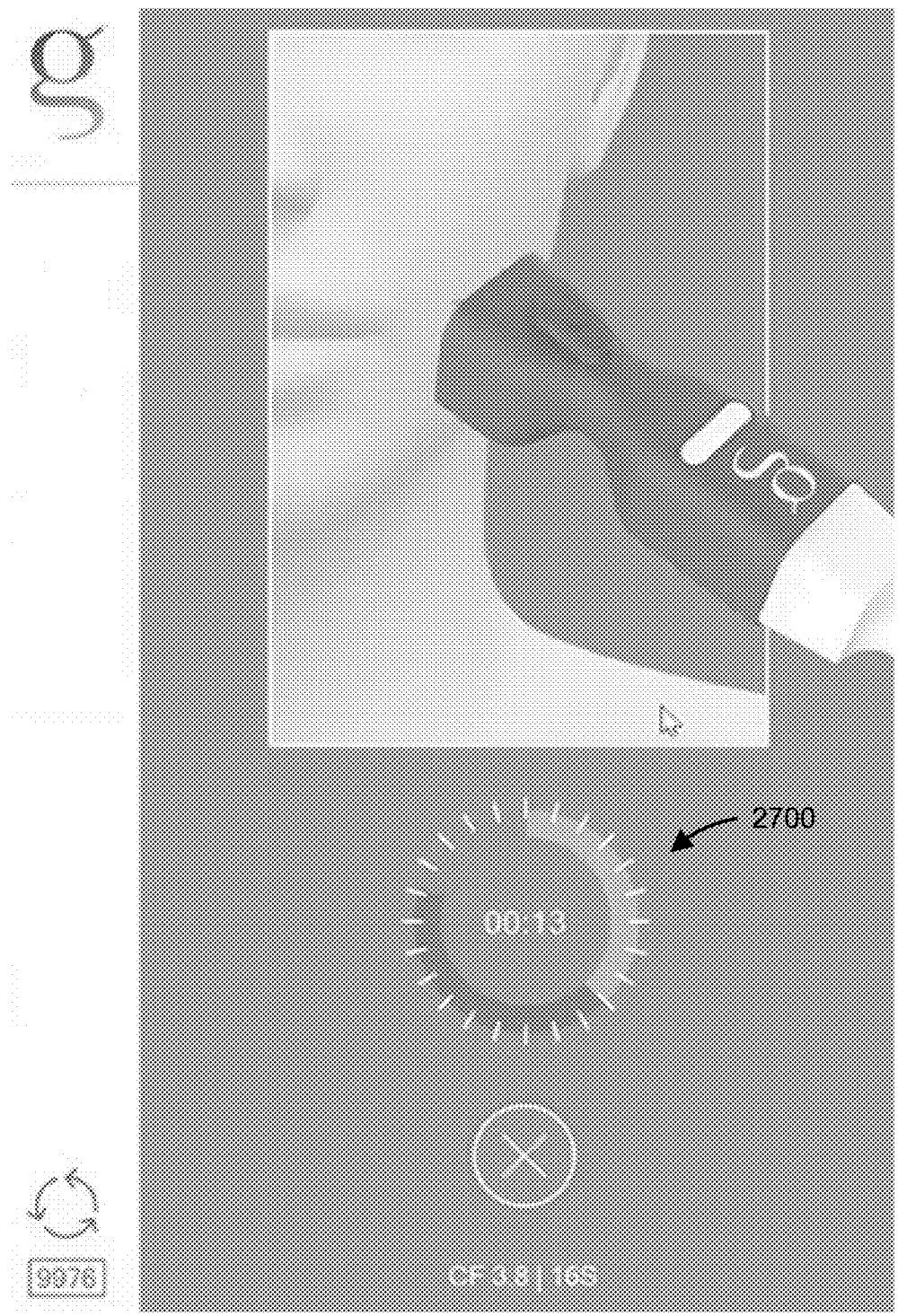
FIG. 32 is a depiction of a GUI directing a user to maintain the application of the cold plate to the patient's skin.

FIGS. 30 through 32 are depictions of a GUI showing actions to be performed by the user with the handpiece 112 as part of a freeze treatment. FIG. 30 indicates that the user should press the button 700. This pressing of the button can, in some embodiments, start the cooling of the cold plate 116 to a desired cold plate temperature. FIG. 31 indicates that the user should apply the cold plate to the patient's skin. FIG. 31 further includes a countdown timer 2700. FIG. 32 shows the cold plate 116 applied to the patient's skin, and the countdown timer 2700 is indicated as counting down the time until completion of the treatment step.

In some embodiments, guiding the user through performing user actions of the next step can include, for example, identifying at least one topical and directing the application of the topical to the area of skin of the patient optionally using the handpiece tip, or textured tip or smooth tip applied to the handpiece to distribute the topical. In some embodiments, this can further include directing the user to cool the area of skin of the patient via the handpiece 112.

In some embodiments, directing the user to cool the area of skin of the patient via the handpiece 112 can include directing the user to contact the area of skin of the patient with the cold plate 116 and directing the user to depress a button 700 to indicate initiation of delivery of treatment of the identified next step. In some embodiments, directing the user to cool the area of skin of the patient via the handpiece 112 can include directing the user to connect a treatment tip 119 to the cold plate 116 of the handpiece 112, contact the area of skin of the patient with the treatment tip 119 connected to the cold plate 116, and depress a button 700 to indicate initiation of delivery of treatment of the identified next step. This treatment tip 119 can, in some embodiments, be one of the smooth tip 120 and the textured tip 122. In some embodiments, the GUI can be controlled to track the duration of a treatment step via, for example, a countdown timer. In some embodiments, a countdown timer can indicate a duration of remaining time that a handpiece 112 should be used to cool the patient's skin or a duration of remaining dwell time in which a topical should be allowed to sit, without and handpiece 112 interaction, on the patient's skin.

In some embodiments, controlling the GUI to guide the user through performing user actions of the next step can include, for example, directing the user to perform a cleanse step, also referred to herein as a purify step. In some embodiments, when directing the user to perform user actions of the cleanse step, the GUI can be controlled to direct the user to: massage cleanser into the patient's skin and/or into the patient's face and to remove the cleanser with gauze and/or a towel that can be, for example, water saturated or wet.

In some embodiments, controlling the GUI to guide the user through performing user actions of the next step can include, for example, directing the user to perform a freeze step, also referred to herein as focused cooling. In some embodiments, freeze step can include cooling the cold plate 116 to one or several temperatures at or below freezing. This can include, for example, temperatures from, for example, −30° C. to approximately 10° C., from, for example, −10° C. to approximately 10° C., or the like. In some embodiments, the user can be directed to hold the cold plate 116 on the portion of skin being treated for a desired amount of time including, for example, less than one minute, between 1 and 5 minutes, between 1 and 10 minutes, between 1 and 20 minutes, or the like. In some embodiments, when directing the user to perform user actions of the freeze step, the GUI can be controlled to direct the user to: assess a spot, insert a freeze card, select a temperature profile, apply a few drops of gel such as HYDRO GEL directly onto the treatment area, spread the gel with a finger, push the button 700 to initiate pre-cool, place the cold plate 116 on the treatment area upon completion of pre-cool, hold the cold plate 116 on the treatment area until the treatment is complete, clean the treatment area, and clean the cold plate 116.

In some embodiments, controlling the GUI to guide the user through performing user actions of the next step can include directing the user to perform a peel step, also referred to herein as a loosen step. In some embodiments, peel step can include cooling the cold plate 116 to desired temperature, which can be, for example, between −4° C. to approximately 4° C., from, for example, −2° C. to approximately 2° C., approximately 1° C., or the like. In some embodiments, the user can be directed to apply cooling with the handpiece 112 on the portion of skin being treated for a desired amount of time including, for example, between 60 and 300 seconds, between 100 and 240 seconds, between 150 and 220 seconds, approximately 195 seconds, or the like. In some embodiments, the peel step can include directing the user to allow for a dwell time, which can be a time during which a topical is allowed to soak into the patient's skin and during which the handpiece 112 is NOT applied to the patient's skin. This dwell time can be, for example, between 120 and 1200 seconds, between 240 and 1000 seconds, between 400 and 800 seconds, approximately 600 seconds, or the like. The peel step can be performed with the smooth tip 120. In some embodiments, when directing the user to perform user actions of the peel step, the GUI can be controlled to direct the user to, for example, directing the user to: insert a Rejuvenation Card, a tip 119 such as a smooth tip 120 to the cold plate 116, apply a small amount of a topical such as a PEEL directly on the area of skin to be treated such as on the forehead and/or cheeks and/or chin, push the button 700 on the handpiece 112 to start, use handpiece 112 to spread the topical on the skin, leave the topical on the skin for a predetermined period of time such as for ten minutes, remove the topical from the skin with a wet towel or gauze, and clean the tip 119.

In some embodiments, controlling the GUI to guide the user through performing user actions of the next step can include, for example, directing the user to perform a polish step, also referred to herein as a remove step. In some embodiments, polish step can include cooling the cold plate 116 to desired temperature, which can be, for example, between −4° C. to approximately 4° C., from, for example, −2° C. to approximately 2° C., approximately 1° C., or the like. In some embodiments, the user can be directed to apply cooling with the handpiece 112 on the portion of skin being treated for a desired amount of time including, for example, between 60 and 300 seconds, between 100 and 240 seconds, between 150 and 220 seconds, approximately 180 seconds, or the like. In some embodiments, the polish step can be performed with the texture tip 122. In some embodiments, when directing the user to perform user actions of the polish step, the GUI can be controlled to direct the user to: attach a tip 119 such as the textured tip 122 to the cold plate 116, applying a topical such as MIST on the area of skin to be treated such as on the forehead and/or cheeks and/or chin, etc., push the button 700 on handpiece 112 to start the treatment, for each section of skin, hold the skin taut and use long strokes while not going over the same area more than twice, spray additional topical onto the skin as needed throughout the cycle, cleaning the treated skin with a wet gauze or towel after completion of the cycle, spraying additional topical on the skin, and removing the tip 119 from the cold plate 116.

In some embodiments, controlling the GUI to guide the user through performing user actions of the next step can include, for example, directing the user to perform a restore step, also referred to herein as a calm step. In some embodiments, the calm step can include cooling the cold plate 116 to desired temperature, which can be, for example, between −4° C. to approximately 4° C., from, for example, −2° C. to approximately 2° C., approximately 1° C., or the like. In some embodiments, the user can be directed to apply cooling with the handpiece 112 on the portion of skin being treated for a desired amount of time including, for example, between 60 and 300 seconds, between 100 and 240 seconds, between 150 and 200 seconds, approximately 165 seconds, or the like. In some embodiments, the calm step can include directing the user to allow for a dwell time, which can be a time during which a topical is allowed to soak into the patient's skin and during which the handpiece 112 is NOT applied to the patient's skin. This dwell time can be, for example, between 120 and 1200 seconds, between 240 and 1000 seconds, between 400 and 800 seconds, approximately 600 seconds, or the like. In some embodiments, the calm step can be performed with the smooth tip 120. In some embodiments, when directing the user to perform user actions of the calm step, the GUI can be controlled to direct the user to: attach a tip 119 such as the first tip 120 to the cold plate 116, apply topical such as MASK onto the skin to be treated such as on the forehead and/or cheeks and/or and chin, push the button 700 on the handpiece 112 to start, massaging the topical into the skin with the handpiece 112, spraying additional topical onto the skin upon completion of the massaging, letting the topical sit on the skin for a period of time such as ten minutes, removing the topical from the skin with a wet towel or gauze, and cleaning the tip 119.

In some embodiments, controlling the GUI to guide the user through performing user actions of the next step can include, for example, directing the user to perform a refresh step, also referred to herein as a defend step. In some embodiments, refresh step can include cooling the cold plate 116 to desired temperature, which can be, for example, between −4° C. to approximately 4° C., from, for example, −2° C. to approximately 2° C., approximately 1° C., or the like. In some embodiments, the user can be directed to apply cooling with the handpiece 112 on the portion of skin being treated for a desired amount of time including, for example, between 60 and 300 seconds, between 100 and 240 seconds, between 130 and 180 seconds, approximately 150 seconds, or the like. In some embodiments, the defend step can be performed with the smooth tip 120. In some embodiments, when directing the user to perform user actions of the defend step, the GUI can be controlled to direct the user to: apply a topical such as SERUM directly on the skin to be treated such as the forehead and/or cheeks and/or chin, push the button 700 on the handpiece 112 to start, massage the topical into the skin with the handpiece 112 having a tip 119 such as the smooth tip 120, and leave the topical on the skin after massaging and while cleaning the tip 119.

In some embodiments, controlling the GUI to guide the user through performing user actions of the next step can include, for example, directing the user to perform a glow step, also referred to herein as a protect step. In some embodiments, glow step can include cooling the cold plate 116 to desired temperature, which can be, for example, between −4° C. to approximately 4° C., from, for example, −2° C. to approximately 2° C., approximately 1° C., or the like. In some embodiments, the user can be directed to apply cooling with the handpiece 112 on the portion of skin being treated for a desired amount of time including, for example, between 60 and 300 seconds, between 100 and 240 seconds, between 120 and 150 seconds, approximately 135 seconds, or the like. In some embodiments, the glow step can be performed with the smooth tip 120. In some embodiments, when directing the user to perform user actions of the glow step, the GUI can be controlled to direct the user to: apply a topical such as MOISTURIZER on the skin to be treated such as the forehead and/or cheeks and/or chin, push the button 700 on the handpiece 112 to start, massage the topical into the skin with the handpiece 112 containing a tip such as the smooth tip 120, massage any remaining topical into the skin with fingers, and remove and dispose of the tip 119.

At step 2122 any set temperature associated with the next step is identified. Thus, if the next step involves a temperature-related treatment such as, for example, a cooling and/or a freezing treatment, the temperature associated with the identified next step of that treatment is identified. This temperature can be identified from the temperature profile.

At optional step 2123, one or several topicals 132 can be applied to the skin to be treated. This can include removing one or several topicals 132 from case 130, and then applying these one or several topicals 132 to the skin to be treated. The step can be performed by the user of the cooling treatment system 100.

After the set temperature for the identified step is identified, a temperature of the cold plate can be set to that identified set temperature. In embodiments in which the identified step of block 2118 corresponds to a first temperature identified in the temperature profile, the temperature of the cold plate can be set to that first temperature identified in the freeze profile. In some embodiments, the temperature of the cold plate can be set via the steps of blocks 2124 and 2126. At block 2124, the chiller 211 is controlled to cool coolant in the chiller 211 to within a target range. In some embodiments, this can include the controlling of the refrigeration unit 212 and/or the heat load 206 to adjust the temperature of the coolant such that the temperature of the coolant is within the desired range.

In some embodiments, controlling the chiller 211 further includes controlling the pump 220 to control the circulation of coolant through the chiller 211 and through the handpiece 112. In some embodiments, the control of the pump 220 can result in the circulating of the coolant through the handpiece 112.

At block 2126, the cooler 230 is controlled to cool the cold plate 116 to a desired cold plate temperature. In some embodiments, the cooler 230, which can comprise a thermoelectric cooler, can cool the cold plate 116 by transferring heat energy from the cold plate 116 to the coolant circulating through handpiece 112. In some embodiments, this heat transfer and thus the temperature of the cold plate 116 can be regulated according to information received from temperature sensor(s) 236, which temperature sensor(s) 236 can, in some embodiments, sense a temperature of the cold plate 116.

At block 2128, an indication of treatment readiness is provided once the cold plate 116 has achieved the desired cold plate temperature. In some embodiments, this can be indicated by the display 104, and specifically via the GUI visible on the display 104.

At block 2130, treatment tracking begins upon detection of an input indicating and/or triggering start of treatment. In some embodiments, this indication and/or trigger of the start of treatment can include the pressing of the button 700 on the handset 112, the detecting of the pressing of the button 700 on the handset, receipt of an input via, the display 104, via the controls 240 on the handpiece 112, and/or via a detection of a change in skin contact status by, for example, the cap touch 234, a temperature sensor, a pressure sensor, or the like. In some embodiments, treatment tracking can include the beginning of a timer, also referred to herein as a countdown timer, indicating a desired amount of time for performing the identified next step. In some embodiments treatment tracking can include controlling the GUI to display a countdown timer upon receipt of the indication of initiation of delivery of the treatment as in block 2128, such as is shown in FIG. 32 with timer 2700.

Once the treatment step is completed as determined by the passing of the desired amount of time associated with the step identified in block 2118, an indication of the completion of the step is provided to the user. In some embodiments, this indication can comprise a visual indication provided by the GUI and/or one or several LEDs, and in some embodiments, this indication can comprise a tactile and/or audible indication such as via the generation of vibration in the handpiece 112 with the motor 232 and/or via generation of a sound with the speaker 238.

At block 2134, the process 2100 determines if there are any remaining treatment steps. If there are remaining treatment steps, the process 2100 returns to block 2118 and proceeds as outlined above. If there are no remaining treatment steps, then the process 2100 proceeds to block 2136, wherein treatment completion is signaled. This treatment completion can be signaled via one or more the GUI, one or more LEDs, the motor 232, and the speaker 238.

In some embodiments, process 2100 can be terminated upon receipt of a termination request as indicated in block 2140. This termination request can be received, for example, from the user and/or can be generated by the cooling treatment system 100. In some embodiments, for example, the termination request can be generated by the controller 110 and/or the handpiece controller 114 when a sensed temperature is outside of an acceptable range and/or falls above or below a temperature threshold value or a difference in temperature as measured by two or more sensors exceeds a limit. In some embodiments, this temperature can be a temperature of the cold plate 116, a temperature of the chiller 211 of component of the chiller 211, and/or a temperature of the cooler 230. In some embodiments, for example, a termination request can be generated if the cold plate 116 is too cold or too hot. In some embodiments, the termination request can be generated in response to an indication from the cap touch 234 that the cold plate 116 has been removed from the patient's skin and/or is no longer in contact with the patient's skin.

After the termination request has been received and/or generated, the treatment is cancelled at block 2142. In some embodiments, cancelling the treatment can comprise controlling the chiller 211 and/or cooler 230 to discontinue cooling and/or heating of the cold plate 116. In embodiment in which the cold plate 116 is being cooled upon receipt of the termination request, cancelling the treatment can comprise controlling the chiller 211 and/or cooler 230 to rewarm the cold plate 116.

Figure 33:
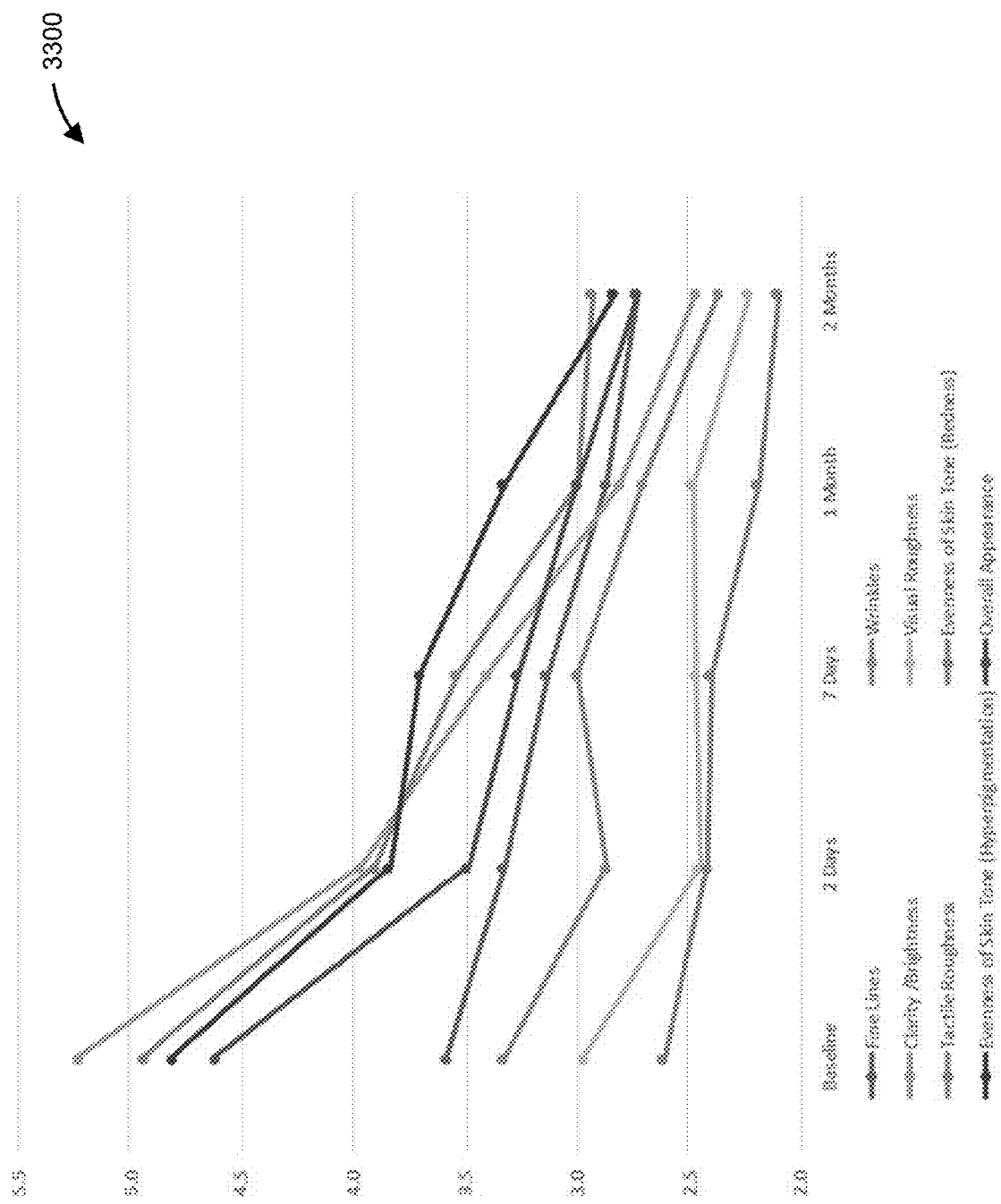
FIG. 33 is a graph depicting measured improvements of a patient's skin subsequent to receiving a treatment described herein.

Performing of the process 2100 can improve one or several attributes of the patient's skin. With reference now to FIG. 33 a graph 3300 depicting measured improvements of a patient's skin subsequent to treatment according to the process 2100 is shown. As seen in the graph 3300, multiple of the attributes of the patient's skin can improve subsequent to a treatment according to the process 2100. These can include, for example, the appearance of fine lines and/or wrinkles, the skin's clarity and/or brightness, the skins tactile and/or visual roughness, evenness of the skins tone including redness and/or hyperpigmentation, and/or the skin's overall appearance.

Figure 34:
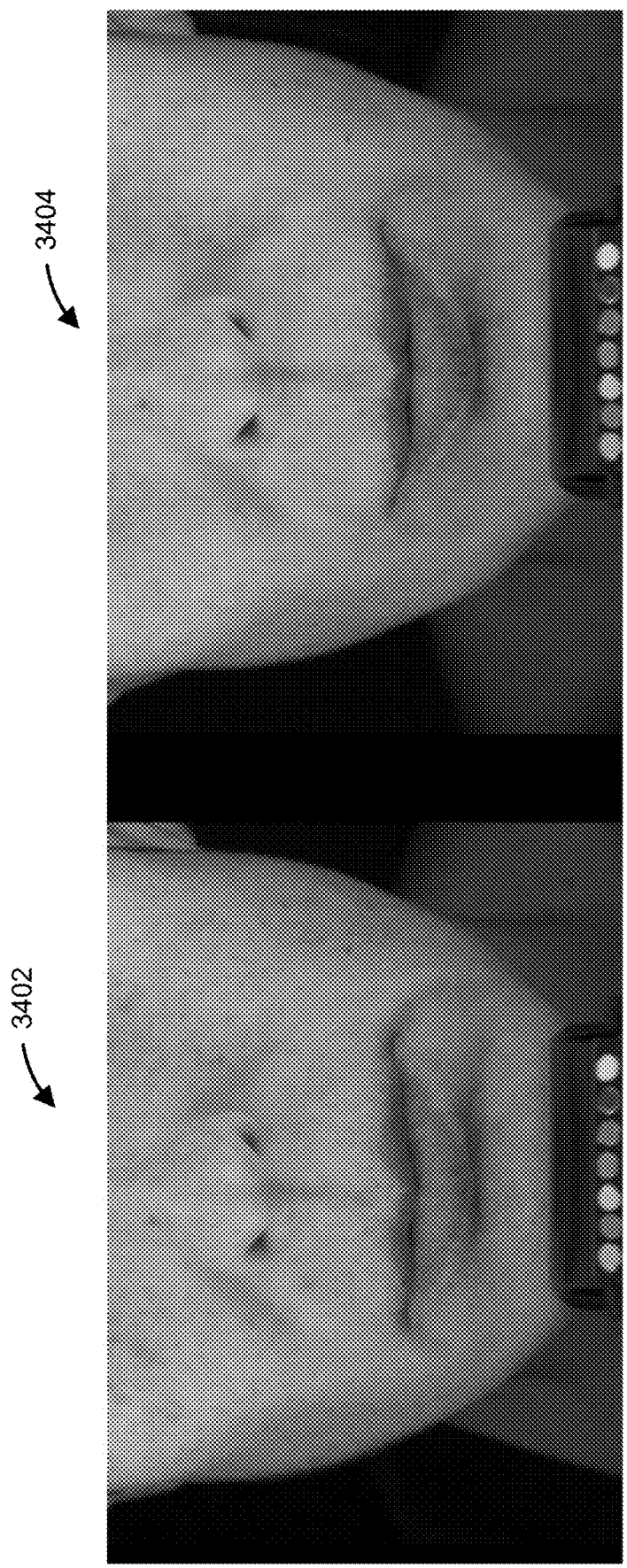
FIG. 34 includes a photo of a patient before receiving the treatment described herein and a photo of a patient after receiving the treatment described herein.

With reference now to FIG. 34, before and after photos 3402, 3404 are shown depicting the improvement to a patient's skin subsequent to receiving the treatment of process 2100. Improvements to the patient's skin are visible in comparing a first photo 3402 taken before the treatment to a second photo 3404 taken approximately eight weeks after receiving the treatment of process 2100.

This description should not be interpreted as implying any particular order or arrangement among or between various steps or elements except when the order of individual steps or arrangement of elements is explicitly described. Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A method of delivering a skin cooling treatment to an area of skin of a patient, the method comprising:
   receiving a card within a card reader of a cooling treatment system, the cooling treatment system comprising a display, a chiller located in a housing, a handpiece flexibly coupled to the housing and comprising a cooler configured to cool a cold plate of the handpiece;
   identifying treatment instructions stored on the card, the treatment instructions comprising at least one temperature profile identifying a plurality of temperatures and an associated time for maintaining each of the plurality of temperatures;
   launching a graphical user interface (GUI) corresponding to the identified treatment instructions;
   identifying a step in a plurality of steps in the identified treatment instructions, each of the plurality of steps associated with a treatment;
   controlling the GUI to guide the user through performing user actions of the step in the identified treatment instructions,
   depicting, on the GUI, an image showing an action to be performed by the user using the handpiece, the image showing how the user should apply the handpiece to perform the treatment on the area of skin of the patient;
   setting a temperature of the cold plate to a first temperature of the temperature profile; and
   controlling the GUI to display a countdown timer upon receipt of an indication of initiation of delivery of the treatment of the identified step.

2. The method of claim 1, wherein the step comprises a freezing step.

3. The method of claim 2, wherein the plurality of steps further comprise:
   a second step comprises a cooling step;
   a third step comprising a dwell step; and
   a fourth step comprising a rewarming step.

4. The method of claim 1, wherein the step comprises a cooling step.

5. The method of claim 1, wherein controlling the GUI to guide the user through performing user actions of the next step comprises:
   identifying at least one topical; and
   directing application of the topical to the area of skin of the patient.

6. The method of claim 5, wherein controlling the GUI to guide the user through performing user actions of the next step comprises directing the user to cool the area of skin of the patient via the handpiece, wherein directing the user to cool the area of skin of the patient via the handpiece comprises directing the user to:
   contact the area of skin of the patient with the cold plate; and
   depress a button to indicate initiation of delivery of the treatment of the identified next step.

7. The method of claim 5, wherein controlling the GUI to guide the user through performing user actions of the next step comprises directing the user to cool the area of skin of the patient via the handpiece, wherein directing the user to cool the area of skin of the patient via the handpiece comprises directing the user to:
   connect a treatment tip to the cold plate of the handpiece;
   contact the area of skin of the patient with the treatment tip connected to the cold plate; and
   depress a button to indicate initiation of delivery of the treatment of the identified next step.

8. The method of claim 7, wherein the treatment tip comprises at least one of:
   a smooth tip; and
   a textured tip.

9. The method of claim 7, wherein the cold plate comprises:
   a distal protrusion;
   an at least partially conical camming surface extending proximally and radially away from a proximal end of the distal protrusion;
   a retention depression connecting to a proximal end of the camming surface.

10. The method of claim 9, wherein the treatment tip comprises:
    an exterior housing; and a retention feature located within the exterior housing, the retention feature configured to be retained within the retention depression to thereby connect the treatment tip to the cold plate.

11. The method of claim 10, wherein the retention feature comprises a rubber O-ring.

12. The method of claim 11, wherein the cold plate further comprises a plurality of axial grooves located around a perimeter of a junction of the proximal end of the camming surface and the retention depression, wherein the plurality of axial grooves allow fluid to move past the rubber O-ring when connecting the treatment tip to the cold plate.

13. The method of claim 12, wherein the plurality of axial grooves are located at a junction of the camming surface and the retention depression.

14. The method of claim 13, wherein each of the plurality of axial grooves extends into the camming surface to a depth equal to a retention depth of the retention depression.

15. The method of claim 14, wherein connecting the treatment tip to the cold plate of the handpiece comprises applying a thermal coupling fluid to at least one of the cold plate and a receptacle defined by the treatment, the receptacle configured to receive the cold plate, and wherein thermal coupling fluid thermally couples the cold plate to the treatment tip connected to the cold plate.

16. The method of claim 15, wherein the plurality of axial grooves prevent the thermal coupling fluid from being entrapped between the cold plate and the treatment tip when the treatment tip is coupled to the cold plate.

17. The method of claim 15, wherein the receptacle of the treatment tip comprises a plurality of mating surfaces configured to mate with corresponding surfaces of the cold plate.

18. The method of claim 1, wherein setting a temperature of the cold plate to a first temperature of the temperature profile comprises:
controlling the chiller to cool a coolant to a coolant temperature within a target range;
circulating the coolant through the handpiece; and
controlling the cooler within the handpiece to cool the cold plate to a desired cold plate temperature.

19. The method of claim 18, wherein the cooler comprises a thermoelectric cooler, and wherein controlling a cooler within the handpiece to cool the cold plate to a desired cold plate temperature comprises transferring heat from the cold plate to the coolant circulating through the handpiece with the thermoelectric cooler.

20. The method of claim 18, wherein the chiller comprises:
a coolant circulation system;
a heat exchanger; and
a refrigeration unit coupled via the heat exchange to the coolant circulation system.

21. The method of claim 20, wherein the refrigeration unit is configured to cool the coolant in the coolant circulation system, and wherein the chiller further comprises a heating unit configured to heat coolant in the coolant circulation system.

22. The method of claim 20, wherein the chiller further comprises: a heater configured to heat a portion of the chiller; and a coolant pump configured to circulate coolant through the coolant circulation system.

23. The method of claim 22, wherein the heater comprises a resistive heater.

24. The method of claim 18, further comprising cancelling the treatment in response to a termination request.

25. The method of claim 24, wherein the termination request is at least one of:
received from the user; or
generated in response to a detected temperature of at least one of: the cold plate; the chiller; or the cooler.

26. The method of claim 1, further comprising:
determining a value of a count of available treatment cycles associated with the card;
receiving an instruction from user to provide a treatment;
starting the treatment when the value indicates that at least one treatment is available; and
decrementing the value of the count of available treatment cycles upon starting the treatment.

27. The method of claim 1, further comprising performing a self-check of the cooling treatment system.

28. The method of claim 27, further comprising indicating any error detected via the self-check.

29. The method of claim 27, wherein the self-check is performed when the cooling treatment system is turned on.

30. The method of claim 27, wherein the self-check determining a communication connection with the handpiece.

31. A method of delivering a skin cooling treatment to an area of skin of a patient, the method comprising:
receiving a card within a card reader of a cooling treatment system, the cooling treatment system comprising a display, a chiller located in a housing, a handpiece flexibly coupled to the housing and comprising a cooler configured to cool a cold plate of the handpiece, wherein the cold plate comprises:
a distal protrusion;
an at least partially conical camming surface extending proximally and radially away from a proximal end of the distal protrusion;
a retention depression connecting to a proximal end of the camming surface; and
a plurality of axial grooves located around a perimeter of a junction of the proximal end of the camming surface and the retention depression;
identifying treatment instructions stored on the card, the treatment instructions comprising at least one temperature profile identifying a plurality of temperatures and an associated time for maintaining each of the plurality of temperatures;
launching a graphical user interface (GUI) corresponding to the identified treatment instructions;
identifying a step in a plurality of steps in the identified treatment instructions, each of the plurality of steps associated with a treatment;
controlling the GUI to guide the user through performing user actions of the step in the identified treatment instructions;
setting a temperature of the cold plate to a first temperature of the temperature profile; and
controlling the GUI to display a countdown timer upon receipt of an indication of initiation of delivery of the treatment of the identified step.

* * * * *